US006268440B1

(12) United States Patent
Kudo et al.

(10) Patent No.: US 6,268,440 B1
(45) Date of Patent: Jul. 31, 2001

(54) PROCESS FOR PREPARING AQUEOUS RESIN, AQUEOUS CURABLE RESIN COMPOSITION, AQUEOUS PAINT, AND METHOD FOR FORMATION OF COATING THEREFROM

(75) Inventors: Shin-ichi Kudo; Hiroshi Kinoshita, both of Osaka; Masataka Ooka, Nara, all of (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/230,685

(22) PCT Filed: Jun. 2, 1998

(86) PCT No.: PCT/JP98/02419

§ 371 Date: Jan. 29, 1999

§ 102(e) Date: Jan. 29, 1999

(87) PCT Pub. No.: WO98/55548

PCT Pub. Date: Dec. 10, 1998

(30) Foreign Application Priority Data

Jun. 2, 1997 (JP) .................................................. 9-143841
Jan. 28, 1998 (JP) ................................................ 10-014706

(51) Int. Cl.$^7$ ............................. C08L 83/04; C08L 83/10; C08G 77/42
(52) U.S. Cl. ...................... 525/477; 525/101; 525/105; 525/106; 525/474; 524/588; 524/806; 524/837; 524/860; 524/863; 524/866; 528/32; 528/33
(58) Field of Search ................................. 424/806, 837, 424/860, 863, 866, 588; 525/101, 105, 106, 474, 477; 528/32, 33

(56) References Cited

U.S. PATENT DOCUMENTS 5,840,800 * 11/1998 Joffre et al. ......................... 524/806

FOREIGN PATENT DOCUMENTS

| 4-359075 | 12/1992 | (JP) . |
| 6-1948 | 1/1994 | (JP) . |
| 10-176117 | 6/1998 | (JP) . |

OTHER PUBLICATIONS

Cardio Tech International, Inc. Product catalogue.*

* cited by examiner

Primary Examiner—Robert Dawson
Assistant Examiner—Jeffrey B. Robertson
(74) Attorney, Agent, or Firm—Armstrong, Westerman, Hattori, McLeland & Naughton, LLP

(57) ABSTRACT

A water-base resin has both excellent storage stability and excellent curability at room temperature, the water base resin being obtained by mixing a composite resin (C) and a polysiloxane (D), bringing about a condensation reaction partially between them if necessary, and thereafter dispersing or dissolving the resulting mixture or partially condensed product into a water-base medium, wherein the composite resin (C) comprises a polysiloxane segment (A) and a polymer segment (B), the polysiloxane segment (A) having at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group, and the polymer segment (B) having at least one type of hydrophilic group selected from the group consisting of an anionic group, a cationic group, and a non-ionic group, and wherein the polysiloxane (D) has a hydrolyzable group bonded to a silicon atom and/or a hydroxyl group bonded to a silicon atom, the polysiloxane (D) having a structure represented by the following structural formula (S-I) as an essential structural unit:

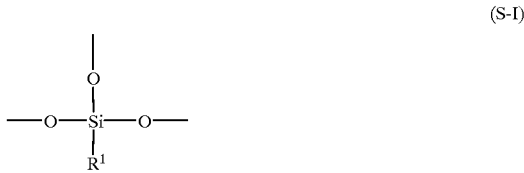

(S-I)

(wherein $R^1$ in the formula denotes a methyl group or an ethyl group). A water-base curable resin composition comprising the water-base resin as an essential component produces a cured material which possesses excellent resistance stain during outdoor exposure as well as excellent durability such as acid rain resistance and gloss retention during outdoor exposure.

22 Claims, No Drawings

PROCESS FOR PREPARING AQUEOUS RESIN, AQUEOUS CURABLE RESIN COMPOSITION, AQUEOUS PAINT, AND METHOD FOR FORMATION OF COATING THEREFROM

TECHNICAL FIELD

The present invention relates to a novel and useful process for producing a water-base resin, to a water-base curable resin composition comprising the water-base resin obtained by the production process as an essential component, to a water-base coating material comprising the water-base curable composition as an essential component, and to a process for forming a coating film using the water-base coating material.

More specifically, the present invention relates to a process for producing a water-base resin, the process being characterized by the following steps: mixing a specific polysiloxane and a composite resin comprising both a specific polymer segment having at least one type of hydrophilic group selected from the group consisting of an anionic group, a cationic group, and a non-ionic group and a specific polysiloxane segment having silicon atoms; bringing about a condensation reaction at least partially between the composite resin and the polysiloxane, if necessary; and thereafter dispersing or dissolving the resulting mixture or at least partially condensed product into a water-base medium. The present invention also relates to a water-base curable resin composition which comprises as an essential component a water-base resin obtained by the above process.

Even more specifically, the present invention relates to a process for producing a water-base resin having a high polysiloxane content, which possesses excellent curability at room temperature and excellent storage stability, and which may be formed into a cured material; the cured material obtained is excellent in various properties such as durability represented by gloss retention and acid rain resistance, solvent resistance, resistance to chemicals, and water resistance, and is extremely excellent in stain resistance during outdoor exposure.

In addition, the present invention relates to a water-base curable resin composition which comprises the water-base resin obtained by the above production process as an essential component and which, in particular, possesses excellent curability. Furthermore, the present invention relates to a novel and highly useful process for forming a coating film, according to which a coating film can be formed which is excellent in various properties such as durability as mentioned above, and is extremely excellent in stain resistance during outdoor exposure.

Such a water-base curable resin composition according to the present invention can be effectively used for various applications such as in agents for treating fibers, adhesives, sealants, and coating materials for exteriors of architecture, building materials, vehicles, and heavy duty uses.

In addition, a process for forming a coating film according to the present invention is useful as a process for forming a top-coating film on various articles to such as various structural materials, building materials, automobiles, and the like.

BACKGROUND ART

As water-base curable resin compositions for coating materials, a water-base curable resin composition has been hitherto widely used which comprises a water-base resin and one of various curing agents such as an epoxy resin, an isocyanate resin, and an amino resin. The water-base resin mentioned above can be obtained by neutralizing a vinyl polymer, having a basic or acid group together with a functional group such as a hydroxyl group, with an acidic or basic compound, and thereafter dispersing or dissolving the resulting neutralized vinyl polymer in a water-base medium (Japanese Patent Application, First Publication (Kokai) No. Hei 4-359075, Japanese Patent Application, First Publication (Kokai) No. Hei 6-1948, Published Japanese Translation of PCT International Publication (Kohyo) for Patent Application, Publication No. Hei 8-510000, and European Patent Application, Publication No. EP661320-A1).

However, cured coating films obtained from such water-base curable resin compositions which have hitherto been used in which a water-base resin serves as a base resin component are insufficient in durability during outdoor exposure such as gloss retention and acid rain resistance, or in stain resistance during outdoor exposure. Accordingly, there have been problems in that conventional water-base resins can almost never be put into uses where high durability or stain resistance during outdoor exposure is demanded.

On the other hand, in order to improve gloss retention during outdoor exposure of the coating film which is obtained from the water-base vinyl polymer as described above, modifications of the polymer by polysiloxanes have been investigated. However, at present, a modified resin having a high polysiloxane content which is excellent in both storage stability and curability at room temperature has not yet been obtained.

Thus, the present inventors commenced study in order to solve all of these various problems which existed in the prior art as described above.

Accordingly, the object to be achieved by the present invention is to provide a novel and useful process for producing a water-base resin which possesses both excellent storage stability and excellent curability at room temperature, and which can produce a cured material having excellent durability such as gloss retention and acid rain resistance during outdoor exposure, and exhibiting extremely excellent stain resistance during outdoor exposure. Another object to be achieved by the present invention is to provide a novel and useful water-base curable resin composition which comprises the novel and useful water-base resin obtained by the above production process. The water-base curable resin composition is excellent in curability at room temperature and is capable of producing a cured coating film which possesses extremely excellent durability.

Yet another object to be achieved by the present invention is to provide a process for forming a coating film in which a coating material comprising the above water-base curable resin composition is used.

DISCLOSURE OF INVENTION

As a result of research to achieve the above object, the present inventors have found a water-base resin having both excellent storage stability and excellent curability at room temperature. The water-base resin is obtained by the following steps: mixing a specific polysiloxane which has a specific essential structural unit and a specific composite resin comprising a specific polysiloxane segment, having a silicon atom bearing a hydrolyzable group or a hydroxyl group together with an organic group, and a specific polymer segment having at least one type of hydrophilic group selected from the group consisting of an anionic group, a cationic group, and a non-ionic group; bringing about a condensation reaction at least partially between the polysiloxane and the composite resin, if necessary; and thereafter dispersing or dissolving the mixture into a water-base medium. Thus, the present inventors have established a process for producing the water-base resin. In addition, the present inventors have found that a water-base curable resin composition which comprises the water-base resin as an essential component can produce a cured material having excellent property in durability such as acid rain resistance and gloss retention during outdoor exposure (hereinafter referred to as "weathering resistance"), and excellent stain resistance during outdoor exposure. Accordingly, the present inventors have become confident that the above object to be achieved by the present invention could be successfully achieved, and thus the present invention was completed.

That is to say, the present invention basically provides a process for producing a water-base resin, the process comprising the following steps: mixing a composite resin (C) and a polysiloxane (D), bringing about a condensation reaction partially between them if necessary, and thereafter dispersing or dissolving the resulting mixture or partially condensed product into a water-base medium. The composite resin (C) mentioned above comprises a polymer segment (B) and a polysiloxane segment (A) which has at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group. The polymer segment (B) mentioned above has at least one type of hydrophilic group selected from the group consisting of an anionic group, a cationic group, and a non-ionic group. The polysiloxane (D) mentioned above has a hydrolyzable group bonded to a silicon atom and/or a hydroxyl group bonded to a silicon atom. The polysiloxane (D) also has a structure represented by the following structural formula (S-I) as an essential structural unit:

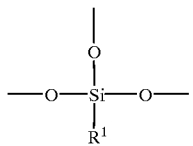

(S-I)

(wherein $R^1$ in the formula denotes a methyl group or an ethyl group).

In addition, the present invention provides a water-base curable resin composition comprising the above water-base resin as an essential component.

Furthermore, the present invention provides a water-base curable resin composition comprising the above water-base resin and a compound (E) having a functional group which can react with a functional group contained in the water-base resin.

Moreover, the present invention provides a water-base coating material comprising one of the above various water-base curable resin compositions as an essential component. In addition, the present invention provides a process for forming a coating film which comprises applying the above water-base coating material on a substrate or on a substrate on which a primer coating material has been applied in advance, and then curing the water-base coating material.

BEST MODE FOR CARRYING OUT THE INVENTION

The present invention is explained furthermore in detail in the following.

A water-base resin (W) of the present invention can be produced by dispersing or dissolving the mixture obtained by simply mixing a composite resin (C) and a polysiloxane (D) into a water-base medium. The resin (W) can also be produced by dispersing or dissolving a so-called condensate obtained by bonding chemically of a part of the composite resin (C) and a part of the polysiloxane (D). The composite resin (C) mentioned above comprises a polymer segment (B) and a polysiloxane segment (A) having at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group. The polymer segment (B) also has at least one type of hydrophilic group selected from the group consisting of an anionic group, a cationic group, and a non-ionic group. The polysiloxane (D) mentioned above has a hydrolyzable group bonded to a silicon atom and/or a hydroxyl group bonded to a silicon atom. The polysiloxane (D) also has a structure represented by the following structural formula (S-I) as an essential structural unit:

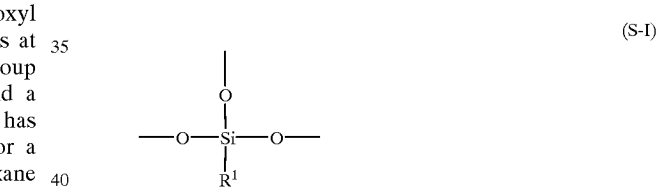

(S-I)

(wherein $R^1$ in the formula denotes a methyl group or an ethyl group).

The above-described composite resin (C), which is used as a precursor for the preparation of the water-base resin (W), is a resin having a graft structure and/or a block structure in which the above-described polysiloxane segment (A) is chemically bonded to a side chain and/or a terminal of the above-described polymer segment (B).

In the composite resin (C), the polysiloxane segment (A) and the polymer segment (B) may be bonded in a manner such as that shown in the following structural formula (S-II) or structural formula (S-IV). For the purpose of achieving high durability, particularly the manner of bonding shown in structural formula (S-II) is preferably employed.

(S-II)

(In the formula, the carbon atom constitutes a part of the polymer segment (B), and the two silicon atoms constitute the polysiloxane segment (A) or a part of the polysiloxane segment (A).)

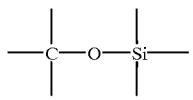

(S-IV)

(In the formula, the carbon atom constitutes a part of the polymer segment (B), and the silicon atom constitutes a part of the polysiloxane segment (A).)

In the preparation of the water-base resin (W), it is appropriate that the total amount of the polysiloxane segment derived from the polysiloxane (D) and the polysiloxane segment (A) be adjusted to be 5% to 95% by weight with respect to the solids content, preferably 15% to 90% by weight, and more preferably 30% to 80% by weight.

Adjusting the total amount of the polysiloxane segment derived from the polysiloxane (D) and the polysiloxane segment (A) to 95% by weight or more would not be suitable since it is unavoidable, in particular, that alkali resistance of a coating film formed from the water-base resin (W) is degraded or cracking tends to occur in the film due to too great an amount of the polysiloxane components. On the other hand, adjusting the total amount of the polysiloxane segment derived from the polysiloxane (D) and the polysiloxane segment (A) to less than 5% by weight would not be suitable since it is unavoidable, in particular, that weathering resistance or stain resistance during outdoor exposure of a coating film formed from the water-base resin (W) is degraded due to too small an amount of the polysiloxane components.

In the preparation of the water-base resin (W), in view of a balance of stability and curability, it is suitable that the number of moles of silicon atoms in the polysiloxane segment (A) is within the range of 0.1% to 80%, preferably 0.2% to 75%, and more preferably 0.2% to 70%, of the total number of moles of the silicon atoms in the polysiloxane segment derived from the polysiloxane (D) and the polysiloxane segment (A).

Representative examples of the polymer segment (B), which is a constituent of the composite resin (C), are segments based on various vinyl polymers such as acrylic polymers, fluoroolefin polymers, vinyl ester polymers, aromatic vinyl polymers, and polyolefin polymers as well as segments based on polymers other than those based on vinyl polymers such as polyester resins, alkyd resins, and polyurethane polymers.

Among these, the vinyl polymer segments or the polyurethane polymer segments are particularly suitable. Among the vinyl polymer segments, acrylic polymer segments are particularly desirable.

The polymer segment (B) has at least one type of hydrophilic group selected from the group consisting of an anionic group, a cationic group, and a non-ionic group.

Among such hydrophilic groups, various groups hitherto known can be employed as an anionic group. An acid group neutralized by a basic compound is particularly preferable. Representative examples of such neutralized acid groups are a carboxyl group, a phosphoric acid group, an acid phosphate ester group, a phosphorous acid group, a sulfonic acid group, and a sulfinic acid group, each being in the neutralized form. Among these neutralized acid groups, a neutralized carboxyl group is particularly preferable.

Representative examples of the basic compounds which can be used for neutralizing the acid group are various organic amines such as methylamine, dimethylamine, trimethylamine, ethylamine, diethylamine, triethylamine, 2-aminoethanol, and 2-dimethylaminoethanol; various inorganic basic compounds such as ammonia, lithium hydroxide, sodium hydroxide, and potassium hydroxide; and various quaternary ammonium hydroxide such as tetramethylammonium hydroxide, tetra-n-butylammonium hydroxide, and trimethylbenzylammonium hydroxide.

Among these various basic compounds, organic amines and ammonia are particularly preferable.

As the cationic group introduced in the polymer segment (B), various groups hitherto known may be employed. A basic group neutralized by an acidic compound is particularly preferable.

Representative examples of such neutralized basic groups are a primary amino group, a secondary amino group, a tertiary amino group, and ammonium hydroxide group, each being in the neutralized form. Among these neutralized basic groups, a neutralized tertiary amino group is particularly preferable.

Representative examples of the acidic compounds which can be used for neutralizing the basic group are various carboxylic acids such as formic acid, acetic acid, propionic acid, and lactic acid; various monoesters or diesters of phosphoric acid, such as phosphoric acid monomethyl ester and phosphoric acid dimethyl ester; various organic sulfonic acids such as methanesulfonic acid, bezenesulfonic acid, and dodecylbenzenesulfonic acid; and various inorganic acids such as hydrochloric acid, sulfuric acid, nitric acid, and phosphoric acid. Among these acidic compounds, carboxylic acids are particularly preferable.

As the non-ionic group which the polymer segment(B) possesses, a segment which has a polyether chain may be introduced. Representative examples of such polyether chains are various polyoxyalkylene chains such as a polyoxyethylene chain, a polyoxypropylene chain, and a polyoxybutylene chain; a chain in which the above oxyalkylene portion is random-copolymerized such as a poly (oxyethylene-oxypropylene) chain; and a chain in which different polyoxyalkylene chains are bonded in the form of blocks such as a polyoxyethylene-polyoxypropylene chain.

Among such various polyoxyalkylene chains, a chain having oxyethylene units and/or oxypropylene units as essential repeating units is particularly preferable.

The hydrophilic group to be introduced in the polymer segment (B) may be an anionic group, a cationic group, or a non-ionic group independently. An anionic group or a cationic group and a non-ionic group may be employed together. In addition, an anionic group and a cationic group may be employed together in such proportions as not to lower storage stability of the water-base resin (W) obtained by the production process of the present invention.

In the case where the above-mentioned anionic group or cationic group is introduced as the hydrophilic group into the polymer segment (B), a suitable amount introduced, expressed by the number of moles of the anionic group or the cationic group in 1,000 grams of the polymer segment (B), is in the range of about 0.1 to 10 moles, preferably 0.2 to 5 moles, and most preferably 0.3 to 3 moles.

In the case where a polyether chain as a non-ionic group is introduced as the hydrophilic group into the polymer segment (B), a suitable amount introduced, expressed by the weight in grams of the polyether chain in 1,000 grams of the polymer segment (B), is in the range of about 10 to 990 grams, preferably 20 to 900 grams, and most preferably 40 to 800 grams.

In addition, in the case where an anionic group or a cationic group and a polyether chain as a non-ionic group are introduced together as hydrophilic groups into the polymer segment (B), it is desirable that the amount of each group introduced be in the same range as that in the case where each group is introduced alone as described above.

A functional group other than those four types, namely, the acid group, the basic group, the hydrolyzable group bonded to a silicon atom, and the hydroxyl group bonded to a silicon atom, can be introduced into the polymer segment (B). Representative examples of such functional groups are a hydroxyl group bonded to a carbon atom, a blocked hydroxyl group, a cyclocarbonate group, an epoxy group, a primary amide group, a secondary amide group, a carbamate group, and a functional group represented by the following structural formula (S-V).

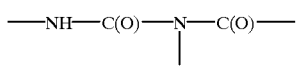
(S-V)

Among the above various functional groups, a hydroxyl group bonded to a carbon atom is particularly preferable.

The polysiloxane segment (A), which is a constituent of composite resin (C) used in the production process according to the present invention, has at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group. The polysiloxane segment (A) may be of any structure selected from a linear structure, a branched structure, and a cyclic structure.

By introducing a bulky substituent group such as an organic group having a total carbon number of at least 3 or a triorganosiloxy group onto a silicon atom which has a hydrolyzable group or a hydroxyl group and is contained in the polysiloxane segment (A), or by introducing two groups selected from the group consisting of methyl groups and ethyl groups onto such a silicon atom, the reactivity of the hydrolyzable group or hydroxyl group bonded to the silicon atom having any of these organic groups is decreased by the steric effect. This decrease in the reactivity leads to the prevention of a marked increase in the viscosity and gelation during preparation of the water base resin (W), and excellent storage stability can be imparted to the water-base resin obtained.

Representative examples of the organic group in the polysiloxane segment (A), the organic group having a total carbon number of at least 3 and being bonded to a silicon atom, are a methyl group to which a substituent having at least 2 carbon atoms is bonded, an ethyl group to which a substituent group having at least 1 carbon is bonded, an alkyl group having a carbon number of at least 3, an alkyl group having a carbon number of at least 3 and bearing a substituent, a cycloalkyl group, a cycloalkyl group bearing a substituent, an alkyl group bearing an alkyl group, an aryl group, a substituted aryl group, an aralkyl group, and an aralkyl group to which a substituent is bonded.

The upper limit for the carbon number of the organic group, having a total carbon number of at least 3, is about 18 from the point of practical use.

Even more concrete examples of the organic group having a total carbon number of at least 3 are a methyl group substituted with a cycloalkyl group, such as a cyclopentylmethyl group and a cyclohexylmethyl group; an ethyl group substituted with an alkoxy group, such as a 2-methoxyethyl group and a 2-ethoxyethyl group; an ethyl group substituted with a cycloalkyl group, such as a 2-cyclopentylethyl group, 2-cyclohexylethyl group, and a β-(3,4-epoxycyclohexyl) ethyl group; an alkyl group having a carbon number of at least 3, such as an n-propyl group, an iso-propyl group, an n-butyl group, an iso-butyl group, a tert-butyl group, an n-pentyl group, an n-hexyl group, an n-octyl group, an n-dodecyl group, and an n-octadecyl group; a substituted propyl group such as a 3-glycidoxypropyl group, a 3-ureidopropyl group, a 3-acryloxypropyl group, and a 3-methacryloyloxypropyl group; a cycloalkyl group such as a cyclopentyl group, a cyclohexyl group, and a cyclooctyl group; an aryl group or a substituted aryl group, such as a phenyl group, a 4-methylphenyl group, and a 1-naphthyl group; and an aralkyl group such as a benzyl group and a 2-phenylethyl group.

Among the aforementioned various organic groups, an at alkyl group having a carbon number of 3 to 18, a cycloalkyl group, and an aryl group are particularly preferable.

Accordingly, particularly preferable examples of a silicon atom bearing at least one organic group having a total carbon number of at least 3 together with at least one hydrolyzable group and/or at least one hydroxyl group are a silicon atom bearing at least one alkyl group having a carbon number of 3 to 18 together with at least one hydrolyzable group and/or at least one hydroxyl group; a silicon atom bearing at least one cycloalkyl group together with at least one hydrolyzable group and/or at least one hydroxyl group; and a silicon atom bearing at least one aryl group together with at least one hydrolyzable group and/or at least one hydroxyl group.

Among the above alkyl groups having a carbon number of 3 to 18, an iso-butyl group is particularly preferable. Among the above cycloalkyl groups, a cyclohexyl group is particularly preferable. Among the above aryl groups, a phenyl group is particularly preferable. There are various examples of triorganosiloxy group introduced via bond with a silicon atom in the polysiloxane segment (A), such as a trimethylsiloxy group, a triethylsiloxy group, a cyclohexyldimethylsiloxy group, a dimethylphenylsiloxy group, and a tert-butyldimethylsiloxy group. Among the various triorganosiloxy groups, a trimethylsiloxy group is particularly preferable from a practical viewpoint, for example, in view of the price.

The hydrolyzable group bonded to a silicon atom in the polysiloxane segment (A) is defined as a group which readily hydrolyzes with elimination reaction to produce a hydroxyl group bonded to a silicon atom. Representative examples of such a hydrolyzable group are an alkoxy group, a substituted alkoxy group, a phenoxy group, an acyloxy group, a halogen atom, an isopropenyloxy group, an iminoxy group, and a hydrogen atom.

Among these hydrolyzable groups, one which is particularly preferable is an alkoxy group. Representative examples of the alkoxy group are a methoxy group, an ethoxy group, an n-propoxy group, an n-butoxy group. Among these, a methoxy group and an ethoxy group are particularly preferable.

Next, a process for preparing the composite resin (C) used as a precursor in the production of the above-described water-base resin (W), will be explained.

As the composite resin (C), the above-described particularly desirable one in which the polysiloxane segment (A) and the polymer segment (B) are bonded via the linkage as shown in structural formula (S-II) will be described.

Representative examples of the process for preparing the composite resin (C) are described in the following (a) to (f).

(a) By reacting a polymer, which is a precursor for forming the polymer segment (B) which is a constituent of the composite resin (C), and polysiloxane (a-1) (wherein the polymer has at least one type of group selected from the group consisting of an acid group, a basic group, and a non-ionic group together with a hydrolyzable group bonded to a silicon atom and/or hydroxyl group bonded to a silicon atom; and polysiloxane (a-1) has at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group), a condensation between the polymer and polysiloxane (a-1) is performed so that a linkage shown in structural formula (S-II) is formed via the reaction between the hydrolyzable or hydroxyl group bonded to the silicon atom in the polymer and those groups in polysiloxane (a-1). If the thus-obtained condensate has an acid group and/or a basic group, the condensate is neutralized by a basic compound or an acidic compound.

(b) By reacting a polymer, which is a precursor for forming the polymer segment (B) which is a constituent of the composite resin (C), and the above-described polysiloxane (a-1) (wherein the polymer has at least one type of hydrophilic group selected from the group consisting of a neutralized acid group, a neutralized basic group, and a non-ionic group together with a hydrolyzable group bonded to a silicon atom and/or hydroxyl group bonded to a silicon atom), a condensation between the polymer and polysiloxane (a-1) is performed so that a linkage shown in structural formula (S-II) is formed via the reaction between the hydrolyzable or hydroxyl group bonded to the silicon atom in the polymer and these groups in polysiloxane (a-1).

(c) In the process of (a) described above, instead of using polysiloxane (a-1), a silane compound to which three organic groups and one hydrolyzable group are bonded (a triorganosilane compound) is used.

(d) In the process of (b) described above, instead of using polysiloxane (a-1), a silane compound to which three organic groups and one hydrolyzable group are bonded (a triorganosilane compound) is used.

(e) Vinyl monomers are copolymerized, wherein the vinyl monomers contain as the essential monomer component at least one monomer selected from the group consisting of a vinyl monomer having an acid group, a vinyl monomer having a basic group, and a vinyl monomer having a non-ionic group, together with a polysiloxane both the above-described polysiloxane segment (A) and a radically polymerizable double bond which are linked with the polysiloxane segment (A) via the linkage as shown in structural formula (S-III)

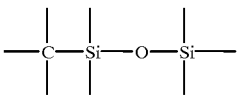

(wherein the carbon atom in the formula is one of the carbon atoms forming the double bond, or is a constituent of a substituent group which is bonded to one of the carbon atoms forming the double bond; and the two silicon atoms constitute at least a part of the polysiloxane segment.) If the thus-obtained copolymer has an acid group and/or a basic group, the copolymer is neutralized by a basic compound or an acidic compound.

(f) Vinyl monomers are copolymerized, wherein the vinyl monomers contain as the essential monomer component at least one monomer selected from the group consisting of a vinyl monomer having a neutralized acid group, a vinyl monomer having a neutralized basic group, and a vinyl monomer having a non-ionic group, together with a specific polysiloxane having the radically polymerizable double bond, which is used in the process of (e) described above.

The polysiloxane to be used in the preparation of the composite resin (C) according to the above process (e) or (f) may be chosen from various polysiloxanes. From a practical viewpoint, however, it is particularly preferable to use polysiloxane (a-2), having a diorganopolysiloxane segment which contains at least one silicon atom bearing a hydrolyzable group and/or a hydroxyl group together with a radically polymerizable double bond linked with the diorganopolysiloxane segment via a linkage as shown in the above-described structural formula (S-III).

For the composite resin (C), representative examples of more concrete processes for preparing a composite resin (C) having an anionic group or a cationic group as a hydrophilic group by the above process (a) are processes (1), (2), and (3) as follows.

(1) A process in which polysiloxane (a-1) and polymer (b-1) having an acid group and/or a basic group together with a hydrolyzable group bonded to a silicon atom and/or a hydroxyl group bonded to a silicon atom, are condensed by a reaction of the hydrolyzable group bonded to a silicon atom or the hydroxyl group bonded to a silicon atom or both groups in polysiloxane (a-1) with the hydrolyzable group bonded to a silicon atom or the hydroxyl group bonded to a silicon atom or both groups in polymer (b-1), and thereafter the resulting condensate is partially or completely neutralized by a basic compound or an acidic compound.

(2) A process in which during the preparation of polysiloxane (a-1) in the presence of the above-mentioned polymer (b-1), a condensation reaction is brought about between the hydrolyzable group bonded to a silicon atom or the hydroxyl group bonded to a silicon atom or both groups in polysiloxane (a-1) and the hydrolyzable group bonded to a silicon atom or the hydroxyl group bonded to a silicon atom or both groups in polymer (b-1), and thereafter the resulting condensate is partially or completely neutralized by a basic compound or an acidic compound.

(3) A process in which during the preparation of polymer (b-1) in the presence of polysiloxane (a-1), a condensation reaction is brought about between the hydrolyzable group bonded to a silicon atom or the hydroxyl group bonded to a silicon atom or both groups in polysiloxane (a-1) and the hydrolyzable group bonded to a silicon atom or the hydroxyl group bonded to a silicon atom or both groups in polymer (b-1), and thereafter the resulting condensate is partially or completely neutralized by a basic compound or an acidic compound.

For the composite resin (C), a representative example of a more concrete process for preparing a composite resin (C) having an anionic group or a cationic group as a hydrophilic group by the above process (e) is the following (4):

(4) a process in which copolymer (b-2) is prepared by radical polymerization between polysiloxane (a-2) and a vinyl monomer comprising, as an essential component, a vinyl monomer having an acid group and/or a vinyl monomer having a basic group, and thereafter the resulting copolymer is partially or completely neutralized by a basic compound or an acidic compound.

In addition, for the composite resin (C), even more concrete examples of a process for preparing a composite resin (C) having only a non-ionic polyether chain as a hydrophilic group by the above process (a) are processes (5), (6), and (7) as follows.

(5) A process in which polysiloxane (a-1) and polymer (b-3) having a polyether chain together with a hydrolyzable group bonded to a silicon atom and/or a hydroxyl group bonded to a silicon atom, are condensed by a reaction of the hydrolyzable group bonded to a silicon atom or the hydroxyl group bonded to a silicon atom or both groups in polysiloxane (a-1) with the hydrolyzable group bonded to a silicon atom or the hydroxyl group bonded to a silicon atom or both groups in polymer (b-3).

(6) A process in which during the preparation of polysiloxane (a-1) in the presence of the above-mentioned polymer (b-3), a condensation reaction is brought about between the hydrolyzable group bonded to a silicon atom or the hydroxyl group bonded to a silicon atom or both groups in polysiloxane (a-1) and the hydrolyzable group bonded to a silicon atom or the hydroxyl group bonded to a silicon atom or both groups in polymer (b-3).

(7) A process in which during the preparation of polymer (b-3) in the presence of polysiloxane (a-1), a condensation reaction is brought about between the hydrolyzable group bonded to a silicon atom or the hydroxyl group bonded to a silicon atom or both groups in polysiloxane (a-1) and the hydrolyzable group bonded to a silicon atom or the hydroxyl group bonded to a silicon atom or both groups in polymer (b-3).

Moreover, for the composite resin (C), an even more concrete example of a process for preparing a composite resin (C) having only a non-ionic polyether chain as a hydrophilic group by the above process (e) is the following (8):

(8) a process in which radical polymerization is brought about between polysiloxane (a-2) and vinyl monomers comprising, as an essential component, a vinyl monomer having a polyether chain.

When a composite resin (C) which has a non-ionic polyether chain together with an anionic group and/or a cationic group as hydrophilic groups is prepared by the above process (a), it may be prepared by a process such as the following processes (9), (10), and (11), which are similar to the above processes (1), (2), and (3).

(9) A process in which polysiloxane (a-1) and polymer (b-4) having a polyether chain, an acid group and/or a basic group, and a hydrolyzable group bonded to a silicon atom and/or a hydroxyl group bonded to a silicon atom, are condensed by a reaction of the hydrolyzable group bonded to a silicon atom or the hydroxyl group bonded to a silicon atom or both groups in polysiloxane (a-1) with the hydrolyzable group bonded to a silicon atom or the hydroxyl group bonded to a silicon atom or both groups in polymer (b-4), and thereafter the resulting condensate is partially or completely neutralized by a basic compound or an acidic compound.

(10) A process in which during the preparation of polysiloxane (a-1) in the presence of the above-mentioned polymer (b-4), a condensation reaction is brought about between the hydrolyzable group bonded to a silicon atom or the hydroxyl group bonded to a silicon atom or both groups in polysiloxane (a-1) and the hydrolyzable group bonded to a silicon atom or the hydroxyl group bonded to a silicon atom or both groups in polymer (b-4), and thereafter the resulting condensate is partially or completely neutralized by a basic compound or an acidic compound.

(11) A process in which during the preparation of polymer (b-4) in the presence of polysiloxane (a-b), a condensation reaction is brought about between the hydrolyzable group bonded to a silicon atom or the hydroxyl group bonded to a silicon atom or both groups in polysiloxane (a-1) and the hydrolyzable group bonded to a silicon atom or the hydroxyl group bonded to a silicon atom or both groups in polymer (b-4), and thereafter the resulting condensate is partially or completely neutralized by a basic compound or an acidic compound.

When a composite resin (C) which has a non-ionic polyether chain together with an anionic group and/or a cationic group as hydrophilic groups is prepared by the above process (e), it may be prepared, for example, by the following process (12), which is a combination of processes (4) and (8).

(12) A process in which a copolymer is prepared by radical polymerization between polysiloxane (a-2) and vinyl monomers comprising, as an essential component, a vinyl monomer having an acid group and/or a vinyl monomer having a basic group, and thereafter the resulting copolymer is partially or completely neutralized by a basic compound or an acidic compound.

Concrete examples of an acid group which is introduced in polymer (b-1), (b-2), or (b-4), or in the copolymer prepared by process (12) are, in addition to the various acid groups described above, an acid anhydride group such as a carboxylic acid anhydride group, a phosphoric acid anhydride group, a sulfonic acid anhydride group, and mixed acid anhydride groups of a carboxylic acid and a sulfonic acid. Other concrete examples are blocked acid groups such as a silyl ester group, a tert-butyl ester group, and 1-alkoxyethyl ester group, which are blocked forms of acid groups such as a carboxyl group, a phosphoric acid group, an acid phosphate ester group, a phosphorus group, and a sulfonic group. Each blocked acid group can be easily converted to an acid group.

Among the above various acid groups, a carboxyl group, a blocked carboxyl group, or a carboxylic acid anhydride group is particularly preferable.

Concrete examples of a basic group which is introduced in polymer (b-1), (b-2), or (b-4), or in the copolymer prepared by process (12) are a primary amino group, a secondary amino group, a tertiary amino group, and a quaternary ammonium hydroxide. Among these various basic groups, a tertiary amino group is particularly preferable.

Representative examples of a polyether chain as a non-ionic group which is introduced in polymer (b-3) or (b-4), or in the copolymer prepared by process (8) or (12) are those various ones described above. However, among them, a polyether chain having oxyethylene units and/or oxypropylene units as repetitive units is particularly preferable from the point of hydrophilicity.

The polyether chain may have a reactive functional group such as a hydroxyl group and a carboxyl group at the terminal of the chain, or may have no reactive functional group by blocking the terminal of the chain with an alkoxy group such as a methoxy group and an ethoxy group. In the preparation of the above-described composite resin (C), the polymer having a hydrolyzable group bonded to a silicon atom and/or a hydroxyl group bonded to a silicon atom is used as the precursor for forming the polymer segment (B). Those hydrolyzable and hydroxyl groups are preferably introduced into the polymer as a silyl group bearing a hydroxyl group or various hydrolyzable groups which produce a hydroxyl group bonded to a silicon atom when hydrolyzed. The above described silyl group is represented by general formula (S-VI):

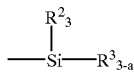

(S-VI)

(wherein $R^2$ denotes a monovalent organic group such as an alkyl group, a cycloalkyl group, an aryl group, and an aralkyl group; $R^3$ denotes a hydroxyl group or a hydrolyzable group such as a hydrogen atom, a halogen atom, an alkoxy group, a substituted alkoxy group, an acyloxy group, a phenoxy group, an isopropenyloxy group, and an iminoxy group; and a is an integer of 0, 1, or 2). As the silyl group, a so-called hydrolyzable silyl group, in which at least one $R^3$ is a hydrolyzable group, is particularly preferable. The silyl group is preferably bonded to the polymer by forming a covalent bond with a carbon atom.

A functional group other than those four types, namely, the acid group, the basic group, the hydrolyzable group bonded to a silicon atom, and the hydroxyl group bonded to a silicon atom, can be introduced into polymer (b-1), (b-2), (b-3), or (b-4), or the copolymer prepared by process (8) or (12). Representative examples of the functional group are those various ones described as ones which may be introduced into the polymer segment (B) described above. Among them, a hydroxyl group bonded to a carbon atom is particularly preferable.

Next, the above process (1), (2), (3), (5), (6), (7), (9), (10), and (11) for preparing the composite resin (C) will be explained in more detail.

There are various kinds of polymers as polymer (b-1), (b-3), or (b-4) which are prepared as a precursor of the polymer segment (B), as described above. Among them, a vinyl polymer or a polyurethane polymer is particularly preferable. Among vinyl polymers, an acrylic polymer is particularly preferable.

Any of known conventional processes may be employed for preparing the vinyl polymer of polymer (b-1), (b-3), or (b-4). Representative examples of the preparation process are the following processes (i), (ii), and (iii).

(i) A process in which vinyl monomer (m-1) having a hydrolyzable silyl group and vinyl monomer (m-2) having a polar group for imparting hydrophilicity are copolymerized, or in which both types (two types) of these vinyl monomers and other monomers (m-3) copolymerizable with these monomers are copolymerized.

(ii) A process in which the above.vinyl monomer (m-2) is polymerized, or monomer (m-2) and other monomers (m-3) copolymerizable with this monomer are copolymerized, in the presence of a chain transfer agent having a hydrolyzable silyl group and/or in the presence of a radical polymerization initiator having a hydrolyzable silyl group.

(iii) A process in which the above vinyl monomer (m-1) and the above monomer (m-2) are copolymerized in the presence of a chain transfer agent having a hydrolyzable silyl group and/or in the presence of a radical polymerization initiator having a hydrolyzable silyl group, or the above monomers (m-1) and (m-2) together with other monomers (m-3) copolymerizable with these monomers are copolymerized in the presence of a chain transfer agent having a hydrolyzable silyl group and/or in the presence of a radical polymerization initiator having a hydrolyzable silyl group.

Here, the above "polar group for imparting ydrophilicity" means a group to be introduced into polymer (b-1), (b-3), or (b-4) in order to prepare a water-base resin, such as an acid group, a basic group, and a polyether chain as a non-ionic group.

In order to prepare polymer (b-1), (b-3), or (b-4), the vinyl monomers having a polar group to be used in any of the above process (i) to (iii) may be a vinyl monomer having an acid group and/or a vinyl monomer having a basic group; a vinyl monomer having a polyether chain; a combination of a vinyl monomer having an acid group and/or a vinyl monomer having a basic group and a vinyl monomer having a polyether chain.

Among the above various vinyl polymers (b-1), (b-3), and (b-4), in order to prepare one having a functional group other than the four types of functional groups, namely, an acid group, a basic group, a hydrolyzable group bonded to a silicon atom, and a hydroxyl group bonded to a silicon atom, for example, vinyl monomer (m-4), may also be used in one of processes (i) to (iii) as a vinyl monomer to be copolymerized, in which vinyl monomer (m-4) has a functional group other than an acid group, a basic group, a hydrolyzable group bonded to a silicon atom, and a hydroxyl group bonded to a silicon atom.

Vinyl monomer (m-1) having the hydrolyzable silyl group to be used in the preparation of one of the above various polymers (b-1), (b-3), and (b-4) is a monomer having a hydrolyzable silyl group, as described by general formula (S-VI) shown above. Particularly representative examples of such a monomer are vinyltrimethoxysilane, vinyltriethoxysilane, vinylmethyldimethoxysilane, vinyltris (2-methoxyethoxy)silane, allyltrimethoxysilane, 2-trimethoxysilylethyl vinyl ether, 3-trimethoxysilylpropyl vinyl ether, 3-(methyldimethoxysilyl)propyl vinyl ether, 3-(meth)acryloyloxypropyltrimethoxysilane, 3-(meth) acryloyloxypropyltriethoxysilane, 3-(meth) acryloyloxypropylmethyldimethoxysilane, and 3-(meth) acryloyloxypropylmethyldichlorosilane.

The chain transfer agent having a hydrolyzable silyl group used in the preparation of polymer (b-1), (b-3), or (b-4), is a compound having the above-described hydrolyzable silyl group together with a group or an atom which can be activated by a free radical, such as a mercapto group, a chlorine atom, a bromine atom, and an iodine atom.

Particularly representative examples of the chain transfer agent are 3-mercaptopropyltrimethoxysilane, 3-mercaptopropyltriethoxysilane, 3-mercaptopropylmethyldimethoxysilane, 3-mercaptopropylmethyldichlorosilane, 3-bromopropyltrimethoxysilane, and 3-bromopropyltriethoxysilane.

The above radical polymerization initiator having a hydrolyzable silyl group used for preparation of polymer (b-1), (b-3), or (b-4) is a compound having a hydrolyzable silyl group, as described above, in its molecule. Particularly representative examples of such a compound are various azo compounds such as 2,2'-azobis-(2-methyl-4-trimethoxysilylbutyronitrile), 2,2'-azobis-(2-methyl-4-dimethoxymethylsilylbutyronitrile), or 2,2'-azobis-(2-methyl-4-diethoxymethylsilylbutyronitrile); and various peroxides such as tert-butyl peroxy-2,2-dimethyl-3-trimethoxysilylpropanoate, tert-butyl peroxy-2,2-dimethyl-3-triethoxysilylpropanoate, and tert-butyl peroxy-4-ethyl-5-trimethoxysilylhexanoate.

Among the vinyl monomers having an acid group as one of vinyl monomers (m-2) having a polar group, which can be used in the preparation of polymer (b-1) or (b-4), particularly representative examples of vinyl monomers having a free carboxyl group are various unsaturated carboxylic acids such as (meth)acrylic acid, 2-carboxyethyl (meth)acrylate, crotonic acid, itaconic acid, maleic acid, and fumaric acid; various monoester of saturated dicarboxylic acids and saturated monohydric alcohols (half esters), such as monomethyl itaconate, mono-n-butyl itaconate, monomethyl maleate, mono-n-butyl maleate, monomethyl fumarate, and mono-n-butyl fumarate; various monovinyl esters of saturated dicarboxylic acids, such as monovinyl adipate and monovinyl succinate; addition reaction products of hereinafter-described vinyl monomers containing a hydroxyl group attached to a carbon atom and various saturated polycarboxylic acid anhydrides, such as succinic anhydride, glutaric anhydride, phthalic anhydride, and trimellitic anhydride; and various monomers obtained by addition reaction of a monomer having a carboxyl group as described above with a lactone.

Among the monomers having an acid group as one of vinyl monomers (m-2) having a polar group, which can be used in the preparation of polymer (b-1) or (b-4), particularly representative examples of monomers having a blocked carboxyl group are various vinyl monomers having a silyl ester group, as those disclosed in Japanese Patent Application, First Publication (Kokai), No. Sho 62-254876, such as trimethylsilyl (meth)acrylate, dimethyl-tert-butylsilyl (meth)acrylate, and trimethylsilyl crotonate; various monomers having a hemiacetal ester group or a hemiketal ester group, as those disclosed in Japanese Patent Application, First Publication (Kokai), Hei 5-222134, such as 1-ethoxyethyl methacrylate, 2-methoxy-2-(meth)acryloyloxypropane, and 2-(meth)acryloyloxytetrahydrofuran; and monomers having a tert-butyl ester, such as tert-butyl (meth)acrylate and a tert-butyl crotonate.

Among the monomers having an acid group as one of vinyl monomers (m-2) having a polar group, which can be used in the preparation of polymer (b-1) or (b-4), particularly representative examples of monomers having a carboxylic anhydride group are various unsaturated polycarboxylic acid anhydrides such as maleic anhydride and itaconic anhydride; various unsaturated monocarboxylic acid anhydrides such as acrylic anhydride and methacrylic anhydride; and mixed acid anhydrides between one of various unsaturated carboxylic acids, such as acrylic acid and methacrylic acid, and one of various saturated carboxylic acids, such as acetic acid, propionic acid, and benzoic acid.

Among the vinyl monomers having a basic group as one of vinyl monomers (m-2) having a polar group, which can be used in the preparation of polymer (b-1) or (b-4), particularly representative examples of monomers having a tertiary amino group are various (meth)acrylic acid esters having a tertiary amino group, such as 2-dimethylaminoethyl (meth)acrylate, 2-diethylaminoethyl (meth)acrylate, 2-di-n-propylaminoethyl (meth)acrylate, 3-dimethylaminopropyl (meth)acrylate, 4-dimethylaminobutyl (meth)acrylate, and N-[2-(meth)acryloyloxy]ethylmorpholine; various aromatic vinyl monomers having a tertiary amino group, such as vinylpyridine, N-vinylcarbazole, and N-vinylquinoline; various (meth)acrylamides having a tertiary amino group, such as N-(2-dimethylamino)ethyl(meth)acrylamide, N-(2-diethylamino)ethyl(meth)acrylamide, and N-(2-di-n-propylamino)ethyl(meth)acrylamide; various crotonamides having a tertiary amino group, such as N-(2-dimethylamino)ethylcrotonamide and N-(4-dimethylamino)butylcrotonamide; and various vinyl ethers having a tertiary amino group, such as 2-dimethylaminoethyl vinyl ether, 2-diethylaminoethyl vinyl ether, and 4-dimethylaminobutyl vinyl ether.

The vinyl monomers having a polyether chain as one of vinyl monomers (m-2) having a polar group, which can be used in the preparation of polymer (b-3) or (b-4), may be various monomers such as (meth)acrylic esters, crotonic esters, itaconic esters, fumaric esters, and vinyl ethers, each having one of various types of polyester chains.

Particularly representative examples of the vinyl monomers having a polyether chain are various mono(meth)acrylic esters of various polyether diols, such as poly(ethylene glycol), poly(propylene glycol), or polyetherdiol having both oxyethylene unit and oxypropylene unit; and (meth)acrylic esters of various monoalkoxylated polyether diols, such as monomethoxylated poly(ethylene glycol), monomethoxylated poly(propylene glycol), or monomethoxylated polyether having both oxyethylene unit and oxypropylene unit.

From the point of water solubility or water dispersibility, the average molecular weight of the polyether chain itself contained in the monomer is preferably from about 200 to about 10,000, more preferably 400 to 8,000, and most preferably 600 to 6,000.

Into vinyl polymer (b-1), (b-3), or (b-4), one of various types of functional groups such as a hydroxyl group bonded to a carbon atom, a blocked hydroxyl group, a cyclocarbonate group, an epoxy group, a primary amide group, a secondary amide group, a carbamate group, and a functional group represented by structural formula (S-V) may be introduced as a functional group other than the four types of functional groups, namely, an acid group, a basic group, a hydrolyzable group bonded to a silicon atom, and a hydroxyl group bonded to a silicon atom.

When introducing such a functional group by one of various types of processes as in (i) to (iii) described above, a vinyl monomer having one of various types of such functional groups is used. Among such vinyl monomers, particularly representative examples of vinyl monomers having a hydroxyl group bonded to a carbon atom are hydroxyalkyl (meth)acrylates such as 2-hydroxyethyl (meth)acrylate, 2-hydroxypropyl (meth)acrylate, and 4-hydroxybutyl (meth)acrylate; vinyl ethers having a hydroxyl group, such as 2-hydroxyethyl vinyl ether and 4-hydroxybutyl vinyl ether; allyl ethers having a hydroxyl group, such as 2-hydoxyethyl allyl ether and 2-hydroxybutyl allyl ether; addition products between the above-described various monomers having a hydroxyl group and various lactones represented by ϵ-caprolactone.

Particularly representative examples of the other copolymerizable vinyl monomers (m-3), which is used in the preparation of vinyl polymer (b-1), (b-3), or (b-4) according to one of processes (i) to (iii) described above, are various esters between a $C_1$ to $C_{22}$ primary or secondary alkyl alcohol and a (meth)acrylic acid, such as methyl (meth)acrylate, ethyl (meth)acrylate, n-propyl (meth)acrylate, n-butyl (meth)acrylate, isobutyl (meth)acrylate, 2-ethylhexyl (meth)acrylate, and lauryl (meth)acrylate; various aralkyl (meth)acrylates such as benzyl (meth)acrylate and 2-phenylethyl (meth)acrylate; various cycloalkyl (meth)acrylates such as cyclohexyl (meth)acrylate and isobornyl (meth)acrylate; various ω-alkoxyalkyl (meth)acrylates such as 2-methoxyethyl (meth)acrylate and 4-methoxybutyl (meth)acrylate; various aromatic vinyl monomers such as styrene, p-tert-butylstyrene, α-methylstyrene, and vinyltoluene; various vinyl esters of carboxylic acids, such as vinyl acetate, vinyl propionate, vinyl pivalate, vinyl versate, and vinyl benzoate; various alkyl esters of crotonic acid, such as methyl crotonate and ethyl crotonate; various dialkyl esters of unsaturated dibasic acids, such as dimethyl maleate, di-n-butyl maleate, dimethyl fumarate, di-n-butyl fumarate, dimethyl itaconate, and di-n-butyl itaconate; various monomers having a cyano group, such as (meth)acrylonitrile and crotononitrile; various fluoroolefins such as vinyl fluoride, vinylidene fluoride, tetrafluoroethylene, chlorotrifluoroethylene, and hexafluoropropylene; various chlorinated olefins such as vinyl chloride and vinylidene chloride; various α-olefins such as ethylene and propylene; various alkyl vinyl ethers such as ethyl vinyl ether, n-butyl vinyl ether, and n-hexyl vinyl ether; various cycloalkyl vinyl ethers such as cyclopentyl vinyl ether, cyclohexyl vinyl ether, and 4-methylcyclohexyl vinyl ether; and monomers having a tertiary amide group, such as N,N-dimethyl(meth)acrylamide, N-(meth)acryloylmorpholine, N-(meth)acryloylpyrrolidone and N-vinylpyrrolidone.

In order to prepare vinyl polymer (b-1), (b-3), or (b-4), using the above-described various monomers, various known conventional polymerization method can be employed such as the solution polymerization method, the non-aqueous dispersion polymerization method or the bulk polymerization method. Among these methods, the solution radical polymerization method performed in an organic solvent is most convenient and preferable.

As a polymerization initiator for the solution radical polymerization method, various known conventional compound may be used. Particularly representative examples of such compounds are various azo compounds such as 2,2'-azobis(isobutyronitrile), 2,2'-azobis(2,4-dimethylvaleronitrile), and 2,2'-azobis(2-methylbutyronitrile); and various peroxides such as tert-butyl peroxypivalate, tert-butyl peroxybenzoate, tert-butyl peroxy-2-ethylhexanoate, di-tert-butyl peroxide, cumene hydroperoxide, and diisopropyl peroxycarbonate.

As the organic solvent for the solution radical polymerization method, any known conventional organic solvents may be used. Moreover, one of these solvents may be used alone, or two or more of them may be used together.

Among these, particularly representative examples are aliphatic or alicyclic hydrocarbons, such as n-hexane, n-heptane, n-octane, cyclohexane, and cyclopentane; aromatic hydrocarbons such as toluene, xylene, and ethylbenzene; various esters such as ethyl acetate, n-butyl acetate, n-amyl acetate, ethylene glycol monomethyl ether acetate, ethylene glycol monoethyl ether acetate, and ethylene glycol monobutyl ether acetate; various alcohols such as methanol, ethanol, iso-propanol, n-butanol, iso-butanol, ethylene glycol monomethyl ether, ethylene glycol monoethyl ether, ethylene glycol mono-n-butyl ether, propylene glycol monomethyl ether, and propylene glycol mono-n-propyl ether; various ketones such as acetone, methyl ethyl ketone, methyl isobutyl ketone, methyl n-amyl ketone, and cyclohexanone; ethers such as dimethoxyethane, tetrahydrofuran, and dioxane; and other solvents such as N-methylpyrrolidone, dimethylformamide, dimethylacetamide, and ethylene carbonate.

When preparing vinyl polymer (b-1) or (b-4), care should be taken since gelation may occur during polymerization if a large amount of the monomer having an acid group or a basic group is used.

In order to prevent such gelation, a hydrolyzable ester compound such as ethyl orthoacetate, ethyl ortho-n-butyrate, ethyl orthoformate, ethyl orthopropionate, and methyl orthoformate may be used together with the above-described solvent.

By using the above-cited monomers, polymerization initiators, and organic solvents, and by applying a known conventional solution radical polymerization method, various vinyl polymers (b-1), (b-3), or (b-4) as desired can be prepared.

A suitable amount of hydrolyzable silyl group to be introduced into vinyl polymer (b-1), (b-3), or (b-4), which is expressed by the number of moles of the hydrolyzable silyl group per 1,000 grams of the solids content of the polymer, is in the range of about 0.005 to about 3 moles, preferably 0.01 to 2 moles, and more preferably 0.05 to 1 mole.

In the case where the amount is less than about 0.005 mole, it is unavoidable that durability, in particular, and other properties of a cured material obtained from the water-base curable composition according to the present invention are degraded. On the other hand, in the case where the amount is too large, exceeding about 3 moles, the viscosity of the reaction solution increases during the preparation of composite resin (C), and some inconveniences such as gelation may finally arise. Accordingly, neither case is preferable.

Accordingly, in order to allow the above-described preferable amount of the hydrolyzable silyl group to be introduced, it is necessary that the amount used of the monomer having the hydrolyzable silyl group, the chain transfer agent having the hydrolyzable silyl group, and the polymerization initiator having the hydrolyzable silyl group be properly chosen.

A suitable amount of the acid group or the basic group to be introduced into these vinyl polymers (b-1) and (b-4), expressed by the number of moles of the acid group or the basic group per 1,000 grams of the solids content of the polymer, is in the range of about 0.1 mole to about 10 moles, preferably 0.2 to 5 moles, and most preferably 0.3 to 3 moles.

Accordingly, in order to allow the above-described preferable amount of the acid group or the basic group to be introduced, it is necessary that the amount used of the vinyl monomer having the acid group or the vinyl monomer having the basic group be properly chosen.

A suitable amount of the polyether chain to be introduced into vinyl polymer (b-3) or (b-4), expressed by the weight of the polyether chain per 1,000 grams of the solids content of the polymer, is in the range of about 10 grams to about 990 grams, preferably 20 to 900 grams, and most preferably 40 to 800 grams.

Accordingly, in order to allow the above-described preferable amount of the polyether chain to be introduced, it is necessary that the amount used of the vinyl monomer having the polyether chain be properly chosen.

A suitable amount of the hydroxyl group to be introduced into vinyl polymer (b-1), (b-3), or (b-4), the hydroxyl group being bonded to a carbon atom, the amount being expressed by the number of moles of the functional group per 1,000 grams of the solids content of vinyl polymer (b-1), (b-3), or (b-4), is in the range of about 0.1 mole to about 5 moles, preferably 0.2 to 3 moles, and more preferably 0.3 to 2 moles.

A suitable number-average molecular weight of vinyl polymer (b-1), (b-3), or (b-4) is in the range of about 500 to about 200,000, preferably 1,000 to 50,000, and more preferably 1,500 to 20,000.

In the case where the number-average molecular weight of vinyl polymer (b-1), (b-3), or (b-4) is less than about 500, it is unavoidable that curability and mechanical strength of the cured material are degraded. On the other hand, in the case where the number-average molecular weight is too high, exceeding about 200,000, it is unavoidable that the nonvolatile contents of the water-base curable resin composition according to the present invention are remarkably reduced, painting operation becomes difficult, or the appearance of the cured coating film becomes poor. Accordingly, neither case is preferable.

As vinyl polymer (b-1), (b-3), or (b-4), resins such as a polyester resin and an alkyd resin, to which a vinyl polymer segment is grafted, may be used. Those grafted resins are prepared by performing polymerization according to one of the processes (i) to (iii) described above in the presence of a polymerizable unsaturated double bond-containing polymer other than a vinyl polymer exemplified by a polyester resin and an alkyd resin.

In order to prepare the polyurethane polymer among polymers (b-1), a method such as those described in Japanese Patent Application, First Publication (Kokai), No. Sho 51-90391, Japanese Patent Application, First Publication (Kokai), No. Sho 55-73729, and Japanese Patent Application, First Publication (Kokai), No. Sho 60-255817 may be employed in which, in addition to one of various types of dihydroxy compounds and one of various types of diisocyanate compounds, a diamine compound having a hydrolyzable silyl group or a monoamine compound having a hydrolyzable compound (hereinafter referred to as an "amine compound having a hydrolyzable silyl group") is used as a raw material component for introducing a hydrolyzable silyl group. In addition, one of various types of known conventional raw material components is used, that is, a compound having both an acid group and a hydroxyl group, such as dimethylolpropionic acid and dimethylolbutanoic acid (hereinafter referred to as a "compound having both an acid group and a hydroxyl group"), is used as a raw material component for introducing an acid group, or a compound having both a basic group and a hydroxyl group, such as N-methyldiethanolamine and N,N-dimethylethanolamine (hereinafter referred to as a "compound having both a basic group and a hydroxyl group"), is used as a material component for introducing a basic group.

In order to prepare the polyurethane polymer among polymers (b-3), one of various types of known conventional methods may be employed in which, in addition to one of various types of dihydroxy compounds and one of various types of diisocyanate compounds, an amine compound having a hydrolyzable silyl group is used as a raw material component for introducing a hydrolyzable silyl group. In addition, one of various types of known conventional raw material components, such as a polyether compound having a single group containing an active hydrogen at one end of the compound, such as methoxypolyethylene glycol and methoxypolypropylene glycol, is used as a raw material component for introducing a polyether chain.

In order to prepare the polyurethane polymer of polymers (b-4), one of various types of known conventional methods may be employed in which, in addition to one of various types of dihydroxy compounds and one of various types of diisocyanate compounds, one of various types of known conventional raw material components is used. Examples of such raw material components are an amine compound having a hydrolyzable silyl group as described above, a polyether compound having a single group containing an active hydrogen at one end of the compound as described above, and a compound having both an acid group and a hydroxyl group as described above or a compound having both a basic group and a hydroxyl group as described above.

In order to prepare the polyurethane polymer, among polymers (b-1), (b-3), or (b-4), having a hydroxyl group bonded to a carbon atom as a functional group other than the four types of functional groups, namely, an acid group, a basic group, a hydrolyzable group bonded to a silicon atom, and a hydroxyl group bonded to a silicon atom, a method may be employed in which, for example, the proportions of the raw material components used are so chosen that the amount of the hydroxyl group is excessive in the above-described preparation method, or a polyurethane resin into which the carboxyl group is introduced in advance is reacted with a monoepoxy compound.

A suitable amount of the hydrolyzable silyl group to be introduced into polyurethane polymer (b-1), (b-3), or (b-4) prepared by the above-described method is in the range of about 0.005 mole to about 3 moles, preferably 0.01 to 2 moles, and more preferably 0.05 to 1 mole, per 1,000 grams of the solids content of the polymer.

In the case where the amount is less than about 0.005 mole, it is unavoidable that the progress of the condensation reaction between polyurethane polymer (b-1), (b-3), or (b-4) and polysiloxane (a-1) is hindered, and that durability, in particular, and other properties of a cured material obtained tend to be degraded. On the other hand, in the case where the amount is too large, exceeding about 3 moles, the viscosity of the reaction solution tends to increase in the above-described reaction of the formation of the composite resin, and some inconveniences such as gelation may finally arise. Accordingly, neither case is preferable.

A suitable amount of the acid group or the basic group to be introduced into polyurethane polymer (b-1) or (b-4), expressed by the number of moles of the acid group or the basic group per 1,000 grams of the solids content of the polymer, is in the range of about 0.1 mole to about 10 moles, preferably 0.2 to 5 moles, and most preferably 0.3 to 3 moles.

A suitable amount of the polyether chain to be introduced into polyurethane polymer (b-3) or (b-4), expressed by the weight of the polyether chain per 1,000 grams of the solids content of the polymer, is in the range of about 10 grams to about 990 grams, preferably 20 to 900 grams, and most preferably 40 to 800 grams.

A suitable amount of the hydroxyl group to be introduced into polyurethane polymer (b-1), (b-3), or (b-4), the hydroxyl group being bonded to a carbon atom, the amount expressed by the number of moles of the functional group per 1,000 grams of the solids content of polyurethane polymer (b-1), (b-3), or (b-4), is in the range of about 0.1 mole to about 5 moles, preferably 0.2 to 3 moles, and more preferably 0.3 to 2 moles.

A suitable number-average molecular weight of polyurethane polymer (b-1), (b-3), or (b-4) is in the range of about 500 to about 100,000, preferably 1,000 to 50,000, and more preferably 1,500 to 30,000.

In the case where the number-average molecular weight of polyurethane polymer (b-1), (b-3), or (b-4) is less than about 500, it is unavoidable that curability, in particular, and the other properties of the water-base curable resin composition according to the present invention, and mechanical strength of the cured material are degraded. On the other hand, in the case where the number-average molecular weight is too high, exceeding about 100,000, it is unavoidable that the nonvolatile contents of the water-base curable resin composition according to the present invention are remarkably reduced, painting operation becomes difficult, or the appearance of the cured coating film becomes poor. Accordingly, neither case is preferable.

Next, polysiloxane (a-1), which is another constituent of the composite resin (C) according to the above-described process (1), (2), (3), (5), (6), (7), (9), (10), or (11) will be described in detail.

Polysiloxane (a-1) has at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group.

The above-described various silicon atoms contained in polysiloxane (a-1) are explained in detail in the description of the polysiloxane segment (A).

Representative examples of polysiloxane (a-1) are hydrolysis-condensation products of silane compounds (s-1) or mixtures (s-2) of silane compounds, which may be prepared by conducting hydrolysis-condensation of the following silane compounds (s-1) or mixtures (s-2) of silane compounds, or partial hydrolysis-condensation products of these silane compounds, which may be prepared by conducting partial hydrolysis-condensation of these silane compounds.

(s-1): At least one silane compound selected from the group consisting of a trifunctional silane compound, having one organic group having a total carbon number of at least 3 and three hydrolyzable groups, and a difunctional silane compound, having two organic groups and two hydrolyzable groups.

(s-2): A mixture of at least one silane compound selected from the group consisting of a trifunctional silane compound having one organic group having a total carbon number of at least 3 together with three hydrolyzable groups, and a difunctional silane compound having two organic groups together with two hydrolyzable groups, and a monofunctional silane compound having three organic groups together with a hydrolyzable group.

As the trifunctional silane compound, having an rganic group having a total carbon number of at least 3 together with three hydrolyzable groups, any one of various known conventional compounds may be used, among which particularly representative examples are silane compounds which are represented by the following general formula (S-VII):

$$R^4SiR^5_3 \tag{S-VII}$$

(wherein $R^4$ denotes an organic group having a total carbon number of at least 3, and $R^5$ denotes a hydrolyzable group such as a hydrogen atom, a halogen atom, an alkoxy group, a substituted alkoxy group, an acyloxy group, a phenoxy group, an iminoxy group, and isopropenyloxy group).

Here, the organic group $R^4$ in general formula (S-VII), having a total carbon number of at least three, is one of those various types explained in the description the polysiloxane segment (A).

Representative examples of the silicon compounds represented by the above general formula (S-VII) are $C_3$ to $C_{18}$ alkyltrialkoxysilanes such as n-propyltrimethoxysilane, n-propyltriethoxysilane, i-propyltrimethoxysilane, i-propyltriethoxysilane, n-butyltrimethoxysilane, n-butyltriethoxysilane, i-butyltrimethoxysilane, i-butyltriethoxysilane, tert-butyltrimethoxysilane, tert-butyltriethoxysilane, n-pentyltrimethoxysilane, n-pentyltriethoxysilane, n-hexyltrimethoxysilane, n-hexyltriethoxysilane, n-octyltrimethoxysilane, n-octyltriethoxysilane, n-hexadecyltrimethoxysilane, and n-octadecyltrimethoxysilane; substituted alkyltrialkoxysilanes such as 3-glycidoxypropyltrimethoxysilane, 3-methacryloxypropyltrimethoxysilane, 3-ureidopropyltrimethoxysilane, and β-(3,4-epoxycyclohexyl)ethyltrimethoxysilane; cycloalkyltrialkoxysilanes such as cyclopentyltrimethoxysilane, cyclohexyltrimethoxysilane, and cyclohexyltriethoxysilane; phenyltrialkoxysilanes such as phenyltrimethoxysilane and phenyltriethoxysilane; various monoorganotrichlorosilanes such as n-propyltrichlorosilane, n-butyltrichlorosilane, i-butyltrichlorosilane, n-hexyltrichlorosilane, cyclohexyltrichlorosilane, cyclohexylmethyltrichlorosilane, and phenyltrichlorosilane; and various monoorganotriacetoxysilanes such as n-propyltriacetoxysilane, n-butyltriacetoxysilane, i-butyltriacetoxysilane, n-hexyltriacetoxysilane, cyclohexyltriacetoxysilane, and phenyltriacetoxysilane.

Among the above various trifunctional silane compounds, a compound having a $C_3$ to $C_{18}$ alkyl, cycloalkyl, or aryl group as the organic group is preferably used as a main component in the preparation of polysiloxane (a-1). Among these compounds, trifunctional silanes having an i-butyl group, a cyclohexyl group, or a phenyl group as the organic group are particularly preferable.

As the difunctional silane compound having two organic groups together with two hydrolyzable groups, which is used in the preparation of the above polysiloxane (a-1), any one of various known conventional compounds may be used, among which particularly representative examples are silane compounds which are represented by the following general formula (S-VIII):

(S-VIII)

(wherein $R^6$ or $R^7$ denotes an organic group such as an alkyl group, a cycloalkyl group, an alkyl group substituted with a cycloalkyl group, an aryl group, and an aralkyl group, and $R^8$ denotes a hydrolyzable group such as a hydrogen atom, a halogen atom, an alkoxy group, a substituted alkoxy group, an acyloxy group, a phenoxy group, an iminoxy group, and isopropenyloxy group).

Particularly representative examples of the silicon compounds represented by the above general formula (S-VIII) are various diorganodialkoxysilanes such as dimethyldimethoxysilane, dimethyldiethoxysilane, diethyldimethoxysilane, di-iso-butyldimethoxysilane, dicyclohexyldimethoxysilane, diphenyldimethoxysilane, methylethyldimethoxysilane, methyl-iso-butyldimethoxysilane, methylcyclohexyldimethoxysilane, methylphenyldimethoxysilane, methylphenyldiethoxysilane, vinylmethyldimethoxysilane, and 3-(meth)acryloyloxypropylmethyldimethoxysilane; various diorganodichlorosilanes such as dimethyldichlorosilane, diethyldichlorosilane, di-iso-butyldichlorosilane, dicyclohexyldichlorosilane, diphenyldichlorosilane, methylethyldichlorosilane, methyl-iso-butyldichlorosilane, methylcyclohexyldichlorosilane, and methylphenyldichlorosilane; and various diorganodiacetoxysilanes such as dimethyldiacetoxysilane, diethyldiacetoxysilane, di-iso-butyldiacetoxysilane, dicyclohexyldiacetoxysilane, diphenyldiacetoxysilane, methylethyldiacetoxysilane, methyl-iso-butyldiacetoxysilane, methylcyclohexyldiacetoxysilane, and methylphenyldiacetoxysilane.

Among these difunctional silane compounds, dimethyldialkoxysilane, dimethyldichlorosilane, methylphenyldialkoxysilane, methylphenyldichlorosilane, diphenyldialkoxysilane, or diphenyldichlorosilane is particularly preferable from a practical viewpoint.

As the monofunctional silane compound, having three organic groups together with a hydrolyzable group, which is used in the preparation of the above polysiloxane (a-1), any one of various known conventional compounds may be used, among which particularly representative examples are silane compounds which are represented by the following general formula (S-IX):

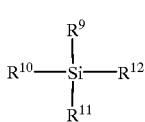

(S-IX)

(wherein $R^9$, $R^{10}$, or $R^{11}$ denotes an organic group such as an alkyl group, a cycloalkyl group, an alkyl group substituted with a cycloalkyl group, an aryl group, and an aralkyl group, and $R^{12}$ denotes a hydrolyzable group such as a hydrogen atom, a halogen atom, an alkoxy group, a substituted alkoxy group, an acyloxy group, a phenoxy group, an iminoxy group, and isopropenyloxy group).

Particularly representative examples of the silicon compounds represented by the above general formula (S-IX) are various triorganomonoalkoxysilanes such as trimethylmethoxysilane, trimethylethoxysilane, triethylmethoxysilane, dimethyl-iso-butylmethoxysilane, dimethyl-tert-butylmethoxysilane, dimethylcyclohexylmethoxysilane, and dimethylphenylmethoxysilane; various triorganomonochlorosilanes such as trimethylchlorosilane, triethylchlorosilane, dimethyl-iso-butylchlorosilane, dimethylcyclohexylchlorosilane, and dimethylphenylchlorosilane; and various triorganomonoacetoxysilanes such as trimethylacetoxysilane, triethylacetoxysilane, dimethyl-iso-butylacetoxysilane, dimethylcyclohexylacetoxysilane, and dimethylphenylacetoxysilane.

Among these monofunctional silane compounds, a particularly preferable compound to be used in the preparation of polysiloxane (a-1) is trimethylmonoalkoxysilane or trimethylchlorosilane from a practical viewpoint.

When preparing polysiloxane (a-1) from the above-described various silane compounds, the silane compounds to be used may be those comprising as main components a monoorganosilane compound represented by the above-described general formula (S-II) and/or a diorganosilane compound represented by the above-described general formula (S-VIII), or those comprising as a main component a mixture of at least one silane compound, selected from monoorganosilane compounds represented by the above-described general formula (S-VII) and diorganosilane compounds represented by the above-described general formula (S-VIII), and a triorganosilane compound represented by the above-described general formula (S-IX).

Among the above-described various silane compounds, examples of the most preferable ones for the preparation of polysiloxane (a-1) are monoorganotrialkoxysilanes, diorganodialkoxysilanes, and triorganomonoalkoxysilanes.

For preparing polysiloxane (a-1), in addition to the various silane compounds as cited above, a trifunctional silane, having one methyl group or one ethyl group together with three hydrolyzable groups, and being explained hereinbelow as a compound which can be used in the preparation of polysiloxane (D), such as methyltrimethoxysilane, methyltriethoxysilane, ethyltrimethoxysilane, and ethyltriethoxysilane, may be used in an amount which does not reduce the effects of the present invention, for example, in a proportion less than 20 mol %.

By conducting hydrolysis-condensation or partial hydrolysis-condensation of the above-cited various silicon compounds, a hydrolysis-condensation product or a partial hydrolysis-condensation product, which is to be used as polysiloxane (a-1), can be obtained. In this operation, a catalyst may or may not be used. However, it is preferable to use a catalyst so that these condensation reactions proceed easily.

Here, when a catalyst is used, any one of various known conventional catalysts may be used, and a catalyst may be used alone, or two or more catalysts may be used together.

Particularly representative examples of such catalysts are inorganic acids such as hydrochloric acid, sulfuric acid, and phosphoric acid; organic acids such as p-toluenesulfonic acid, monoisopropyl phosphate, and acetic acid; inorganic bases such as sodium hydroxide and potassium hydroxide; titanate esters such as tetraisopropyl titanate and tetrabutyl titanate; carboxylate salts of tin, such as dibutyl tin dilaurate and tin octoate; various compounds having a basic nitrogen atom, such as 1,8-diazabicyclo[5.4.0]undecene-7 (DBU), 1,5-diazabicyclo[4.3.0]nonene-5 (DBN), 1,4-diazabicyclo[2.2.2]octane (DABCO), tri-n-butylamine, dimethylbenzylamine, monoethanolamine, imidazole, and 1-methylimidazole; and quaternary ammonium salts having, as counter anions, chlorides, bromides, carboxylates, or hydroxides, such as tetramethylammonium salt, tetrabutyl ammonium salt, and dilauryldimethylammonium salt.

A suitable amount of the catalyst used is in the range of about 0.000001% by weight to about 10% by weight, preferably 0.000005% to 5% by weight, and more preferably 0.00001% to 1% by weight, with respect to the weight of the silane compound to be subjected to the hydrolysis-condensation or the partial hydrolysis-condensation.

A suitable amount of water used in the hydrolysis reaction or the partial hydrolysis reaction is at least about 0.05 mole, preferably at least 0.1 mole, and more preferably at least 0.2 mole per 1 mole of the hydrolyzable group bonded to the silicon atom of the silane compound.

An amount less than 0.05 mole is not preferable in practical use since the rate of hydrolysis becomes remarkably low. However, an excess amount of water used for 1 mole of the hydrolyzable group bonded to the silicone atom, for example, 5 moles or 10 moles, is not at all obstructive.

A suitable reaction temperature for this reaction is about 0° C. to about 150° C., and preferably 20° C. to 100° C.

If the alcohol or water, either of which is a by-product of this reaction, hinders the condensation reaction which is subsequently conducted between one of polymers (b-1) to (b-4) and polysiloxane (a-1), or degrades storage stability of the water-base resin obtained, it may be removed from the reaction system by one of various types of known conventional means, such as distillation. If there is no such problem, keeping the alcohol or water in the reaction system is not at all obstructive.

In this reaction, an organic solvent may or may not be used. However, in order to make stirring easier, it is preferable to use an organic solvent.

When an organic solvent is used, any one of various known conventional organic solvents may be used, and an organic solvent may be used alone, or two or more organic solvents may be used together.

Various compounds as cited above as compounds used in the preparation of vinyl polymer (b-1), (b-3), or (b-4) may be used as the organic solvent in this case.

Next, among various processes for preparing the composite resin (C), which is a precursor of the water-base resin (W) of the present invention, processes (1), (5), and (9) will be described in detail.

In these processes, the composite resin (C) is prepared by conducting a condensation reaction between polymer (b-1), (b-3), or (b-4), prepared in advance, and polysiloxane (a-1).

Here, in order to make the condensation reaction between polymer (b-1), (b-3), or (b-4) and polysiloxane (a-1) proceed smoothly, a catalyst may be added. As such a catalyst, one of various catalysts cited hereinabove, which may be used in the preparation of polysiloxane (a-1), may be used.

A suitable amount of the catalyst used for forming a composite resin according to process (1), (5), or (9) is in the range of about 0.0001% to about 10% by weight, preferably 0.0005% to 3% by weight, and more preferably 0.0005% to 1% by weight, with respect to the total weight of polymer (b-1), (b-3), or (b-4) and polysiloxane (a-1).

In the case where the catalyst used in the process of preparing polysiloxane (a-1) remains in this (a-1), the condensation reaction may be promoted without adding more catalyst.

In these processes, in order to make the condensation reaction between polymer (b-1), (b-3), or (b-4) and polysiloxane (a-1) proceed smoothly, it is desirable to make the hydrolysis reaction of the hydrolyzable silyl group in polymer (b-1), (b-3), or (b-4), and the hydrolysis reaction of the hydrolyzable group bonded to a silicon atom, which may exist in polysiloxane (a-1) in some cases, proceed smoothly. Accordingly, it is particularly desirable that the condensation reaction be conducted in the presence of water.

In the case where water used in the process of preparing polysiloxane (a-1) remains in this (a-1), the condensation reaction may be conducted without adding more water.

A suitable amount of water used in conducting this condensation reaction is at least about 0.05 mole, preferably at least 0.1 mole, and more preferably at least 0.5 mole, per 1 mole of the total amount of the hydrolyzable group in the hydrolyzable silyl group bonded to polymer (b-1), (b-3), or (b-4), and the hydrolyzable group bonded to silicon atom contained in polysiloxane (a-1).

An amount less than 0.05 mole is not preferable, since in this case the rate of hydrolysis becomes remarkably low.

The use of greatly excessive amounts of water, with which the reaction to form the composite can be conducted, is not obstructive as long as any inconvenience such as precipitation of an insoluble substance during reaction does not occur. However, in the case where there is a hydrolyzable group bonded to a silicon atom in polysiloxane (a-1), a suitable amount of water used per 1 mole of the hydrolyzable group in polysiloxane (a-1) is approximately 10 moles or less, preferably 5 moles or less, and more preferably 3.5 moles or less. In the case where there is no hydrolyzable group bonded to a silicon atom in polysiloxane (a-1), a suitable amount of water used per 1 mole of the hydrolyzable group in the hydrolyzable silyl group bonded to polymer (b-1), (b-3), or (b-4) is about 500 moles or less, preferably 300 moles or less, and more preferably 200 moles or less.

A suitable reaction temperature for conducting the condensation reaction according to this process is 0° C. to 150° C., and preferably 20° C. to 100° C.

Various basic compounds may be used in order to partially or completely neutralize the acid group in the condensation reaction product obtained by process (1) or (9).

Various compounds as described above may be used as the basic compound. Among such compounds, ammonia and various organic amines are particularly preferable.

Various acidic compounds may be used in order to partially or completely neutralize the basic group in the condensation reaction product obtained by process (1) or (9).

Various compounds as described above may be used as the acidic compound. Among such compounds, carboxylic acids are particularly preferable.

The amount of the basic compound or acidic compound added should be such an amount that at least water dispersibility can be imparted to the condensation reaction products of polymer (b-1) or (b-4) with polysiloxane (a-1). A suitable amount, expressed by a ratio of the equivalent of the basic compound or acidic compound to the equivalent of the acid group or basic group in the condensation reaction product, that is, an equivalent ratio expressed by:

[Basic or acidic compound]/[Acid or basic group in condensation reaction product of polymer (b-1) or (b-4) with polysiloxane (a-1)]

is at least about 0.1, preferably approximately in the range of 0.1 to 3, and most preferably in the range of 0.3 to 2.

A suitable reaction temperature for such a neutralization reaction is about 0° C. to 150° C., and more preferably 20° C. to 100° C.

Next, among various processes for preparing the composite resin (C), which is a precursor of the water-base resin (W) of the present invention, the above-cited processes (2), (6), and (10) will be described in detail.

Processes (2), (6), and (10) are those in which a condensation reaction is brought about between polysiloxane (a-1) and polymer (b-1), (b-3), or (b-4) during preparation of polysiloxane (a-1) in the presence of polymer (b-1), (b-3), or (b-4).

That is, a condensate between polysiloxane (a-1) and polymer (b-1), (b-3), or (b-4) is prepared in the presence of polymer (b-1), (b-3), or (b-4), respectively, by hydrolyzing at least one silane compound selected from silane compounds of the above general formulae (S-VII) and (S-VIII), or by hydrolyzing a mixture of at least one silane compound selected from silane compounds of the above general formulae (S-VII) and (S-VIII) and a silane compound of the above general formula (S-IX).

In process (2) or (10), the composite resin (C) is prepared by partially or completely neutralizing the acid group or basic group in the condensation reaction product obtained by the above condensation reaction, with a basic compound or an acidic compound.

In the preparation of the composite resin (C) according to the above-described process (2), (6), or (10), a catalyst for promoting the hydrolysis-condensation of the silane compound may or may not be used. However, it is preferable to use a catalyst as described above in order to make the hydrolysis-condensation of the silane compound proceed rapidly, and to make the condensation reaction between the produced (a-1) and polymer (b-1), (b-3), or (b-4) proceed smoothly.

A suitable amount of the catalyst used is in the range of about 0.000001% to about 10% by weight, preferably 0.000005% to 5% by weight, and more preferably 0.0001% to 1% by weight, with respect to the weight of the silane compound which is a raw material for polysiloxane (a-1).

In process (2), (6), or (10), the reaction is generally conducted in the presence of water in order to make the hydrolysis reaction of the silane compound, which is a raw material for polysiloxane (a-1), proceed smoothly, and in order to make the condensation reaction between the produced polysiloxane (a-1) and polymer (b-1), (b-3), or (b-4) proceed smoothly. In this case, a suitable amount of water used is at least about 0.05 mole, preferably at least 0.1 mole, and more preferably at least 0.5 mole, per 1 mole of the total amount of the hydrolyzable group in the hydrolyzable silyl group bonded to polymer (b-1), (b-3), or (b-4), and the hydrolyzable group bonded to silicon atom contained in the silicon compound.

An amount less than 0.05 mole is not preferable, since in this case the rate of hydrolysis becomes remarkably low.

The use of greatly excessive amounts of water, with which the condensation reaction can be conducted, is not obstructive as long as any inconvenience such as precipitation of an insoluble substance during reaction does not occur. However, a suitable amount of water to be used per 1 mole of the above-described total amount of hydrolyzable groups is approximately 10 moles or less, preferably 5 moles or less, and more preferably 3.5 moles or less.

A suitable reaction temperature for conducting the condensation reaction according to process (2), (6), or (10) is 0° C. to 150° C., and preferably 20° C. to 100° C.

In the above-described process (2) or (10), as a basic or acidic compound for neutralizing the acid group or basic group in the condensate, various compounds cited for use in the above-described process (1) or (9) may be used.

Reaction conditions for the neutralization reaction, such as the amount of the basic or acidic compound used, are in accord with those in the case of the above process (1) or (9).

Processes (3), (7), and (11) are processes in which a condensation reaction is brought about between polysiloxane (a-1) and polymer (b-1), (b-3), or (b-4) during preparation of the above-described polymer (b-1), (b-3), or (b-4), respectively, in the presence of the above-described polysiloxane (a-1).

Among these processes, processes (3) and (11) comprise a step in which the acid group or the basic group in the condensation reaction product obtained is partially or completely neutralized with a basic or acidic compound.

In the condensation reaction with polysiloxane (a-1) during the preparation of polymer (b-1), (b-3), or (b-4), the above-cited catalysts may be used in order to promote the hydrolysis reaction of the hydrolyzable silyl group in polymer (b-1), (b-3), or (b-4), respectively, and in order to make the condensation reaction between polysiloxane (a-1) and polymer (b-1), (b-3), or (b-4), respectively, proceed smoothly.

In process (3), (7), or (11), a suitable amount of the catalyst used for condensation is in the range of about 0.0001% to about 10% by weight, preferably 0.0005% to 3% by weight, and more preferably 0.0005% to 1% by weight, with respect to the total weight of polymer (b-1), (b-3), or (b-4) and polysiloxane (a-1).

As in the case of processes (1), (5) and (9), in the case where the catalyst used in the process of preparing polysiloxane (a-1) remains in (a-1), the condensation reaction may be promoted without adding more catalyst.

Also, in processes (3), (7), and (11), in order to make the condensation reaction between polymer (b-1), (b-3), or (b-4) and polysiloxane (a-1) proceed smoothly, it is desirable to add water into the reaction system, as in the case of the above-described processes (1), (5), and (9). The amount of water used accords with that in process (1), (5), or (9).

A suitable reaction temperature in the preparation of polymer (b-1), (b-3), or (b-4) in process (3), (5), or (11) is 0° C. to 150° C., and preferably 20° C. to 120° C.

In processes (3) and (11), the acid group or basic group in the condensation reaction product obtained is partially or completely neutralized, and the type of the basic compound or the acidic compound used, the amount used, and the reaction conditions of the neutralization reaction accord with those of process (1) or (9).

When the composite resin (C) is prepared by process (1), (2), (3), (5), (6), (7), (9), (10), or (11), ratio of polymer (b-1), (b-3), or (b-4) to polysiloxane (a-1) used should be adjusted so that the ratio of the polymer segment (B) derived from polymer (b-1), (b-3), or (b-4) to polysiloxane segment (A) produced by bonding polysiloxane (a-1) to polymer (b-1), (b-3), or (b-4) will be in the above-described preferable range.

Furthermore, in process (3), (7), or (11), the conditions for preparing polymer (b-1), (b-3), or (b-4), or desired properties of polymer (b-1), (b-3), or (b-4) must accord with the conditions or properties described for processes for preparing (b-1), (b-3), or (b-4).

In addition, in the preparation of the composite resin (C) according to process (1), (2), (3), (5), (6), (7), (9), (10), or (11), an organic solvent may or may not be used. However, in order to make stirring easier, it is preferable to use such an organic solvent as cited for use in the preparation of vinyl polymer (b-1), (b-3), or (b-4).

It is desirable that the total concentration of each component for preparing the composite resin (C) according to process (1), (2), (3), (5), (6), (7), (9), (10), or (11) be adjusted so that the concentration of the composite resin (C) produced by the above reaction will be in the range of 5% to 95% by weight, preferably 10% to 90% by weight, and more preferably 20% to 80% by weight. The adjustment of the concentrations can be conducted by using one of the various types of above-described organic solvents.

The composite resin (C) can be prepared as described above, however, the water and organic solvent in the composite resin do not have to be removed, or may be removed if necessary.

The above-described processes (4), (8), and (12) among the processes for preparing composite resin (C) will be described in more detail.

In process (4), (8), or (12), a copolymer is prepared by copolymerizing polysiloxane (a-2), which has both a radically polymerizable double bond and a diorganopolysiloxane segment, and the above-cited vinyl monomer (m-2) having a polar group, or, if necessary, by conducting radical polymerization of these monomers and monomer (m-3) copolymerizable with these monomers according to the above-described process. If the thus-obtained polymer has an acid group or a basic group, this polar group may be neutralized with a basic or acidic compound.

Representative examples of polysiloxane (a-2) having both a radically polymerizable double bond and a diorganopolysiloxane segment and being used in process (4), (8), or (9) are various (meth)acrylic ester, crotonic ester, fumaric ester, or vinyl ether compounds in which a siloxane segment having a silicon atom at the terminal to which a hydrolyzable group and/or a hydroxyl group is bonded and the radically polymerizable double bond are linked in the manner shown in the above structural formula (S-III), the siloxane segment being represented by the following structural formula (S-X):

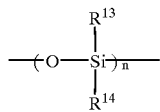
(S-X)

(wherein $R^{13}$ or $R^{14}$ denotes a monovalent organic group such as an alkyl group, a cycloalkyl group, an alkyl group which is substituted with a cycloalkyl group, an aryl group, and an aralkyl group, and n is 1 or a greater positive number).

Among polysiloxanes (a-2), one having a dialkylpolysiloxane segment having a hydrolyzable group bonded to a silicon atom and/or a hydroxyl group bonded to a silicon atom is particularly preferable from a practical viewpoint.

Among such compounds, representative examples of (meth)acrylic ester monomers are represented by the following general formula (S-XI):

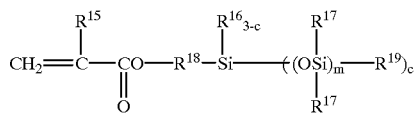
(S-XI)

(wherein $R^{15}$ denotes a methyl group or a hydrogen atom, each of $R^{16}$ and $R^{17}$ denotes a $C_1$ to $C_4$ alkyl group, $R^{18}$ denotes a $C_1$ to $C_8$ alkylene group, $R^{19}$ denotes a hydrolyzable group, such as a hydrogen atom, a halogen atom, an alkoxy group, a substituted alkoxy group, an acyloxy group, a phenoxy group, an iminoxy group, and an isopropenyloxy group, or a hydrogen atom, m is 1 or a greater positive number, and c is an integer of 1, 2, or 3).

In such a (meth)acrylic ester monomer, it is desirable that m in the above-described general formula be set to be in the range of 1 to 30, preferably 1 to 20, and more preferably 1 to 10.

It is undesirable that m be too high exceeding 30, since in such a case the curability of the water-base resin (W) obtained according to the process of the present invention is degraded, or the mechanical strength or the stain resistance during outdoor exposure of the cured material obtained from the composition of the present invention is degraded.

Among the above-described (meth)acrylic ester monomers, particularly representative concrete examples are represented by the following structural formulae (S-XII) to (S-XXIII):

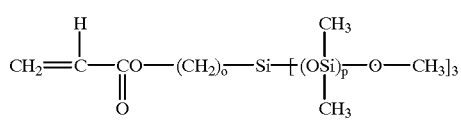
(S-XII)

-continued

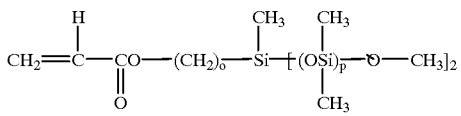
(S-XIII)

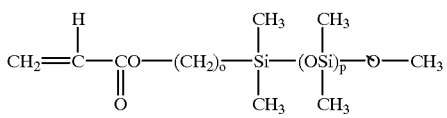
(S-XIV)

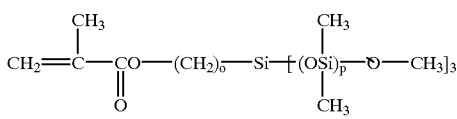
(S-XV)

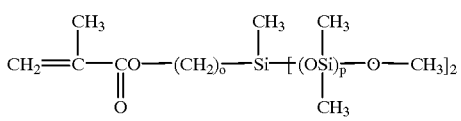
(S-XVI)

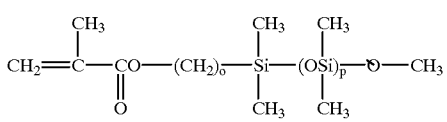
(S-XVII)

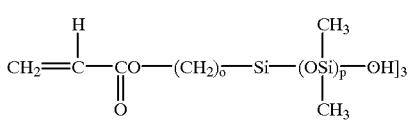
(S-XVIII)

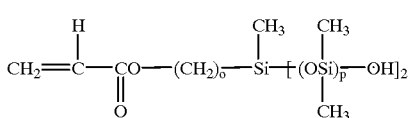
(S-XIX)

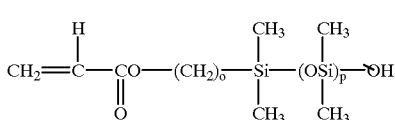
(S-XX)

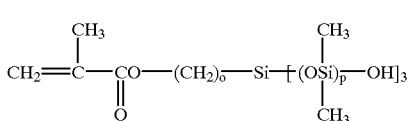
(S-XXI)

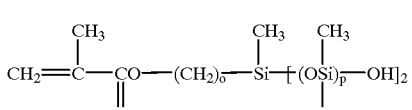
(S-XXII)

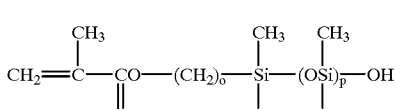
(S-XXIII)

(wherein, in the structural formulae (S-XII) to (S-XXIII), o is an integer of 1 to 8, and p is a positive number of 1 to 10).

In order to prepare a copolymer by process (4), (8), or (12) using one of various types of polysiloxanes (a-2) as cited above, polysiloxane (a-2) is copolymerized with the above-cited monomer (m-2), and with monomer (m-3), if necessary.

A copolymer obtained by process (8) may by itself be used as the composite resin (C). In contrast, copolymer (b-2) prepared by process (4) or the copolymer prepared by process (12) is converted to composite resin (C) by neutralizing acid groups or basic groups in the copolymer by a method as described above.

In order to prepare the composite resin (C) by the above-described process (b), for example, acid groups or basic groups in polymer (b-1) or (b-4) prepared by the above-described process (1) or (9) may be neutralized by a basic compound or an acidic compound in advance, and thereafter the polymer may be condensed with polysiloxane (a-1).

In order to prepare the composite resin (C) by the above-described process (c), the above-described process (1), (2), (3), (5), (6), (7), (9), (10), or (11) is followed, however, a triorganosiloxane compound represented by the above-described general formula (S-IX) is used in place of polysiloxane (a-1), and the same reaction conditions are applied.

In order to prepare the composite resin (C) by the above-described process (d), the above-described process (b) is followed except that a triorganosiloxane compound represented by the above-described general formula (S-IX) is used in place of polysiloxane (a-1).

A particularly preferable triorganosilane compound represented by general formula (S-IX), which is to be used for process (c) or (d) as described above, is a triorgano-monoalkoxysilane such as a trialkylmonoalkoxysilane.

Next, the polysiloxane (D), which is one of constituents used in the preparation of the water-base resin (W), will be described.

The polysiloxane (D) used in the preparation of the water-base resin (W) has a hydroxyl group bonded to a silicon atom and/or a hydrolyzable silyl group bonded to a silicon atom, and has a branched or cyclic structure containing a structure represented by structural formula (S-I) as an essential structural unit as described above.

From the point of the room temperature curability of the water-base resin (W) obtained by the process of the present invention, it is desirable, as polysiloxane (D), to use a polysiloxane in which a ratio of the silicon atoms based on the above-described structural formula (S-I) to the total silicon atoms constituting the polysiloxane (D) is at least about 40 mol %, preferably at least 50 mol %, and more preferably at least 70 mol %.

Examples of the polysiloxane (D) are a hydrolysis-condensation product of a silane compound containing as an essential component a trifunctional silane compound having one methyl group or one ethyl group together with three hydrolyzable groups, obtained by conducting hydrolysis-condensation of this silane compound, and a partial hydrolysis-condensation product of such a silane compound obtained by conducting partial hydrolysis-condensation of this silane compound.

As the above-described trifunctional silane compound having one methyl group or one ethyl group together with three hydrolyzable groups, any known conventional ones may be used. A particularly representative one of them is a silane compound represented by the following general formula (S-XXIV):

$$R^{20}SiR^{21}{}_3 \qquad \text{(S-XXIV)}$$

(wherein $R^{20}$ denotes a methyl group or an ethyl group, and $R^{21}$ denotes a hydrolyzable group such as a halogen atom, an alkoxy group, a substituted alkoxy group, an acyloxy group, a phenoxy group, an iminoxy group, or an isopropenyloxy group).

Among the trifunctional silane represented by the above-described general formula, particularly representative examples are methyltrialkoxysilanes such as methyltrimethoxysilane, methyltriethoxysilane, and methyltri-n-butoxysilane; ethyltrialkoxysilanes such as ethyltrimethoxysilane, ethyltriethoxysilane, and ethyltri-n-butoxysilane; and methyltrichlorosilane, ethyltrichlorosilane, methyltriacetoxysilane, and ethyltriacetoxysilane.

In the preparation the polysiloxane (D), in addition to the trifunctional silane compound having one methyl group or one ethyl group together with three hydrolyzable groups, a trifunctional silane compound represented by general formula (S-VII), a difunctional silane compound represented by general formula (S-VIII), a monofunctional silane compound represented by general formula (S-IX), or a tetrafunctional silane compound such as tetramethoxysilane and tetraethoxysilane, which are used in the preparation of the above-described polysiloxane (a-1), can be used. However, in order to maintain excellent storage stability and excellent curability at room temperature of the water-base resin (W) prepared by the process of the present invention, the amounts of these additional compounds must be limited to ranges within which the characteristics of the present invention are not impaired.

Preferable examples of the polysiloxane (D) prepared from the above various silane compounds are a hydrolysis-condensation product of a silane compound containing at least about 40 mol %, preferably at least 50 mol %, and more preferably at least 70 mol % of a trifunctional silane compound represented by general formula (S-XXIV), obtained by conducting hydrolysis-condensation of this silane compound, and a partial hydrolysis-condensation product of such a silane compound obtained by conducting partial hydrolysis-condensation of this silane compound.

Among trifunctional silane compounds represented by general formula (S-XXIV), a particularly preferable one for use in the preparation of the polysiloxane (D) is a methyltrialkoxysilane, an ethyltrialkoxysilane, or the like, and more preferable ones in particular are methyltrimethoxysilane and methyltriethoxysilane.

In the case where the polysiloxane (D) is prepared using additionally a silane compound other than a trifunctional silane compound represented by the above-described general formula (S-XXIV), the total amount of additionally used silane compounds is less than 40 mol %, in terms of the ratio of the total amount of silicon atoms derived from a trifunctional silane compound represented by general formula (S-VII), a difunctional silane compound represented by general formula (S-VIII), a monofunctional silane compound represented by general formula (S-IX), and a tetrafunctional silane compound the total silicon atoms constituting the polysiloxane (D).

By conducting hydrolysis-condensation or partial hydrolysis-condensation of a silane compound of the above described various types, the polysiloxane (D) can be prepared. In this case, the preparation may be performed by following the process for preparing the above-described polysiloxane (a-1).

The water-base resin (W) is obtained by mixing the above-described polysiloxane (D) and the above-described composite resin (C), and condensing, if necessary, a part of (D) and a part of (C) to such an extent that the resulting mixture will be soluble or dispersible in water and thereafter dispersing or dissolving the resulting mixture in water-base medium.

It is desirable that the proportions of the polysiloxane (D) and the composite resin (C) used in this case are such that the ratio of the total amount of the polysiloxane segment derived from the polysiloxane (D) and polysiloxane segment (A) to the solids content of the water-base resin (W) to be obtained, will be in the above-described preferable range.

In order to obtain a water-base resin having excellent storage stability by making the step of dispersion or solubilization in water-base medium proceed smoothly, it is preferable that the preparation of a mixture or a condensate of the polysiloxane (D) and the composite resin (C) be performed in the presence of a hydrophilic solvent such as an alcohol, a ketone, or a glycol ether, or in the presence of a mixture of such a solvent and water.

The condensation of (D) and (C) is achieved by a reaction to form a siloxane bond between the hydrolyzable group bonded to a silicon atom or the hydroxyl group bonded to a silicon atom or both groups in (D) and the hydrolyzable group bonded to a silicon atom or the hydroxyl group bonded to a silicon atom or both groups in (C).

The condensation reaction between the composite resin (C) and the polysiloxane (D) is conducted at 20° C. to 130° C., preferably 40° C. to 100° C., for 1 to 10 hours in the presence of catalyst, if necessary.

When the condensation reaction is performed, if the extent of condensation is made too high, gelation may occur or the solution of the condensation product may become too viscous, whereby it becomes difficult to dissolve or disperse the condensation product in water. Therefore, the conversion of the condensation reaction must be kept within an extent in which the condensation product can be dissolved or dispersed in water.

Accordingly, the product obtained by the condensation reaction is a mixture of three components, namely, the composite resin (C), the polysiloxane (D), and the condensate between (C) and (D).

The water-base resin (W) is prepared by dispersing or dissolving the thus-prepared mixture in a water-base medium, the mixture comprising the composite resin (C) and the polysiloxane (D), or comprising, in addition to (C) and (D), the condensate between (C) and (D).

Various known conventional processes may be applied to preparation of the water-base resin. For example, a desired water-base resin (W) can be produced by dispersing or dissolving the mixture in a water-base medium by adding a solution of the mixture to water or to a mixture of water and a water-soluble organic solvent, or by adding water or a mixture of water and a water-soluble organic solvent to a solution of the above-described mixture.

A water-base resin (W) having a low organic solvent content or containing no organic solvent can be prepared by partially or completely removing the organic solvent in the above-obtained water-base resin (W) by heating and/or applying vacuum, if necessary.

Even if the composite resin (C) and the polysiloxane (D) are in the form of a mere mixture of (C) and (D), at least a part of these react to form a condensate in the course of dispersing or dissolving the mixture in the water-base medium, or in the step of removing solvent after dispersing or dissolving the mixture.

Functional groups in the water-base resin (W) prepared as above include hydroxyl groups bonded to silicon atoms and, in some cases, hydrolyzable groups bonded to silicon atoms, which are derived from both the composite resin (C) and the polysiloxane (D). They also include acid groups neutralized by a basic compound or basic groups neutralized acidic compound and, in some cases, free acid groups and free basic groups.

When such a functional group as a hydroxyl group bonded to a carbon atom is introduced, as a functional group other than the four functional groups, i.e., an acid group, a basic group, a hydrolyzable group bonded to a silicon atom, and a hydroxyl group bonded to a silicon atom, into polymers (b-1) to (b-4) or the like which is used in the preparation of the composite resin (C) as a precursor of the water-base resin (W), this functional group such as a hydroxyl group bonded to a carbon atom is also contained in the water-base resin (W) in addition to the above functional groups.

In the case where a blocked acid group or an acid anhydride group is introduced as a precursory functional group for an anionic group for preparing the water-base resin (W) having an anionic group, at least a part of the precursory functional groups must be converted to neutralized acid groups as anionic groups.

At least a part of such blocked acid groups or acid anhydride groups may be converted to free acid groups by hydrolysis, pyrolysis, or alcoholysis in the step of synthesizing the composite resin (C) or in the step of dispersing or dissolving in water the composite resin (C) in which the blocked acid groups or the acid anhydride groups have been partially or completely neutralized.

One method for preparing the water-base curable resin composition of the present invention from the thus-prepared water-base resin (W) is to prepare a self-curable composition comprising (W) as an essential component, since (W) by itself has self-curability. The other method is to prepare a water-base curable resin composition by combining the water-base resin (W) with the compound (E) having a functional group which can react with the above-described functional group contained in the water-base resin (W), in which the crosslinking reaction between functional groups in each (W) and functional groups in the compound (E) is utilized.

The compound (E) used in the preparation of the curable resin composition according to the latter method is a known conventional compound which has at least one type of functional group which can react with the above-described various functional groups contained in the above water-base resin (W).

Particularly representative examples of such functional groups are an isocyanate group, a blocked isocyanate group, an epoxy group, a cyclocarbonate group, an oxazoline group, an aziridine group, a carbodiimide group, a hydroxyl group bonded to a silicon atom, a hydrolyzable silyl group bonded to a silicon atom, an N-hydroxymethylamino group, an N-alkoxymethylamino group, N-hydroxymethylcarboxylic acid amide group, and N-alkoxymethylcarboxylic acid amide group.

Functional groups in the compound (E) may be selected suitably according to the types of functional groups contained in the water-base resin (W). Particularly representative examples of such combinations are a hydroxyl group bonded to a silicon atom—a hydroxyl group bonded to a silicon atom; a hydroxyl group bonded to a silicon atom—a hydrolyzable group bonded to a silicon atom; a hydrolyzable group bonded to a silicon atom—a hydrolyzable group bonded to a silicon atom; a carboxyl group—an epoxy group; a carboxyl group—a cyclocarbonate group; a carboxyl group—an aziridinyl group; a carboxyl group—a carbodiimide group; a tertiary amino group—an epoxy group; a carboxyl group—an N-hydroxymethylamino group; a carboxyl group—an N-alkoxymethylamino group; a hydroxyl group bonded to a carbon atom—an isocyanate group; a hydroxyl group bonded to a carbon atom—a blocked isocyanate group; a carboxyl group—an oxazoline group; an N-hydroxymethylamino group—a hydroxyl group bonded to a carbon atom; an N-alkoxymethylamino group—a hydroxyl group bonded to a carbon atom; an N-hydroxymethylcarboxylic acid amide group—a hydroxyl group bonded to a carbon atom; and an N-alkoxymethylcarboxylic acid amide group—a hydroxyl group bonded to a carbon atom.

The compound (E) may have two or more types of functional groups selected from the above various types, depending on functional groups contained in the water-base resin (W). In addition to a compound of a relatively low molecular weight, various resins may be used as the compound (E). Particularly representative examples of such resins are various vinyl polymers such as acrylic resins and fluororesins, polyester resins, alkyd resins, polyurethane resins, and epoxy resins. When a compound having two or more types of functional groups, described above, in particular, a vinyl polymer may be used conveniently as the compound (E).

Particularly representative examples of the compound (E) are a compound having a hydroxyl group bonded to a silicon atom and/or a hydrolyzable group bonded to a silicon atom; a compound having both an epoxy group and a hydrolyzable group bonded to a silicon atom; a polyisocyanate compound; a blocked polyisocyanate compound; a polyepoxy compound; a polyaziridine compound; a polycarbodiimide compound; a polyoxazoline compound; and an amino resin. One of these various compounds may be used alone, or two or more of them may be used together.

Particularly representative examples of the above-described silicon compound having a hydroxyl group bonded to a silicon atom and/or a hydrolyzable group bonded to a silicon atom are a silane compound having in its molecule at least two hydrolyzable groups bonded to silicon atoms; a hydrolyzate or a hydrolysis-condensation product of such a silane compound; a partial hydrolysis-condensation product obtained by partial hydrolysis-condensation of one type of such a silane compound; and a partial co-hydrolysis-condensation product obtained by partial hydrolysis-condensation of at least two types of such silane compounds.

Among these, particularly representative examples of the silane compounds are tetramethoxysilane and tetraethoxysilane, a partial hydrolysis-condensation product thereof, a partial co-hydrolysis-condensation product thereof, and various silane compounds cited above.

Particularly representative examples of the above-described compound having both an epoxy group and a hydrolyzable group which is bonded to a silicon atom are a silane compound having an epoxy group, such as 3-glycidoxypropyltrimethoxysilane, 3-glycidoxypropylmethyldimethoxysilane, 3-glycidoxypropyltriethoxysilane, 3-glycidoxypropylmethyldiethoxysilane, and β-(3,4-epoxycyclohexyl)ethyltrimethoxysilane; a partial hydrolysis-condensation product obtained by partial hydrolysis-condensation of the above described silane compound having an epoxy group; a partial co-hydrolysis-condensation product obtained by partial hydrolysis-condensation of at least two types of the silane compound having an epoxy group; "EGM-202" (a trade name of a cyclic polysiloxane having both a methoxy group bonded to a silicon atom and 3-glycidoxypropyl group, manufactured by Dow Corning Toray Silicone Co., Ltd.); "KP-392" (a trade name of a partial hydrolysis-condensation product of 3-glycidoxypropyltrimethoxysilane, manufactured by Shin-Etsu Chemical Co., Ltd.; one of various types of copolymers prepared from a vinyl monomer having an epoxy group and a vinyl monomer having one of various types of hydrolyzable silyl groups as cited above; and a vinyl copolymer having both an epoxy group and a hydrolyzable silyl group, obtained by copolymerizing both of the above-mentioned vinyl monomers with a copolymerizable vinyl monomer of a (meth)acrylic type, a vinyl ester type, a vinyl ether type, an aromatic vinyl type, or a fluoroolefin type, or the like.

Particularly representative examples of the above-described polyisocyanate compounds are various aromatic diisocyanates such as tolylene diisocyanate and diphenylmethane-4,4'-diisocyanate; various aralkyl diisocyanates such as m-xylylene diisocyanate and α,α,α',α'-tetramethyl-m-xylylene diisocyanate; various aliphatic or alicyclic diisocyanates, such as hexamethylene diisocyanate, lysine diisocyanate, 1,3-bisisocyanatomethylcyclohexane, 2-methyl-1,3-diisocyanatocyclohexane, 2-methyl-1,5-diisocyanatocyclohexane, and isophorone diisocyanate; one of various types of isocyanate group-containing prepolymers which are obtained by performing an addition reaction of one of various types of polyisocyanates as cited above with a polyol, or one of various types of isocyanurate ring-containing prepolymers which are obtained by cyclo-trimerization of one of various types of polyisocyanates as cited above; one of various types of biuret structure-containing polyisocyanates which are obtained by reacting one of various types of polyisocyanates as cited above with water; one of various types of homopolymers of a vinyl monomer having a isocyanate group, such as 2-isocyanatoethyl (meth)acrylate, 3-isopropenyl-α,α-dimethylbenzyl isocyanate, and (meth)acryloyl isocyanate; and one of various types of isocyanate group-containing vinyl copolymers which are obtained by copolymerizing a vinyl monomer having an isocyanate group as described above with a copolymerizable vinyl monomer of a (meth) acrylic type, a vinyl ester type, a vinyl ether type, an aromatic type, a vinyl type, or a fluoroolefin type, or the like.

Among such polyisocyanates, from the point of the weathering resistance, in particular, or the like, use of an aliphatic, aralkyl, or alicyclic diisocyanate compound, or use of one of various types of prepolymers derived therefrom or a vinyl polymer having isocyanate groups is particularly desirable.

Particularly representative examples of the above-described blocked polyisocyanates are one of various types of blocked polyisocyanate compounds obtained by blocking one of the above-cited various types of polyisocyanate compounds with one of the various types of blocking agents cited below; and a compound which regenerates isocyanate groups by heat, such as one of various types of compounds having a uretdione structure obtained by cyclo-dimerization of isocyanate groups.

Particularly representative examples of blocking agent to be used in the preparation of the blocked polyisocyanate compounds are various alcohols such as methanol, ethanol, and a lactate ester; a compound having a phenolic hydroxyl group, such as phenol and a salicylate ester; various amides such as ε-caprolactam and 2-pyrrolidone; various oximes such as acetone oxime and methylethyl ketoxime; and various active methylene compounds such as methyl acetoacetate, ethyl acetoacetate, and acetylacetone.

Particularly representative examples of the above-described polyepoxy compounds are polyglycidyl ethers of various aliphatic or alicyclic polyols, such as ethylene glycol, hexanediol, neopentyl glycol, trimethylolpropane, pentaerythritol, sorbitol, and hydrogenated Bisphenol A;

polyglycidyl ethers of various aromatic diols, such as Bisphenol A, Bisphenol S, and Bisphenol F; polyglycidyl ethers of various polyether polyols, such as poly(ethylene glycol), poly(propylene glycol), and polytetramethylene glycol; polyglycidyl ethers of tris(2-hydroxyethyl) isocyanurate; polyglycidyl esters of various aliphatic or aromatic polycarboxylic acids, such as adipic acid, butanetetracarboxylic acid, phthalic acid, and terephthalic acid; bisepoxides of various hydrocarbon dienes, such as cyclooctadiene and vinylcyclohexene; various alicyclic polyepoxy compounds such as bis(3,4-epoxycyclohexylmethyl) adipate and 3,4-epoxycyclohexylmethyl-3,4-epoxycyclohexyl carboxylate; "EGM-400" (a trade name of a cyclic polysiloxane having 3-glycidoxypropyl group, manufactured by Dow Corning Toray Silicone Co., Ltd.); and a homopolymer of a vinyl monomer having an epoxy group, or a vinyl copolymer having epoxy groups, which is obtained by copolymerizing an epoxy group-containing vinyl monomer with a copolymerizable vinyl monomer of a (meth)acrylic type, a vinyl ester type, a vinyl ether type, an aromatic vinyl type, or a fluoroolefin type, or with the like.

Particularly representative examples of the above described polyoxazoline compounds are poly(1,3-oxazoline) compounds of a low molecular weight, such as 2,2'-p-phenylene-bis-(1,3-oxazoline), 2,2'-tetramethylene-bis-(1,3-oxazoline), 2,2'-octamethylene-bis-(1,3-oxazoline); and a homopolymer of a vinyl monomer having a 1,3-oxazoline group such as 2-isopropenyl-1,3-oxazoline, or a vinyl polymer having 1,3-oxazoline groups, which is obtained by copolymerizing the vinyl monomer having 1,3-oxazoline group with one of various types of copolymerizable vinyl monomers.

Compounds having an N-hydroxymethylamino group or an N-alkoxymethylamino group are represented by various amino resins.

Such amino resins are represented by one of various types of amino resins having an alkylol group, which is obtained by reacting one of various types of compounds having an amino group, such as melamine, benzoguanamine, acetoguanamine, urea, and glycoluril, with one of various types of aldehyde compounds (or a substance which provides an aldehyde), such as formaldehyde and acetaldehyde; and one of various types of amino resins having an alkoxyalkyl group, which is obtained by reacting the above amino resin having alkylol group with one of various types of lower alcohols such as methanol, ethanol, n-butanol, and iso-butanol.

Compounds having an N-hydroxymethylcarboxylic acid amide group are represented by a vinyl polymer obtained by copolymerizing N-hydroxymethyl(meth)acrylamide with a vinyl monomer which is copolymerizable therewith.

Compounds having an N-alkoxymethylcarboxylic acid amide group are represented by a vinyl polymer having N-alkoxymethylcarboxylic acid amide groups, obtained by copolymerizing a vinyl monomer having an N-alkoxymethylcarboxylic acid amide group, such as N-methoxymethyl(meth)acrylamide and N-n-butoxymethyl (meth)acrylamide, with a vinyl monomer which is copolymerizable therewith.

When combining the compound (E) with the water-base resin (W), a composition in which the compound (E) is dissolved or dispersed uniformly into the water-base resin (W) can be obtained if the compound (E) in itself is water-soluble, water-dispersible, or hydrophilic.

However, if the compound (E) has a low hydrophilicity, a composition in which the compound (E) is dissolved or dispersed uniformly can not be obtained even when mixing of the compound (E) with the water-base resin (W) is tried. In such a case, by introducing a hydrophilic group into the compound (E) by one of various known conventional methods, the hydrophilicity of the compound (E) in itself is enhanced, and a uniform composition can be obtained.

If the compound (E) is a polymer, the compound (E) can be in any state of a liquid containing a non-solvent liquid, a solution in an organic solvent, a water solution, or a water dispersion. Moreover, if the compound (E) is a vinyl polymer, it is also suitable that the compound (E) be used as an emulsion polymer.

For preparing a water-base curable resin composition comprising the above-described water-base resin (W) and the compound (E), if the compound (E) is a compound having a hydroxyl group bonded to a silicon atom and/or a hydrolyzable group bonded to a silicon atom, the water-base resin (W) and the compound (E) may be combined so that the amount of solids of the compound (E) with respect to 100 parts by weight of the solids content of the water-base resin (E) will be in the range of about 1 to about 200 parts by weight, preferably in the range of 2 to 150 parts by weight, and more preferably in the range of 3 to 100 parts by weight.

If the compound (E) is a polyisocyanate compound or a blocked polyisocyanate compound, the compound (E) may be combined so that the amount of the isocyanate group or the blocked isocyanate group in the compound (E) will be in the range of about 0.1 to about 10 grams equivalent, preferably in the range of 0.3 to 5 grams equivalent, and more preferably in the range of 0.5 to 2 grams equivalent, with respect to 1 gram equivalent of the functional group, in the water-base resin (W), to react with the isocyanate group or the blocked isocyanate group.

If the compound (E) is a compound having both an epoxy group and a hydrolyzable group bonded to a silicon atom, or a polyepoxy compound, the compound (E) may be combined so that the total amount of epoxy group in the compound (E) will be in the range of about 0.2 to about 5.0 grams equivalent, preferably in the range of 0.5 to 3.0 grams equivalent, and more preferably in the range of 0.7 to 2 grams equivalent, with respect to 1 gram equivalent of the functional group, in the water-base resin (W), to react with the epoxy group.

If the compound (E) is an amino resin, the compound (E) may be combined so that the amount of solids content of the amino resin with respect to 100 parts by weight of the solids content of the water-base resin (E) will be in the range of about 5 to about 200 parts by weight, preferably in the range of 10 to 150 parts by weight, and more preferably in the range of 15 to 100 parts by weight.

If the compound (E) is a polyoxazoline compound, the compound (E) may be combined so that the total amount of oxazoline group in the compound (E) will be in the range of about 0.2 to about 5.0 grams equivalent, preferably in the range of 0.5 to 3.0 grams equivalent, and more preferably in the range of 0.7 to 2 grams equivalent, with respect to 1 gram equivalent of the functional group, in the water-base resin (W), to react with the oxazoline group.

The water-base curable resin composition according to the present invention comprising the water-base resin (W) as an essential component, the water-base resin (W) being prepared as above, or the water-base curable resin composition according to the present invention obtained by additionally combining the compound (E) with the water-base resin (W) may be used as a clear composition which does not contain a colored pigment, or may be used as a colored composition which contains a known conventional organic or inorganic pigment.

The above pigment is represented by various organic pigments such as carbon black, phthalocyanine blue, phthalocyanine green, and quinacridon red; inorganic pigment of metal oxide types, such as titanium oxide, iron oxide, titanium yellow, and copper-chromium black; and inorganic flaky pigments such as aluminum flakes and pearl mica.

The water-base curable resin composition according to the present invention may be used in combination with one of various types of known conventional additives or the like, such as a curing catalyst, a flow controlling agent, a dye, a leveling agent, a rheology control agent, an ultraviolet absorbing agent, an antioxidant, and a plasticizer.

As particularly representative examples of the curing catalysts among the above additives, those various catalysts cited above as catalysts which can be used in the preparation of the above composite resin (C) can also be used, and in addition to such compounds, one of various types of compounds which are selected from a tetramethylphosphonium salt, a tetraethylphosphonium salt, a tetrabutylphosphonium salt, a triphenylphosphonium salt, and the like, and which have one of various types of anions, as a counter anion, such as a fluoride ion, a chloride ion, or a carboxylate ion, may also be used.

If the water-base resin (W) has an anionic group or a cationic group as a hydrophilic group, this anionic or cationic group functions as a condensation catalyst for a hydroxyl group bonded to a silicon atom, i.e., for a silanol group. Therefore, even if a curing catalyst is not added, crosslinking by a condensation reaction of the silanol groups can be achieved at room temperature. In addition, in order to enhance the curability, the above-mentioned curing catalyst as described above may be added.

If the water-base resin (W) has only a non-ionic group as a hydrophilic group, the crosslinking reaction by condensation of silanol groups is very slow at room temperature. Accordingly, in order to cause crosslinking of the resin at room temperature by condensation of silanol groups, a curing catalyst as described above is preferably added.

When a catalyst is added to the water-base curable resin composition comprising the water-base resin (W) of any type, it is suitable that the amount of the curing catalyst added with respect to 100 parts by weight of the total solids of the resin is set to be in the range of 0.01 to 15 parts by weight, preferably 0.05 to 10 parts by weight, and particularly preferably 0.1 to 5 parts by weight.

By drying the thus-obtained water-base curable resin composition of the present invention at room temperature for 1 to 10 days, or by baking it at a temperature in the range of about 40° C. to 250° C. for about 30 seconds to about 2 hours, very useful cured materials can be obtained. However, optimal conditions for curing vary depending on the type of the water-base resin (W) contained in the water-base curable resin composition, presence or absence of the component (E), or the type and amount of the component (E), if added.

A coated article showing excellent performance such as durability and stain resistance during outdoor exposure can be obtained by applying the water-base coating material comprising the above-described water-base curable resin composition of the present invention as an essential component to a substrate or to a substrate to which a primer coating material has been applied in advance, and then curing the water-base coating material.

As the substrate used in the process for forming a coating film according to the present invention, various known conventional ones may be used. Among them, particularly representative ones are various metallic substrates, inorganic substrates, plastic substrates, paper, and wooden substrates.

Among such substrates of various types, representative metallic substrates are metals such as iron, nickel, aluminum, chromium, zinc, tin, copper, and lead; alloys of these various metals, such as stainless steel and brass; and various surface-treated metals, which have been plated or subjected to a chemical treatment or the like.

The inorganic substrates include those mainly comprising a material such as a cement-type material, silicate-type material such as calcium silicate, a gypsum-type material, and an asbestos-type material. Specific examples include various products, such as on-site-coating-type (wet-type) substrates such as bare-faced concrete, cement mortar, gypsum plaster, dolomite plaster, and ordinary plaster, and in-line-coating-type (dry-type) substrates such as autoclaved light-weight concrete (ALC), asbestos cement, glass-fiber-reinforced calcium silicate, gypsum board, sintered clay articles such as tiles, and glass.

Representative plastic substrates are molded articles of various thermoplastic resins such as polystyrene, polycarbonate, polymethyl methacrylate, acrylonitrile-butadiene-styrene resin, polyphenylene oxide, polyurethane, polyethylene, polyvinyl chloride, polypropylene, polybutylene terephthalate, and polyethylene terephthalate; and molded articles of various thermosetting resins such as unsaturated polyester resin, phenol resin, crosslinkable polyurethane, crosslinkable acrylic resin, and crosslinkable saturated polyester resin.

A substrate among the above various types which is covered with a coating film, the coating film being deteriorated, may also be used as the substrate for the present invention.

Forms of the above various substrates are not particularly limited; they may be used in various forms, in accordance with various uses, such as a plate, a sphere, a film, a sheet, a large-scale construction, and a complicatedly-shaped assembled or molded article.

A process for forming a coating film which is characterized by the steps of applying a water-base coating material, as a top-coating material, which comprises a curable resin composition of the present invention as an essential component, directly to the above-described substrate, and curing the water-base coating material (hereinafter referred to as "process (I)") may be a process in which the water-base coating material for top-coating is applied to the substrate by one of various types of known conventional coating methods such as brush coating, roller coating, spray coating, dip coating, flow coater coating, roll coater application, electrodeposition coating, and the like, and thereafter the water-base coating material is cured.

By leaving a substrate coated with an uncured top-coating film at room temperature for 1 to 10 days, or by heating it at a temperature in the range of about 40° C. to 250° C. for about 30 seconds to 2 hours, a coated article can be obtained which is covered by a coating film which is excellent in durability, such as weathering resistance and acid rain resistance, and in stain resistance during outdoor exposure.

On the other hand, in a process for forming a coating film comprising the steps of applying a water-base coating material, as a top-coating material, which comprises a curable resin composition of the present invention as an essential component, to a substrate coated in advance with a primer coating material, and subsequently curing the water-base coating material (hereinafter referred to as "process (II)"), one of various types of known conventional primer coating materials can be used.

Particularly representative examples of the types of the primer coating materials are a coating material of a water-base solution, dispersion, or emulsion type; a coating material of a solution or a dispersion in an organic solvent; and a powder coating material or a liquid coating material without any solvent.

Among these various coating materials, particularly representative examples of the coating materials of a water-base solution, dispersion, or emulsion type include various types such as acrylic resin coating materials, polyester resin coating materials, alkyd resin coating materials, epoxy resin coating materials, aliphatic acid-modified epoxy resin coating materials, silicone resin coating materials, polyurethane resin coating materials, fluoroolefin resin coating materials, and amine-modified epoxy resin coating materials.

These various water-base coating materials may be used as non-crosslinkable coating materials, which do not contain a curing agent or a curing catalyst. Alternatively, they may be used as crosslinkable coating materials, which are combined with one of various types of crosslinking agents, or a compound which functions as a crosslinking agent, such as polyisocyanate, blocked polyisocyanate, a polyepoxy compound, a polyoxazoline compound, and a compound having both a hydrolyzable silyl group and an epoxy group, or with one of various types of known conventional curing catalysts.

Furthermore, a water-base coating material comprising the composition of the present invention as an essential component may be used as one of crosslinkable water-base coating materials for primer coating materials.

Particularly representative examples of the coating materials which are used as primer coating materials and which are in the forms of solutions or dispersions in organic solvents include various types such as chlorinated polyolefin resin coating materials, acrylic resin coating materials, silicon-containing acrylic resin coating materials, polyester resin coating materials, alkyd resin coating materials, cellulose polymer-containing coating materials, epoxy resin coating materials, aliphatic acid-modified epoxy resin coating materials, and silicone resin coating materials.

These various coating materials of organic solvent types may be used as non-crosslinkable coating materials, which do not contain a curing agent or a curing catalyst. Alternatively, they may be used as crosslinkable coating materials, which are combined with one of various types of crosslinking agents, or a compound which functions as a crosslinking agent, such as those described above for water-base primer coating materials, or with one of various types of known conventional curing catalysts.

A coating material comprising a resin or compound which has an energy ray-curable acrylic double bond, a vinyl ether group, alicyclic epoxy group, or the like may also be used as the coating material of organic solvent type.

Particularly representative examples of powder coating materials which may be used as primer coating materials are epoxy resin coating materials, polyester resin coating materials, acrylic resin coating materials and the like. These are used as thermosetting coating materials, which are combined, depending on the type of the reactive functional group in the resin, with one of various types of crosslinking agents such as an acid anhydride, dicyandiamide, a polyvalent carboxylic acid, a blocked polyisocyanate, and a polyepoxy compound.

Particularly representative examples of non-solvent liquid coating materials which may be used as the primer coating materials are radical-curable unsaturated polyester resin coating materials, polyisocyanate-curing polyurethane resin coating materials, coating materials comprising an energy ray-curable acrylic double bond-containing resin, and coating materials comprising a resin or compound having energy ray-curable vinyl ether group and/or alicyclic epoxy group.

The above-described various primer coating materials may be clear coating materials which do not contain pigments, or may be enamel coating materials, which contain various pigments, or metallic coating materials, which contains aluminum flakes or the like.

Accordingly, examples of process (II) are processes in which a so-called multilayered coating film is formed by curing, the multilayered coating film having (1) a clear primer film layer and a colored top-coating film layer, (2) a colored primer coating film layer and a clear top-coating film layer, or (3) a colored primer coating film layer and a clear top-coating film layer, corresponding to combinations of the primer coating materials and the top-coating materials.

The combination of the primer coating and the top-coating in the multilayered coating film is properly selected depending on the use of the coated article.

A coating film can be formed according to process (II), by applying a primer coating material to one of various types of substrates as described above, then applying a water-base coating material for top-coating, and thereafter curing the top-coating material.

When applying the primer coating material and the top-coating material, one of various types of methods of application exemplified as those applicable in application according to process (I) is applicable.

In such a situation, the step of drying or curing the coating material is properly selected depending on the type of the primer coating material and the type of the substrate. For example, a primer coating material applied is left at room temperature or heated, or irradiated by a so-called energy ray, such as ultraviolet ray or electron beam, before a top-coating material is applied, so that a primer coating film dried or cured in advance is formed; and a top-coating material is applied to the primer coating film and cured.

Alternatively, a so-called wet-on-wet coating method may be performed in which a top-coating material is applied after a primer coating material is applied and before the primer coating film is dried or cured, and the top-coating material can be cured and at the same type the primer coating film can be dried or cured.

Only one type of primer coating material may be used, or two or more types of coating materials may be used in order to form a multilayered primer coating film.

As curing conditions for the top-coating film when the coating film is formed according to process (II), the same conditions as those described for forming the coating film according to process (I) are applicable. However, in the case where the top-coating film and the primer coating film are cured at the same time, the conditions should be set to be suitable for curing the primer coating film.

By the process for forming a coating film according to the present invention as described above, a coated article can be prepared which is coated with a cured coating film which is excellent particularly in durability such as gloss retention and acid rain resistance, and in stain resistance during outdoor exposure.

More specific examples of the coated articles are automobiles, motorcycles, electric trains, bicycles, ships, airplanes, and other transportation-related machines, in which metallic substrates are used as the substrates; television sets, radio sets, refrigerators, washing machines, air conditioners, outdoor units of air conditioners, computers, and other home electric appliances and various parts used therein, in which metallic substrates or plastic substrates are used as the substrates; various building materials such as various inorganic roofing tiles, metallic roofing materials, inorganic exterior wall materials, metallic wall materials, metallic window frames, metallic or wooden doors or interior wall materials; various outdoor structures such as roads, road signs, guardrails, bridges, tanks, chimneys, and buildings; and various organic films such as polyester resin films, acrylic resin films, and fluororesin films, which are coated with the top-coating materials. The process for forming a coating film according to the present invention is effectively applicable to these coated articles.

Since the water-base resin of the present invention can give a cured material which is excellent particularly in durability, such as gloss retention, and in stain resistance during outdoor exposure, the water-base curable resin composition of the present invention which comprises the water-base resin as an essential component can be used as various coating materials such as coating materials for top-coating of automobiles, coating materials for building exteriors, and coating materials for building materials. In addition, there are a wide variety of uses of the water-base curable resin composition, such as uses in adhesive agents, inks, impregnants or surface finishing agents for fibers or papers.

EXAMPLES

Next, the present invention will be explained in greater detail using Reference Examples, Working Examples and Comparative Examples, however, the present invention is in no way limited to only these examples. In addition, in the following, all "parts" and "%" indicate weight, unless otherwise indicated.

Reference Example 1 (Preparation Example of Polymer (b-1))

470 parts of iso-propanol (IPA) were added to a reaction vessel equipped with a thermometer, a reflux condenser, a stirrer, a dropping funnel and a nitrogen inlet tube, then the temperature was raised to 80° C. while introducing nitrogen gas.

Next, at the same temperature, a mixture comprising 100 parts of styrene (ST), 300 parts of methyl methacrylate (MMA), 284 parts of n-butyl methacrylate (BMA), 186 parts of n-butyl acrylate (BA), 30 parts of 3-methacryloyloxypropyltrimethoxysilane (MPTMS) and 100 parts of acrylic acid (AA), and a mixture comprising 350 parts of IPA and 50 parts of tert-butyl peroxy-2-ethylhexanoate (TBPOEH) were separately added dropwise over a period of 4 hours.

After the addition was completed, stirring was conducted for 16 hours at the same temperature, and thereby a solution of the desired polymer containing both a carboxyl group and trimethoxysilyl group was obtained which had a non-volatile content of 55.9% and a number-average molecular weight of 10,000. Here in after, this is referred to as (b-1-1).

Reference Example 2 (As above)

470 parts of IPA were added to a reaction vessel like that of Reference Example 1, and heated to 80° C. while introducing nitrogen gas.

Next, at the same temperature, a mixture comprising 100 parts of ST, 200 parts of MMA, 314 parts of BMA, 186 parts of BA, 150 parts of AA and 50 parts of 2-hydroxyethyl methacrylate (HEMA), a mixture comprising 350 parts of IPA and 50 parts of TBPOEH, and 24 parts of 3-mercaptopropyltrimethoxysilane were each separately added dropwise over a period of 4 hours.

After the addition was completed, stirring was conducted for 16 hours at the same temperature, and thereby a solution of the desired polymer was obtained which had a non-volatile content of 55.5% and a number average molecular weight of 10,300 and which had all of a carboxyl group, a trimethoxysilyl group and a hydroxyl group bonded to a carbon atom. Here in after, this is referred to as (b-1-2).

Reference Examples 3 and 4 (As above)

With the exception of the changes shown in Table 1, polymerization was carried out in the same manner as in Reference Example 1 using the types and amounts of monomers and the amounts of polymerization initiator shown in Table 1. Thereby, each of the desired polymers (b-1-3) and (b-1-4) having the characteristic values indicated in the same table were obtained. These polymers are referred to in the manner shown in the same table.

TABLE 1 (1-1)

|  |  | Reference Example 3 | Reference Example 4 |
|---|---|---|---|
| Monomer Type | ST | 100 | 100 |
|  | MMA | 300 | 300 |
|  | BMA | 182 | 114 |
|  | BA | 148 | 163 |
|  | DMAEA | 240 | 240 |
|  | HEMA |  | 50 |
|  | MPTMS | 30 | 30 |
| Initiator | ABMBN | 50 | 50 |

Footnotes for Table 1
Each value indicating the proportion of each type of material used indicates parts by weight.
DMAEMA ... abbreviation for 2-dimethylaminoethyl methacrylate
ABMBN ... abbreviation of 2,2'-azobis-(2-methylbutyronitrile)

TABLE 1 (1-2)

|  |  | Reference Example 3 | Reference Example 4 |
|---|---|---|---|
| Characteristic Values of Resin | non-volatile content (%) | 55.9 | 55.8 |
|  | Number-average molecular weight | 11100 | 10300 |
| Abbreviation for Polymer |  | b-1-3 | b-1-4 |

Reference Examples 5 and 6 (Preparation Example of Polymers (b-3) and (b-4))

With the exception of the changes shown in Table 1, polymerization was carried out in the same manner as in Reference Example 1 using the types and amounts of monomers and the amounts of polymerization initiator shown in Table 1. Thereby, each of the desired polymers (b-3-1) and (b-4-1) having the characteristic values indicated in the same table were obtained. These polymers are referred to in the manner shown in the same table.

TABLE 1 (2-1)

|  |  | Reference Example 5 | Reference Example 6 |
|---|---|---|---|
| Monomer Type | ST | 100 | 100 |
|  | MMA | 300 | 300 |
|  | BMA | 214 | 134 |
|  | BA | 86 | 186 |
|  | PEGMA | 300 | 200 |

TABLE 1 (2-1)-continued

|  |  | Reference Example 5 | Reference Example 6 |
|---|---|---|---|
|  | AA |  | 50 |
|  | MPTMS |  | 30 |
| Type of | ABMBN |  | 50 |
| Initiator | TBPOTMS | 50 |  |

Footnotes for Table 1
Each value indicating the proportion of each type of material used indicates parts by weight.
PEGMA ... abbreviation for methoxypolyethyleneglycol methacrylate having a number-average molecular weight of approximately 1,000
TBPOTMS ... abbreviation of tert-butyl peroxy-2,2-dimethyl-3-trimethoxysilyl propanoate

TABLE 1 (2-2)

|  |  | Reference Example 5 | Reference Example 6 |
|---|---|---|---|
| Characteristic Values of Resin | non-volatile content (%) | 55.2 | 55.0 |
|  | Number-average molecular weight | 11000 | 10100 |
| Abbreviation for Polymer |  | b-3-1 | b-4-1 |

Reference Examples 7 to 10 (Preparation Example of Polymers (R-1) to (R-4))

With the exception of the changes shown in Table 1, polymerization was carried out in the same manner as in Reference Example 1 using the types and amounts of monomers and the amounts of polymerization initiator shown in Table 1. Thereby, each of the desired polymers (R-1) to (R-4) having the characteristic values indicated in the same table were obtained. These polymers are referred to in the manner shown in the same table.

TABLE 1 (3-1)

|  |  | Reference Example 7 | Reference Example 8 | Reference Example 9 | Reference Example 10 |
|---|---|---|---|---|---|
| Monomer Type | ST | 100 | 100 | 100 | 100 |
|  | MMA | 300 | 300 | 300 | 300 |
|  | BMA | 364 | 294 | 264 | 214 |
|  | BA | 186 | 186 | 86 | 221 |
|  | AA | 50 |  | 50 | 50 |
|  | DMAEMA |  | 120 |  |  |
|  | PEGMA |  |  | 200 |  |
|  | HEMA |  |  |  | 115 |
| Type of Initiator | TBPOEH | 50 |  | 50 | 50 |
|  | ABMBN |  | 50 |  |  |

TABLE 1 (3-2)

|  |  | Reference Example 7 | Reference Example 8 | Reference Example 9 | Reference Example 10 |
|---|---|---|---|---|---|
| Characteristic Values of Resin | non-volatile content (%) | 55.0 | 54.3 | 55.9 | 55.3 |
|  | Number-average molecular weight | 10200 | 9800 | 9900 | 10300 |
| Abbreviation for Polymer |  | R-1 | R-2 | R-3 | R-4 |

TABLE 1 (3-2)-continued

|  | Reference Example 7 | Reference Example 8 | Reference Example 9 | Reference Example 10 |
|---|---|---|---|---|

Footnotes for Table 1
R-1 which is obtained in Reference Example 7 is a polymer for use when preparing control resin 1.
R-2 which is obtained in Reference Example 8 is a polymer for use when preparing control resin 2.
R-3 which is obtained in Reference Example 9 is a polymer for use when preparing control resin 3.
R-4 which is obtained in Reference Example 10 is a polymer for use when preparing control resin 4 and control resin 5.

Reference Example 11 (Preparation Example of polysiloxane (D))

985 parts of methyltriethoxysilane (MTES) and 350 parts of IPA were added to a reaction vessel equipped with a thermometer, a reflux condenser, and a dropping funnel, and the temperature of the mixture was raised to 80° C.

Next, at the same temperature, a mixture comprising 0.03 parts of "AP-3" (product name for iso-propyl acid phosphate manufactured by Daihachi Chemical Industry Co.) and 299 parts of deionized water was added dropwise over a period of 5 minutes.

After the addition was completed, stirring was conducted for 4 hours at the same temperature, and thereby a polysiloxane, having a non-volatile content of 49.7%, which was the desired completely hydrolyzed condensate of MTES, and in which a hydroxyl group was bonded to a silicone atom, was obtained as a solution in a mixture of water and IPA. This is referred to as (D-1) hereinafter.

Reference Examples 12 to 14 (as above)

With the exception of the changes shown in Table 2, each of the desired polysiloxanes (D-2) to (D-4) having the characteristics shown in the same table were obtained by means of the same method as in Reference Example 11 using the types and amounts of alkoxysilane, the amounts of IPA, and the amounts of deionized water and AP-3 shown in Table 2.

Polysiloxanes (D-2) to (D-4) obtained here are polysiloxanes which are completely hydrolyzed condensates of the used alkoxysilane, and which have a hydroxyl group bonded to a silicone atom, and they are in the state of solutions in a mixture of water and IPA.

TABLE 2 (1)

|  |  | Reference Example 12 | Reference Example 13 | Reference Example 14 |
|---|---|---|---|---|
| Type of alkoxysilane | MTES | 1271 | 1144 | 656 |
|  | DMDMS |  | 86 |  |
|  | PTMS |  |  | 71 |
| IPA |  | 400 | 400 | 350 |
| Deionized water |  | 386 | 386 | 280 |
| "AP-3" |  | 0.04 | 0.04 | 0.03 |

Footnotes to Table 2
Each value indicating the proportion of each type of material used indicates parts by weight.
DMDMS ... abbreviation for dimethyldimethoxysilane
PTMS ... abbreviation for phenyltrimethoxysilane

TABLE 2 (2)

|  |  | Reference Example 12 | Reference Example 13 | Reference Example 14 |
|---|---|---|---|---|
| Characteristics of resin | non-volatile component (%) | 50.1 | 49.4 | 50.0 |
| Abbreviation for polysiloxane |  | D-2 | D-3 | D-4 |

Reference Example 15 (as above)

1,826 parts of methyltrimethoxysilane (MTMS), and 133 parts of cyclohexyltrimethoxysilane (CHTMS) were added to a reaction vessel like the one used in Reference Example 11, and then heated to 80° C.

Next, at the same temperature, a mixture of 0.2 parts of AP-3 and 280 parts of deionized water was added dropwise over approximately 1 hour.

After the adding was finished, stirring was carried out for 4 hours at the same temperature, then the desired polysiloxane having a methoxy group content of 35% and a number-average molecular weight of 1,000 was obtained by removing methanol by vacuum distillation. Hereinafter, this is referred to as (D-5).

The (D-5) obtained here is a polysiloxane having a methoxy group bonded to a silicone atom which is a partially hydrolyzed co-condensate of MTMS and CHTMS.

Reference Example 16 (as above)

1,700 parts of MTMS were added to a reaction vessel like the one used in Reference Example 11, and the temperature was raised to 80° C.

Next, at the same temperature, a mixture of 0.2 parts of AP-3 and 248 parts of deionized water was added dropwise over approximately 1 hour.

After the adding was finished, stirring was carried out for 4 hours at the same temperature, then the desired polysiloxane having a methoxy group content of 35% and a number-average molecular weight of 1,000 was obtained by removing methanol by vacuum distillation. Hereinafter, this is referred to as (D-6).

The (D-6) obtained here is a polysiloxane having a methoxy group bonded to a silicone atom which is a partially hydrolyzed condensate of MTMS.

Reference Example 17 (Preparation Example of Control Resin 1)

1,273 parts of polymer (R-1) were added to a reaction vessel equipped with a thermometer, a reflux condenser and a dropping funnel. Next, at room temperature, while stirring, a mixture of 49 parts of triethylamine (TEA) and 1,000 parts of deionized water was added dropwise over 30 minutes, then, a water-base resin for comparative use having a non-volatile content of 34.5% was obtained by removing the IPA by vacuum distillation. Hereinafter, this is referred to as control resin 1.

Reference Example 18 (Preparation Example of Control Resin 2)

1,289 parts of polymer (R-2) were put into a reaction vessel the same as that used in Reference Example 17. Next, at room temperature and while stirring, a mixture of 29 parts of acetic acid and 1,000 parts of deionized water was added dropwise over 30 minutes. Then, a control water-base resin having a non-volatile content of 36.1% was obtained by removing the IPA by vacuum distillation. Hereinafter, this is referred to as Control Resin 2.

Reference Example 19 (Preparation Example for Control Resin 3)

1,252 parts of polymer (R-3) were put into a reaction vessel the same as that used in Reference Example 17. Next, at room temperature and while stirring, a mixture of 49 parts of TEA and 1,000 parts of deionized water was added dropwise over 30 minutes. Then, a control water-base resin having a non-volatile content of 35.7% was obtained by removing the IPA by vacuum distillation. Hereinafter, this is referred to as control resin 3.

Reference Example 20 (Preparation Example for Control Resin 4)

1,266 parts of polymer (R-4) were put into a reaction vessel the same as that used in Reference Example 17. Next, at room temperature and while stirring, 49 parts of TEA and 1,000 parts of deionized water were added dropwise over 30 minutes. Then, a control water-base resin having a non-volatile content of 35.3% was obtained by removing the IPA by vacuum distillation. Hereinafter, this is referred to as control resin 4.

Reference Example 21 (Preparation Example for Control Resin 5)

1,266 parts of polymer (R-4) were put into a reaction vessel the same as that used in Reference Example 17. Next, at room temperature and while stirring, a mixture of 7 parts of Tinuvin-384 (product name of an ultraviolet absorbing agent manufactured by Swiss Ciba-Geigi), 7 parts of Tinuvin-123 (product name of an anti-oxidant manufactured by Swiss Ciba-Geigi), and 7 parts of IPA was added dropwise over 5 minutes. In addition, to this mixture, 49 parts of TEA and 1,000 parts of deionized water were added dropwise over 30 minutes. Then, a control water-base resin having a non-volatile content of 35.1% was obtained by removing the IPA by vacuum distillation. Hereinafter, this is referred to as control resin 5.

Working Example 1 (Preparation Example of Water-base Resin (W))

The present Working Example shows an example for the purpose of preparing a water-base resin (W).

354 parts of PTMS and 350 parts of IPA were added to a reaction vessel equipped with a thermometer, a reflux condenser, a stirrer and a dropping funnel, and the temperature of the mixture was raised to 80° C. Next, at the same temperature, a mixture of 2.9 parts of AP-3 and 96 parts of deionized water was added dropwise over 5 minutes, and then stirring was carried out for 4 hours at the same temperature.

After this, analysis of the reaction mixture was carried out by means of nuclear magnetic resonance spectrometry ($^1$H-NMR), and this confirmed that hydrolysis of the PTMS had proceeded to a conversion of 100%.

Subsequently, to this, 719 parts of polymer (b-1-1) obtained in Reference Example 1 were added, and at the same temperature, stirring was carried out for 4 hours, thereby, a condensation reaction was carried out between the polysiloxane obtained from the PTMS and polymer (b-1-1). Next, at the same temperature and while stirring, the carboxyl groups were neutralized by adding 56 parts of TEA dropwise over 5 minutes and, thereby, composite resin (C-1) was prepared.

The composite resin thus-obtained was analyzed using $^1$H-NMR, and it was confirmed that hydrolysis of the trimethoxysilyl groups had proceeded to a conversion of 100%.

Subsequently, 1,578 parts of this composite resin, and 777 parts of polysiloxane (D-1) obtained in Reference Example 11 were mixed at room temperature while stirring. Next, to this, 1,500 parts of deionized water were added dropwise over 30 minutes, then, the desired water-base resin having a non-volatile content of 42.2% was obtained by removing methanol and IPA by means of vacuum distillation. Hereinafter, this is referred to as (W-1).

This water-base resin (W-1) was stored at 40° C. for 2 months, and, in this water-base resin, after storage, absolutely no abnormalities, such as gelation, deposition of precipitate, and the like, were found, and it was clear that this water-base resin (W-1) was extremely excellent in storage stability.

Working Example 2 (as above)

361 parts of polymer (b-1-2) obtained in Reference Example 2 and 400 parts of IPA were put in a reaction vessel like the one used in Working Example 1, and the temperature of the mixture was raised to 80° C.

Next, at the same temperature, 495 parts of PTMS, and a mixture of 4.0 parts of AP-3 and 135 parts of deionized water was added separately dropwise over 5 minutes, and then stirred for 4 hours at the same temperature.

Subsequently, at the same temperature and while stirring, the carboxyl groups were neutralized by adding 42 parts of TEA dropwise over 5 minutes and, thereby, composite resin (C-2) was prepared. The composite resin thus-obtained was analyzed using $^1$H-NMR, and it was confirmed that hydrolysis of the trimethoxysilyl groups contained in the polymer (b-1-2) and PTMS had proceeded to a conversion of 100%.

Subsequently, 1,437 parts of this composite resin, and 993 parts of polysiloxane (D-2) obtained in Reference Example 12 were mixed at room temperature. Next, to this, 1,500 parts of deionized water were added dropwise over 30 minutes, then, the desired water-base resin having a non-volatile content of 40.5% was obtained by removing methanol and IPA by means of vacuum distillation. Hereinafter, this is referred to as (W-2).

This water-base resin (W-2) was stored at 40° C. for 2 months, and, in this water-base resin, after storage, absolutely no abnormalities, such as gelation, deposition of precipitate, or the like, were found, and it was clear that this water-base resin (W-2) was extremely excellent in storage stability.

Working Example 3 (as above)

495 parts of PTMS and 400 parts of IPA were put in a reaction vessel like the one used in Working Example 1, and the temperature of the mixture was raised to 80° C.

Next, at the same temperature, a mixture of 4.0 parts of AP-3 and 135 parts of deionized water was added dropwise over 5 minutes, and then stirred for 4 hours at the same temperature.

Thereafter, analysis of the reaction mixture was carried out using $^1$H-NMR, and it was confirmed that hydrolysis of the PTMS had proceeded to a conversion of 100%.

Subsequently, to this, 350 parts of polymer (b-1-3) obtained in Reference Example 3 were added, and at the same temperature, stirring was carried out for 4 hours, thereby, a condensation reaction was carried out between the polysiloxane obtained from the PTMS and polymer (b-1-3). Next, at the same temperature and while stirring, the dimethylamino groups were neutralized by adding 16.2 parts of acetic acid dropwise over 5 minutes and, thereby, composite resin (C-3) was prepared.

The composite resin thus-obtained was analyzed using $^1$H-NMR, and it was made clear that hydrolysis of the trimethoxysilyl groups contained in polymer (b-1-3) had proceeded to a conversion of 100%.

Subsequently, 1,400 parts of this composite resin, and 1,013 parts of polysiloxane (D-3) obtained in Reference Example 13 were mixed at room temperature. Next, to this, 1,500 parts of deionized water were added dropwise over 30 minutes, then, the desired water-base resin having a non-volatile content of 41.7% was obtained by removing methanol and IPA by means of vacuum distillation. Hereinafter, this is referred to as (W-3).

This water-base resin (W-3) was stored at 40° C. for 2 months, and, after storage, in this water-base resin, absolutely no abnormalities, such as gelation, deposition of precipitate, or the like, were found, and it was clear that this water-base resin (W-3) was extremely excellent in storage stability.

Working Example 4 (as above)

724 parts of polymer (b-1-4) obtained in Reference Example 4, 33.4 parts of acetic acid and 350 parts of IPA were put in a reaction vessel like the one used in Working Example 1, and the temperature of the mixture was raised to 80° C.

Next, at the same temperature, 354 parts of PTMS, and 96 parts of deionized water were added separately dropwise over 5 minutes, and then stirred for 4 hours at the same temperature. Thereby, composite resin (C-4) was prepared.

Next, the composite resin thus-obtained was analyzed using $^1$H-NMR, and it was confirmed that hydrolysis of the trimethoxysilyl groups contained in polymer (b-1-4) and the PTMS had proceeded to a conversion of 100%.

Subsequently, 1,557 parts of this composite resin, and 765 parts of polysiloxane (D-4) obtained in Reference Example 14 were mixed at room temperature while stirring. Next, to this, 1,500 parts of deionized water were added dropwise over 30 minutes, then, the desired water-base resin having a non-volatile content of 41.1% was obtained by removing methanol and IPA by means of vacuum distillation. Hereinafter, this is referred to as (W-4).

This water-base resin (W-4) was stored at 40° C. for 2 months, and, after storage, in this water-base resin, absolutely no abnormalities, such as gelation, deposition of precipitate, or the like, were found, and it was clear that this water-base resin (W-4) was extremely excellent in storage stability.

Working Example 5 (as above)

354 parts of PTMS and 380 parts of IPA were put in a reaction vessel like the one used in Working Example 1, and the temperature of the mixture was raised to 80° C.

Next, at the same temperature, a mixture of 2.9 parts of AP-3 and 96 parts of deionized water was added dropwise over 5 minutes, and then stirred for 4 hours at the same temperature.

Thereafter, analysis of the reaction mixture was carried out using $^1$H-NMR, and it was confirmed that hydrolysis of the PTMS had proceeded to a conversion of 100%.

Subsequently, to this, 532 parts of polymer (b-3-1) obtained in Reference Example 5 were added, and then stirred at the same temperature for 4 hours in order to conduct a condensation reaction between the polysiloxane obtained from the PTMS and polymer (b-3-1), thereby composite resin (C-5) was prepared.

The composite resin thus-obtained was analyzed using $^1$H-NMR, and it was confirmed that hydrolysis of the trimethoxysilyl groups contained in polymer (b-3-1) had proceeded to a conversion of 100%.

Subsequently, 1,365 parts of this composite resin, and 993 parts of polysiloxane (D-2) obtained in Reference Example 12 were mixed at room temperature. Next, to this, 1,500 parts of deionized water were added dropwise over 30 minutes, then, the desired water-base resin having a non-volatile content of 42.5% was obtained by removing methanol and IPA by means of vacuum distillation. Hereinafter, this is referred to as (W-5).

This water-base resin (W-5) was stored at 40° C. for 2 months, and, after storage, in this water-base resin, absolutely no abnormalities, such as gelation, deposition of precipitate, or the like, were found, and it was clear that this water-base resin (W-5) was extremely excellent in storage stability.

Working Example 6

734 parts of polymer (b-4-1) obtained in Reference Example 6 and 350 parts of IPA were put in a reaction vessel like the one used in Working Example 1, and the temperature of the mixture was raised to 80° C.

Next, at the same temperature, 354 parts of PTMS, and a mixture of 2.9 parts of AP-3 and 96 parts of deionized water was added separately dropwise over 5 minutes, and then stirred for 4 hours at the same temperature. Next, at the same temperature and while stirring, 28 parts of TEA were added dropwise over 5 minutes to neutralize the carboxyl groups, and thereby composite resin (C-6) was prepared.

The composite resin thus-obtained was analyzed using $^1$H-NMR, and it was confirmed that hydrolysis of the trimethoxysilyl groups contained in polymer (b-4-1) and the PTMS had proceeded to a conversion of 100%.

Subsequently, 1,537 parts of this composite resin, and 765 parts of polysiloxane (D-4) obtained in Reference Example 14 were mixed at room temperature. Next, to this, 1,500 parts of deionized water were added dropwise over 30 minutes, then, the desired water-base resin having a non-volatile content of 40.0% was obtained by removing methanol and IPA by means of vacuum distillation. Hereinafter, this is referred to as (W-6).

This water-base resin (W-6) was stored at 40° C. for 2 months, and, after storage, in this water-base resin, absolutely no abnormalities, such as gelation, deposition of precipitate, or the like, were found, and it was clear that this water-base resin (W-6) was extremely excellent in storage stability.

Working Example 7 (as above)

Firstly, 920 parts of IPA, and 130 parts of mono-n-butyl maleate, 110 parts of vinyl acetate, 310 parts of ethyl vinyl ether, 60 parts of vinyltris(β-methoxyethoxy)silane, and 50 parts of tert-butyl peroxypivalate as a polymerization initiator, were put in a 3 liter-stainless steel autoclave whose inner part is replaced with nitrogen gas.

Next, to this, 400 parts of liquefied chlorotrifluoroethylene were added under pressure. The reaction was allowed to continue for 15 hours at 60° C. while stirring, and thereby a solution of the desired fluoroolefin copolymer containing both carboxyl groups and tris(β-methoxyethoxy)silyl groups having a non-volatile content of 51.2% and a number-average molecular weight of 9,900 was obtained. Hereinafter, this is referred to as (b-1-5).

980 parts of this polymer (b-1-5), 325 parts DMDMS and 512 parts of IPA were put in a reaction vessel like the one used in Working Example 1, and the temperature of the mixture was raised to 80° C.

Next, at the same temperature, a mixture of 4.4 parts of AP-3 and 147 parts of deionized water was added dropwise over 5 minutes, and then by stirring for 4 hours at the same temperature, a hydrolysis condensation reaction was conducted between the DMDMS and the tris(β-methoxyethoxy) silyl groups contained in polymer (b-1-5).

To the solution of condensate thus-obtained, 35 parts of TEA were added dropwise over 5 minutes at room temperature under stirring to neutralize the carboxyl groups and, thereby, composite resin (C-7) was prepared.

The composite resin thus-obtained was analyzed using $^1$H-NMR, and it was made clear that hydrolysis of the tris(β-methoxyethoxy)silyl groups contained in polymer (b-1-5) and the DMDMS had proceeded to a conversion of 100%.

Next, 2,003 parts of this composite resin (C-7), and 411 parts of polysiloxane (D-5) prepared in Reference Example 15 were mixed at room temperature. Next, to this, 1,427 parts of deionized water were added dropwise over 30 minutes, then, the desired water-base resin having a non-volatile content of 39.4% was obtained by removing methanol and IPA by means of vacuum distillation. Hereinafter, this is referred to as (W-7).

This water-base resin (W-7) was stored at 40° C. for 1 month, and there were no abnormalities, such as gelation, deposition of precipitate, or the like, found, and it was clear that this water-base resin (W-7) was excellent in storage stability.

Working Example 8 (as above)

373 parts of 2,2-dimethyl-3-hydroxypropyl 2,2-dimethyl-3-hydroxypropionate, 39 parts of N-methyldiethanolamine, 417 parts of toluene and 0.44 parts of dibutyltin dioctate were put into a reaction vessel like the one used in Working Example 1 and the temperature of the mixture was raised to 80° C. while introducing dried nitrogen gas.

Next, at the same temperature, a mixture of 519 parts of isophorone diisocyanate and 519 parts of toluene was added dropwise over one hour and after the addition was completed, the stirring was conducted for 4 hours at the same temperature. It was confirmed that the isocyanate concentration of the reaction mixture was approximately the same as the theoretical value.

Thereafter, at the same temperature, a mixture of 64 parts of 3-aminopropyltrimethoxysilane and 64 parts of toluene was added dropwise over 10 minutes, and, after the addition was completed, stirring was carried out for 4 hours at the same temperature. Then, after confirming by infra-red absorption spectra analysis (IR analysis) that the isocyanate groups had been consumed completely, 50 parts of toluene and 450 parts of IPA were added, and a solution of polyurethane polymer having a non-volatile content of 43.3% and a number-average molecular weight of 5,400 and having tertiary amino groups and trimethoxysilyl groups was obtained. Hereinafter this is referred to as (b-1-6).

1,630 parts of this polymer (b-1-6), 163 parts of DMDMS and 512 parts of IPA were put in a reaction vessel like the one used in Working Example 1, and the temperature of the mixture was raised to 80° C.

Subsequently, at the same temperature, a mixture of 2.2 parts of AP-3 and 73 parts of deionized water was added dropwise over 5 minutes, and then by stirring for 4 hours at the same temperature, a hydrolysis condensation reaction was conducted between DMDMS and the trimethoxysilyl groups contained in polymer (b-1-6).

To the solution of condensate thus-obtained, 19 parts of acetic acid were added dropwise over 5 minutes at room temperature under stirring to neutralize the tertiary amino groups and, thereby, composite resin (C-8) was prepared.

The composite resin thus-obtained was analyzed using $^1$H-NMR, and it was confirmed that hydrolysis of the trimethoxysilyl groups contained in polymer (b-1-6) and the DMDMS had proceeded to a conversion of 100%.

Next, 2,415 parts of this composite resin (C-8), and 411 parts of polysiloxane (D-5) were mixed at room temperature. Next, to this, 1,464 parts of deionized water were added dropwise over 30 minutes, then, the desired water-base resin having a non-volatile content of 40.2% was obtained by removing methanol and IPA by means of vacuum distillation. Hereinafter, this is referred to as (W-8).

This water-base resin (W-8) was stored at 40° C. for 1 month, and there were no abnormalities, such as gelation, deposition of precipitate, or the like, found, and it was confirmed that this water-base resin (W-8) was excellent in storage stability.

Working Example 9 (as above)

470 parts of IPA were put into a reaction vessel like the one used in Working Example 1 and while introducing nitrogen gas, the temperature was raised to 80° C.

Next, at the same temperature, a mixture of 100 parts of ST, 300 parts of MMA, 264 parts of BMA, 186 parts of BA, 80 parts of AA, 70 parts of dimethyl polysiloxane (n=2) represented by the following structural formula (S-XXV), 450 parts of IPA, and 50 parts of TBPOEH was added dropwise over 4 hours.

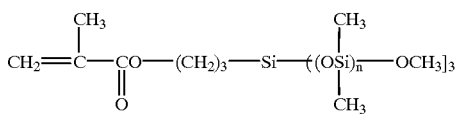

(S-XXV)

After the addition was completed, at the same temperature, stirring was carried out for 16 hours, thereby, a solution of polymer (b-2-1) containing a dimethyl polysiloxane segment and a carboxyl group and having a non-volatile component of 54.1% and a number-average molecular weight of 13,300 was obtained. Next, at the same temperature and while stirring, 112 parts of TEA were added dropwise over 5 minutes to this polymer solution to neutralize the carboxyl groups, and thereby composite resin (C-9) was prepared.

Finally, 924 parts of this composite resin (C-9) and 685 parts of polysiloxane (D-5) were mixed at room temperature. Next, to this, 1,500 parts of deionized water were added dropwise over 30 minutes, then, the desired water-base resin having a non-volatile content of 40.4% was obtained by removing methanol and IPA by means of vacuum distillation. Hereinafter, this is referred to as (W-9).

This water-base resin (W-9) was stored at 40° C. for 1 month, and there were no abnormalities, such as gelation, deposition of precipitate, or the like, found, and it was confirmed that this water-base resin (W-9) was excellent in storage stability.

Working Example 10 (as above)

470 parts of IPA were put into a reaction vessel like the one used in Working Example 1 and, while introducing nitrogen gas, the temperature was raised to 80° C.

Next, at the same temperature, a mixture of 100 parts of ST, 250 parts of MMA, 274 parts of BMA, 186 parts of BA, 80 parts of AA, 50 parts of HEMA, 60 parts of dimethyl polysiloxane (n=1.5) represented by the following structural formula (S-XXVI), 450 parts of IPA, and 50 parts of TBPOEH was added dropwise over 4 hours.

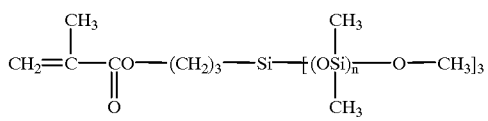

(S-XXVI)

After the addition was completed, at the same temperature, stirring was carried out for 16 hours, thereby, a solution of polymer (b-2-2) having a non-volatile component of 50.3% and a number-average molecular weight of 12,200 and having a dimethyl polysiloxane segment and a carboxyl group was obtained. Next, at the same temperature and while stirring, 112 parts of TEA were added dropwise over 5 minutes to this polymer solution to neutralize the carboxyl groups, and thereby composite resin (C-10) was prepared.

Next, 994 parts of this composite resin (C-10) and 685 parts of polysiloxane (D-5) were mixed at room temperature. Next, to this, 1,500 parts of deionized water were added dropwise over 30 minutes, then, the desired water-base resin having a non-volatile content of 40.0% was obtained by removing methanol and IPA by means of vacuum distillation. Hereinafter, this is referred to as (W-10).

This water-base resin (W-10) was stored at 40° C. for 1 month, and there were no abnormalities, such as gelation, deposition of precipitate, or the like, found, and it was confirmed that this water-base resin (W-10) was excellent in storage stability.

Working Example 11 (as above)

300 parts of 2-n-propoxy-1-propanol (PNP), 250 parts of IPA, 268 parts of PTMS, and 162 parts of DMDMS were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.3 parts of AP-3 and 122 parts of deionized water was added dropwise over 5 minutes. By continuing the stirring for a further 10 hours, PTMS and DMDMS were condensed with the acrylic polymer.

Next, 132 parts of TEA were added dropwise over 5 minutes to neutralize the carboxyl groups, and thereby composite resin (C-11) was prepared.

Composite resin (C-11) thus-obtained was analyzed using $^1$H-NMR, and it was confirmed that the hydrolysis of the methoxy groups bonded to the silicon atom contained in each of PTMS, DMDMS and MPTMS proceeded to a conversion of 100%.

Next, 2,355 parts of this composite resin (C-11) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-11) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.0% was obtained. Hereinafter, this is referred to as water-base resin (W-11).

This water-base resin (W-11) was stored at 40° C. for 2 months, and there were absolutely no abnormalities, such as gelation, deposition of precipitate, or the like, found, and it was confirmed that this water-base resin (W-11) was extremely excellent in storage stability.

Working Example 12 (as above)

180 parts of PNP, 400 parts of IPA, 268 parts of PTMS, and 162 parts of DMDMS were put into a reaction vessel like te one used in Working Example 1 and, while introducing nitrogen gas, the temperature of the mixture was raised to 80° C.

Next, at the same temperature and while stirring, a mixture of 141 parts of ST, 423 parts of MMA, 461 parts of BMA, 262 parts of BA, 81 parts of AA, 42 parts of MPTMS, 70 parts of PNP and 70 parts of TBPOEH was added dropwise over 4 hours.

After the addition was completed, stirring was carried out for 2 hours at the same temperature, then, a mixture of 4.3 parts of AP-3 and 122 parts of deionized water was added dropwise over 5 minutes. By conducting the stirring for a further 10 hours, PTMS and DMDMS were condensed with the acrylic resin.

Next, 114 parts of TEA were added dropwise over 5 minutes to neutralize the carboxyl groups, and thereby composite resin (C-12) was prepared.

Composite resin (C-12) thus-obtained was analyzed using $^1$H-NMR, and it was confirmed that the hydrolysis of the methoxy groups bonded to the silicon atom contained in each of the PTMS, DMDMS and MPTMS proceeded to a conversion of 100%.

Next, 2,800 parts of this composite resin (C-12) and 439 parts of polysiloxane (D-6) were put into a reaction vessel like the one used in Working Example 1 and stirred for 1 hour at 80° C. while introducing nitrogen gas. Thereby, a condensation reaction was carried out between composite resin (C-12) and polysiloxane (D-6).

To the solution of condensate thus-obtained, 2,750 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.3% was obtained. Hereinafter, this is referred to as water-base resin (W-12).

This water-base resin (W-12) was stored at 40° C. for 2 months, and there were absolutely no abnormalities, such as gelation, deposition of precipitate, or the like, found in the water-base resin after storage, and it was confirmed that this water-base resin (W-12) was extremely excellent in storage stability.

Working Example 13 (as above)

388 parts of PNP, 313 parts of IPA, 268 parts of PTMS, and 162 parts of DMDMS were put into a reaction vessel like the one used in Working Example 1 and, while introducing nitrogen gas, the temperature of the mixture was raised to 80° C.

Next, at the same temperature and while stirring, a mixture of 100 parts of ST, 300 parts of MMA, 274 parts of BMA, 186 parts of BA, 110 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.3 parts of AP-3 and 122 parts of deionized water was added dropwise over 5 minutes. By continuing the stirring for a further 10 hours, PTMS and DMDMS were condensed with the acrylic polymer.

Next, 154 parts of TEA were added dropwise over 5 minutes to neutralize the carboxyl groups, and thereby composite resin (C-13) was prepared.

Composite resin (C-13) thus-obtained was analyzed using $^1$H-NMR, and it was confirmed that the hydrolysis of the methoxy groups bonded to the silicon atom contained in each of the PTMS, DMDMS and MPTMS proceeded to a conversion of 100%.

Next, 2,511 parts of this composite resin (C-13) and 1,634 parts of polysiloxane (D-6) were put into a reaction vessel like the one used in Working Example 1 and stirred for 1 hour at 80° C. while introducing nitrogen gas. Thereby, a condensation reaction was carried out between composite resin (C-13) and polysiloxane (D-6).

To the solution of condensate thus-obtained, 3,313 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 39.9% was obtained. Hereinafter, this is referred to as water-base resin (W-13).

This water-base resin (W-13) was stored at 40° C. for 2 months, and there were absolutely no abnormalities, such as gelation, deposition of precipitate, or the like, found in the water-base resin after storage, and it was confirmed that this water-base resin (W-13) was extremely excellent in storage stability.

Working Example 14 (as above)

300 parts of PNP, 250 parts of IPA, 281 parts of iso-butyltrimethoxysilane (IBTMS), and 162 parts of DMDMS were put into a reaction vessel like the one used in Working Example 1 and, while introducing nitrogen gas, the temperature of the mixture was raised to 80° C.

Next, at the same temperature and while stirring, a mixture of 303 parts of MMA, 261 parts of BMA, 134 parts of iso-butyl methacrylate (IBMA), 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.7 parts of AP-3 and 134 parts of deionized water was added dropwise over 5 minutes. By continuing the stirring for a further 10 hours, IBTMS and DMDMS were condensed with the acrylic polymer.

Next, 132 parts of TEA were added dropwise over 5 minutes to neutralize the carboxyl groups, and thereby composite resin (C-14) was prepared.

Composite resin (C-14) thus-obtained was analyzed using $^1$H-NMR, and it was confirmed that the hydrolysis of the methoxy groups bonded to the silicon atom contained in each of PTMS, DMDMS and MPTMS proceeded to a conversion of 100%.

Next, 2,374 parts of composite resin (C-14) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-14) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.1% was obtained. Hereinafter, this is referred to as water-base resin (W-14).

This water-base resin (W-14) was stored at 40° C. for 2 months, and there were absolutely no abnormalities, such as gelation, deposition of precipitate, or the like, found in the water-base resin after storage, and it was confirmed that this water-base resin (W-14) was extremely excellent in storage stability.

Working Example 15 (as above)

300 parts of PNP, 250 parts of IPA, 268 parts of PTMS, and 162 parts of DMDMS were put into a reaction vessel like the one used in Working Example 1 and, while introducing nitrogen gas, the temperature of the mixture was raised to 80° C.

Next, at the same temperature and with stirring, a mixture of 101 parts of ST, 303 parts of MMA, 244 parts of BMA, 188 parts of BA, 50 parts of HEMA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.3 parts of AP-3 and 122 parts of deionized water was added dropwise over 5 minutes. Then, the stirring was continued for a further 10 hours, and the PTMS and DMDMS were condensed with the acrylic polymer.

Next, 132 parts of TEA were added dropwise over 5 minutes to neutralize the carboxyl groups, and thereby composite resin (C-15) was prepared.

Composite resin (C-15) thus-obtained was analyzed using $^1$H-NMR, and it was confirmed that the hydrolysis of the methoxy groups bonded to the silicon atom contained in each of the PTMS, DMDMS and MPTMS proceeded to a conversion of 100%.

Next, 2,355 parts of this composite resin (C-15) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-15) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.5% was obtained. Hereinafter, this is referred to as water-base resin (W-15).

This water-base resin (W-15) was stored at 40° C. for 2 months, and there were absolutely no abnormalities, such as gelation, deposition of precipitate, or the like, found in the water-base resin after storage, and it was confirmed that this water-base resin (W-15) was extremely excellent in storage stability.

Working Example 16 (as above)

300 parts of PNP, 250 parts of IPA, 281 parts of IBTMS, and 162 parts of DMDMS were put into a reaction vessel like the one used in Working Example 1 and, while introducing nitrogen gas, the temperature of the mixture was raised to 80° C.

Next, at the same temperature and with stirring, a mixture of 303 parts of MMA, 211 parts of BMA, 134 parts of IBMA, 50 parts of HEMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.7 parts of AP-3 and 134 parts of deionized water was added dropwise over 5 minutes. Then, the stirring was continued for a further 10 hours, and the DMDMS and the MPTMS were condensed with the acrylic polymer.

Next, 132 parts of TEA were added dropwise over 5 minutes to neutralize the carboxyl groups, and thereby composite resin (C-16) was prepared.

Composite resin (C-16) thus-obtained was analyzed using $^1$H-NMR, and it was confirmed that the hydrolysis of the methoxy groups bonded to the silicon atom contained in each of the PTMS, DMDMS and MPTMS proceeded to a conversion of 100%.

Next, 2,374 parts of this composite resin (C-16) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-16) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 39.8% was obtained. Hereinafter, this is referred to as water-base resin (W-16).

This water-base resin (W-16) was stored at 40° C. for 2 months, and there were absolutely no abnormalities, such as gelation, deposition of precipitate, or the like, found in the water-base resin after storage, and it was confirmed that this water-base resin (W-16) was extremely excellent in storage stability.

Working Example 17 (as above)

300 parts of PNP, 250 parts of IPA, and 588 parts of n-propyltriethoxysilane (PrTES) were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.6 parts of AP-3 and 154 parts of deionized water was added dropwise over 5 minutes. Then, the stirring was continued for a further 10 hours, and the PrTES and acrylic polymer were condensed.

Next, 132 parts of TEA were added dropwise over 5 minutes to neutralize the carboxyl groups, and thereby composite resin (C-17) was prepared.

Composite resin (C-17) thus-obtained was analyzed using $^1$H-NMR, and it was confirmed that the hydrolysis of the ethoxy groups bonded to the silicon atom contained in the PrTES and the methoxy groups bonded to the silicon atom contained in the MPTMS proceeded to a conversion of 100%.

Next, 2,539 parts of this composite resin (C-17) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-17) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol, ethanol, and IPA, thereby, the desired water-base resin having a non-volatile component of 40.2% was obtained. Hereinafter, this is referred to as water-base resin (W-17).

This water-base resin (W-17) was stored at 40° C. for 2 months. Although a slight increase in the viscosity of the resin after storage, there were absolutely no abnormalities, such as gelation, deposition of precipitate, or the like, found in the water-base resin after storage, and it was confirmed that this water-base resin (W-17) was excellent in storage stability.

Working Example 18 (as above)

300 parts of PNP, 250 parts of IPA, 416 parts of n-hexyltrimethoxysilane (HTMS) were put into a reaction vessel like the one used in Working Example 1 and, while introducing nitrogen gas, the temperature of the mixture was raised to 80° C.

Next, at the same temperature and with stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 3.6 parts of AP-3 and 109 parts of deionized water was added dropwise over 5 minutes. Then, the stirring was continued for a further 10 hours, and the HTMS and the acrylic polymer were condensed.

Next, 132 parts of TEA were added dropwise over 5 minutes to neutralize the carboxyl groups, and thereby composite resin (C-18) was prepared.

Composite resin (C-18) thus-obtained was analyzed using $^1$H-NMR, and it was confirmed that the hydrolysis of the methoxy groups bonded to the silicon atom contained in each of the HTMS and MPTMS proceeded to a conversion of 100%.

Next, 2,320 parts of this composite resin (C-18) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-18) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.4% was obtained. Hereinafter, this is referred to as water-base resin (W-18).

This water-base resin (W-18) was stored at 40° C. for 2 months, and there were absolutely no abnormalities, such as gelation, deposition of precipitate, or the like, found in the water-base resin after storage, and it was confirmed that this water-base resin (W-18) was extremely excellent in storage stability.

Working Example 19 (as above)

300 parts of PNP, 250 parts of IPA, and 412 parts of CHTMS were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 3.6 parts of AP-3 and 109 parts of deionized water was added dropwise over 5 minutes. Then, the stirring was continued for a further 10 hours, and the CHTMS and the acrylic polymer were condensed.

Next, 132 parts of TEA were added dropwise over 5 minutes to neutralize the carboxyl groups, and thereby composite resin (C-19) was prepared.

Composite resin (C-19) thus-obtained was analyzed using $^1$H-NMR, and it was confirmed that the hydrolysis of the methoxy groups bonded to the silicon atoms contained in each of the CHTMS and MPTMS proceeded to a conversion of 100%.

Next, 2,317 parts of this composite resin (C-19) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-19) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.0% was obtained. Hereinafter, this is referred to as water-base resin (W-19).

This water-base resin (W-19) was stored at 40° C. for 2 months, and there were absolutely no abnormalities, such as gelation, deposition of precipitate, or the like, found in the water-base resin after storage, and it was confirmed that this water-base resin (W-19) was extremely excellent in storage stability.

Working Example 20 (as above)

300 parts of PNP, 250 parts of IPA, and 445 parts of IBTMS were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 4.0 parts of AP-3 and 135 parts of deionized water was added dropwise over 5 minutes. Then, the stirring was continued for a further 10 hours, and the IBTMS and the acrylic polymer were condensed.

Next, 132 parts of TEA were added dropwise over 5 minutes to neutralize the carboxyl groups, and thereby composite resin (C-20) was prepared.

Composite resin (C-20) thus-obtained was analyzed using $^1$H-NMR, and it was confirmed that the hydrolysis of the methoxy groups bonded to the silicon atom contained in each of the IBTMS and MPTMS proceeded to a conversion of 100%.

Next, 2,376 parts of this composite resin (C-20) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-20) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.1% was obtained. Hereinafter, this is referred to as water-base resin (W-20).

This water-base resin (W-20) was stored at 40° C. for 2 months, and there were absolutely no abnormalities, such as gelation, deposition of precipitate, or the like, found in the water-base resin after storage, and it was confirmed that this water-base resin (W-20) was extremely excellent in storage stability.

Working Example 21 (as above)

300 parts of PNP, 250 parts of IPA, and 364 parts of phenylmethyldimethoxysilane (PMDMS) were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 3.2 parts of AP-3 and 108 parts of deionized water was added dropwise over 5 minutes. Then, the stirring was continued for a further 10 hours, and the PMDMS and the acrylic polymer were condensed.

Next, 132 parts of TEA were added dropwise over 5 minutes to neutralize the carboxyl groups, and thereby composite resin (C-21) was prepared.

Composite resin (C-21) thus-obtained was analyzed using $^1$H-NMR, and it was confirmed that the hydrolysis of the methoxy groups bonded to the silicon atom contained in each of the PMDMS and MPTMS proceeded to a conversion of 100%.

Next, 2,267 parts of this composite resin (C-21) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-21) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 39.9% was obtained. Hereinafter, this is referred to as water-base resin (W-21).

This water-base resin (W-21) was stored at 40° C. for 2 months, and there were absolutely no abnormalities, such as gelation, deposition of precipitate, or the like, found in the water-base resin after storage, and it was confirmed that this water-base resin (W-21) was extremely excellent in storage stability.

Working Example 22 (as above)

300 parts of PNP, 250 parts of IPA, and 369 parts of cyclohexyl methyldimethoxysilane (CHMDMS) were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 3.1 parts of AP-3 and 103 parts of deionized water was added dropwise over 5 minutes. Then, the stirring was continued for a further 10 hours, and the acrylic polymer was condensed with the CHMDMS.

Next, 132 parts of TEA were added dropwise over 5 minutes to neutralize the carboxyl groups, and thereby composite resin (C-22) was prepared.

Composite resin (C-22) thus-obtained was analyzed using $^1$H-NMR, and it was confirmed that the hydrolysis of the methoxy groups bonded to the silicon atom contained in each of the CHMDMS and MPTMS proceeded to a conversion of 100%.

Next, 2,258 parts of this composite resin (C-22) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-22) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.1% was obtained. Hereinafter, this is referred to as water-base resin (W-22).

This water-base resin (W-22) was stored at 40° C. for 2 months, and there were absolutely no abnormalities, such as gelation, deposition of precipitate, or the like, found in the water-base resin after storage, and it was confirmed that this water-base resin (W-22) was extremely excellent in storage stability.

Working Example 23 (as above)

300 parts of PNP, 250 parts of IPA, and 25 parts of trimethylmethoxysilane (TMMS) were put into a reaction vessel like the one used in Working Example 1 and, while introducing nitrogen gas, the temperature of the mixture was raised to 80° C.

Next, at the same temperature and while stirring, a mixture of 101 parts of ST, 303 parts of MMA, 294 parts of BMA, 188 parts of BA, 94 parts of AA, 30 parts of MPTMS, 50 parts of PNP and 50 parts of TBPOEH was added dropwise over 4 hours.

After the addition was completed, stirring was carried out for 2 hours at the same temperature, then, a mixture of 0.4 parts of AP-3 and 5 parts of deionized water was added dropwise over 5 minutes. Then, the stirring was continued for a further 10 hours, and the acrylic polymer was condensed with the TMMS.

Next, 132 parts of TEA were added dropwise over 5 minutes to neutralize the carboxyl groups, and thereby composite resin (C-23) was prepared.

Composite resin (C-23) thus-obtained was analyzed using $^1$H-NMR, and it was confirmed that the hydrolysis of the methoxy groups bonded to the silicon atom contained in each of the TMMS and MPTMS proceeded to a conversion of 100%.

Next, 1,822 parts of this composite resin (C-23) and 966 parts of polysiloxane (D-6) were put into a reaction vessel like the one used in Working Example 1 and stirred for 1 hour at 80° C. while introducing nitrogen gas. Thereby, a condensation reaction was carried out between composite resin (C-23) and polysiloxane (D-6).

To the solution of condensate thus-obtained, 2,650 parts of deionized water were added dropwise over 30 minutes with stirring at room temperature. Next, under reduced pressure of 10 to 300 mmHg, and at a temperature of 40° to 60° C., vacuum distillation was carried out over 4 hours to remove methanol and IPA, thereby, the desired water-base resin having a non-volatile component of 40.0% was obtained. Hereinafter, this is referred to as water-base resin (W-23).

This water-base resin (W-23) was stored at 40° C. for 2 months, and there were absolutely no abnormalities, such as gelation, deposition of precipitate, or the like, found in the water-base resin after storage, and it was confirmed that this water-base resin (W-23) was extremely excellent in storage stability.

Working Examples 24 to 50 (Preparation of a White Coating Material)

Various mill bases having a pigment weight concentration (PWC) of 60% were prepared by dispersing a mixture of a part of a water-base resin (W), a pigment, and ethylene glycol monobutylether (EGMBE) or PNP using a sand mill. Next, various white bases were prepared by adding the remaining part of the water-base resin (W) to each of these mill bases and mixing.

Then, various white coating materials having a PWC of 35% were prepared by mixing deionized water, in addition, a curing catalyst or a compound (E) into each of these white bases, if necessary.

The amounts of the water-base resin (W), the pigment, EGMBE or PNP, the curing catalyst, and the compound (E) used in the preparation of each of the white coating materials are as shown in Table 3.

Working Examples 51 to 57 (Preparation of Clear Coating Material)

Various clear coating materials were prepared by mixing a part of a water-base resin (W) with, in accordance with need, deionized water, PNP or a compound (E).

The proportions of the water-base resin (W), PNP and the compound (E) used are as shown in Table 3.

Reference Examples 22 to 28

Various mill bases having a PWC of 60% were prepared by respectively dispersing a mixture of a part of control resins 1 to 4, a pigment, and EGMBE using a sand mill. Next, various white bases were prepared by adding the remaining part of each of the control resins 1 to 4 to each of the mill bases and mixing.

Then, various control white coating materials having PWC of 35% were prepared by mixing, in accordance with need, deionized water, EGMBE, and a compound (E) into each of these white bases.

The proportions of the control resins 1 to 4, the pigment, EGMBE, and the compound (E) used are as shown in Table 3.

Reference Example 29 to 31

Various control clear coating materials were prepared by mixing, in accordance with need, deionized water, EGMBE or a compound (E) into control resin 5.

The proportions of the control resin 5, EGMBE, and the compound (E) used are as shown in Table 3.

TABLE 3 (1)

| | | Working Example 24 | Working Example 25 | Working Example 26 | Reference Example 22 |
|---|---|---|---|---|---|
| Water-base resin | Resin (W-1) | 1,540 | | | |
| | Resin (W-3) | | 1,559 | | |
| | Resin (W-5) | | | 1,529 | |
| | Control Resin 1 | | | | 1,884 |
| Solvent | EGMBE | 50 | 50 | 50 | 50 |
| Catalyst | DBTDO | | | 2.8 | |
| Pigment | CR-97 | 350 | 350 | 350 | 350 |
| | Coating Material Name | White-1 | White-2 | White-3 | Control White-1 |

Footnote to Table 3
Each of the numerical values showing the proportion of the raw materials represents parts by weight.
DBTDO . . . Abbreviation of dibutyltin dioctate
CR-97 . . . Abbreviation of "TIPAQUE CR-97" which is the product name of rutile titanium oxide manufactured by Ishihara Sangyo Kaisha, Ltd.

TABLE 3 (2)

|  |  | Working Example 27 | Working Example 28 | Working Example 29 | Working Example 30 |
|---|---|---|---|---|---|
| water-base Resin | Resin (W-9) | 1,609 | | | |
|  | Resin (W-11) | | 1,625 | | |
|  | Resin (W-12) | | | 1,613 | |
|  | Resin (W-13) | | | | 1,629 |
| Solvent | EGMBE | 50 | | | |
|  | PNP | | 50 | 50 | 50 |
| Pigment | CR-97 | 350 | 350 | 350 | 350 |
| Coating Material Name | | White-4 | White-5 | White-6 | White-7 |

Footnote to Table 3
Each of the numerical values showing the proportion of the raw materials represents parts by weight.

TABLE 3 (3)

|  |  | Working Example 31 | Working Example 32 | Reference Example 23 |
|---|---|---|---|---|
| Resin | Resin (W-2) | 1,444 | | |
|  | Resin (W-4) | | 1,423 | |
|  | Control Resin 4 | | | 1,473 |
| Solvent (E) | EGMBE | 50 | 50 | 50 |
|  | S-695 | 98 | 98 | 197 |
| Pigment | CR-97 | 350 | 350 | 350 |
| Coating Material Name | | White-8 | White-9 | Control white-2 |

Footnote to Table 3
Each of the numerical values showing the proportion of the raw materials represents parts by weight.
S-695 . . . Abbreviation of "WATERSOL S-695" which is a product name for methyl-etherified methylolmelamine resin aqueous solution (non-volatile content = 66%) manufactured by Dainippon Ink and Chemicals, Inc.

TABLE 3 (4)

|  |  | Working Example 33 | Working Example 34 | Reference Example 24 |
|---|---|---|---|---|
| resin | Resin (W-1) | 1,415 | | |
|  | Resin (W-6) | | 1,556 | |
|  | Control Resin 1 | | | 1,684 |
| Solvent (E) | EGMBE | 50 | 50 | 50 |
|  | GPTMS | 117 | 61 | |
|  | EX-612 | | | 69 |
| Pigment | CR-97 | 350 | 350 | 350 |
| Coating Material Name | | White-10 | White-11 | Control white-3 |

Footnote to Table 3
Each of the numerical values showing the proportion of the raw materials represents parts by weight.
GPTMS . . . 3-glycidoxypropyltrimethoxysilane
EX-612 . . . Abbreviation of "DENACOL EX-612" which is a product name for sorbitol polyglycidyl ether manufactured by Nagase Chemicals Ltd.

TABLE 3 (5)

|  |  | Working Example 35 | Working Example 36 | Working Example 37 | Working Example 38 |
|---|---|---|---|---|---|
| Water-base resin | Resin (W-11) | 1,317 | | | |
|  | Resin (W-12) | | 1,386 | | |
|  | Resin (W-13) | | | 1,296 | |
|  | Resin (W-14) | | | | 1,316 |

TABLE 3 (5)-continued

|  |  | Working Example 35 | Working Example 36 | Working Example 37 | Working Example 38 |
|---|---|---|---|---|---|
| Solvent (E) | PNP | 50 | 50 | 50 | 50 |
|  | GPTMS | 174 | 129 | 188 | 174 |
| Pigment | CR-97 | 350 | 350 | 350 | 350 |
| Coating Material Name | | White-12 | White-13 | White-14 | white-15 |

Footnote to Table 3
Each of the numerical values showing the proportion of the raw materials represents parts by weight.

TABLE 3 (6)

|  |  | Working Example 39 | Working Example 40 | Reference Example 25 | Reference Example 26 |
|---|---|---|---|---|---|
| Resin | Water-base resin (W-7) | 1,401 | | | |
|  | Water-base resin (W-8) | | 1,327 | | |
|  | Control Resin 2 | | | 1,448 | |
|  | Control Resin 3 | | | | 1,543 |
| Solvent (E) | EGMBE | 50 | 50 | 50 | 50 |
|  | EX-612 | 97 | | | |
|  | EGM-400 | | 82 | | 100 |
|  | GPTMS | | | 127 | |
| Pigment | CR-97 | 350 | 350 | 350 | 350 |
| Coating Material Name | | White-16 | White-17 | Control White-4 | Control white-5 |

Footnote to Table 3
Each of the numerical values showing the proportion of the raw materials represents parts by weight.
EGM-400 . . . product name for cyclic polysiloxane having 3-glycidoxypropyl groups and manufactured by Dow Corning Toray Silicone Co., Ltd.

TABLE 3 (7)

|  |  | Working Example 41 | Working Example 42 | Working Example 43 | Reference Example 27 |
|---|---|---|---|---|---|
| water-base resin | Water-base Resin (W-10) | 1,518 | | | |
|  | Water-base Resin (W-15) | | 1,514 | | |
|  | Water-base Resin (W-16) | | | 1,525 | |
|  | Control Resin 4 | | | | 1,504 |
| Solvent (E) | EGMBE | 50 | | | 50 |
|  | PNP | | 50 | 50 | |
|  | AN-210 | 43 | 43 | 43 | 113 |
| Pigment | CR-97 | 350 | 350 | 350 | 350 |
| Coating Material Name | | White-18 | White-19 | White-19 | Control white-6 |

Footnote to Table 3
Each of the numerical values showing the proportion of the raw materials represents parts by weight.
AN-210 . . . Abbreviation of "AQUANAT 210" which is a product name for a self-emulsifying polyisocyanate (isocyanate content = 17.0%) manufactured by Nippon Polyurethane Industry Co., Ltd.

TABLE 3 (8)

|  |  | Working Example 44 | Working Example 45 | Working Example 46 | Working Example 47 |
|---|---|---|---|---|---|
| Water-base resin | Resin (W-17) | 1,310 |  |  |  |
|  | Resin (W-18) |  | 1,304 |  |  |
|  | Resin (W-19) |  |  | 1,317 |  |
|  | Resin (W-20) |  |  |  | 1,314 |
| Solvent | PNP | 50 | 50 | 50 | 50 |
| (E) | GPTMS | 174 | 174 | 174 | 174 |
| Pigment | CR-97 | 350 | 350 | 350 | 350 |
|  | Coating Material Name | White-21 | White-22 | White-23 | White-24 |

Footnote to Table 3
Each of the numerical values showing the proportion of the raw materials represents parts by weight.

TABLE 3 (9)

|  |  | Working Example 48 | Working Example 49 | Working Example 50 | Reference Example 28 |
|---|---|---|---|---|---|
| Water-base Resin | Resin (W-21) | 1,320 |  |  |  |
|  | Resin (W-22) |  | 1,314 |  |  |
|  | Resin (W-23) |  |  | 1,317 |  |
|  | Control Resin 1 |  |  |  | 1,500 |
| Solvent | PNP | 50 | 50 | 50 | 50 |
| (E) | GPTMS | 174 | 174 | 174 | 174 |
| Pigment | CR-97 | 350 | 350 | 350 | 350 |
|  | Coating Material Name | White-25 | White-26 | White-27 | Control White-7 |

Footnote to Table 3
Each of the numerical values showing the proportion of the raw materials represents parts by weight.

TABLE 3 (10)

|  |  | Working Example 51 | Working Example 52 | Reference Example 29 |
|---|---|---|---|---|
| Resin | Resin (W-15) | 1,459 |  |  |
|  | Resin (W-16) |  | 1,470 |  |
|  | Control Resin 5 |  |  | 1,667 |
| Solvent | PNP | 50 | 50 |  |
|  | EGMBE |  |  | 50 |
| (E) | S-695 | 98 | 98 | 98 |
| Coating Material Name |  | Clear-1 | Clear-2 | Control Clear-1 |

Footnote to Table 3
Each of the numerical values showing the proportion of the raw materials represents parts by weight.

TABLE 3 (11)

|  |  | Working Example 53 | Working Example 54 | Reference Example 30 |
|---|---|---|---|---|
| Resin | Resin (W-15) | 1,459 |  |  |
|  | Resin (W-16) |  | 1,470 |  |
|  | Control Resin 5 |  |  | 1,667 |
| Solvent | PNP | 50 | 50 |  |
|  | EGMBE |  |  | 50 |
| (E) | BN-08 | 188 | 188 | 188 |
|  | Coating Material Name | Clear-3 | Clear-4 | Control Clear-2 |

Footnote to Table 3

TABLE 3 (11)-continued

|  |  | Working Example 53 | Working Example 54 | Reference Example 30 |
|---|---|---|---|---|

Each of the numerical values showing the proportion of the raw materials represents parts by weight.
BN-08 . . . Abbreviation of "ELASTRON BN-08" which is a product name for block polyisocyanate (non-volatile content = 34.5%) manufactured by Dai-ichi Kogyo Seiyaku Co., Ltd.

TABLE 3 (12)

|  |  | Working Example 55 | Working Example 56 | Working Example 57 | Reference Example 31 |
|---|---|---|---|---|---|
| Water-base Resin | Resin (W-11) | 1,625 |  |  |  |
|  | Resin (W-13) |  | 1,613 |  |  |
|  | Resin (W-14) |  |  | 1,629 |  |
|  | Control Resin 5 |  |  |  | 1,841 |
| Solvent | PNP | 50 | 50 | 50 |  |
|  | EGMBE |  |  |  | 50 |
| (E) | WS-500 | 230 | 198 | 218 | 248 |
|  | Coating Material Name | Clear-5 | Clear-6 | Clear-7 | Control Clear-3 |

Footnote to Table 3
Each of the numerical values showing the proportion of the raw materials represents parts by weight.
WS-500 . . . Abbreviation of "EPOCROS WS-500" which is a product name for a water soluble resin containing 1,3- oxazoline groups (non-volatile content = 40%) manufactured by Nippon Shokubai Co., Ltd.

Working Examples 58 to 64 and Comparative Examples 1 to 3

Onto precoated steel plates which had been prepared by coating with a polyester/melamine-type coating material and then baking, the plates being sand-papered in water, each of the previously prepared white coating materials and control white coating materials were applied using an applicator to give a film, so that the dried film thickness was 30 micrometers ($\mu$m).

Thereafter, various cured coating films were obtained by curing the white coating materials under the conditions shown in Table 4. Each of the coating films obtained from the white coating material containing the composition of the present invention were excellent in appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 4.

TABLE 4 (1)

|  |  | Working Example | | | Comparative |
|---|---|---|---|---|---|
|  |  | 58 | 59 | 60 | Example 1 |
| Coating Material Used |  | White-1 | White-2 | White-3 | Control White-1 |
| Curing Conditions |  | Room Temperature/1 week | | | |
| Film Properties | Weathering Resistance | 91 | 90 | 89 | 24 |
|  | Stain Resistance | 1.5 | 1.8 | 1.6 | 7.8 |
|  | Acid Resistance | ⊚ | ⊚ | ⊚ | X |

TABLE 4 (1)-continued

|  | Working Example | | | Comparative |
|---|---|---|---|---|
|  | 58 | 59 | 60 | Example 1 |
| Alkali Resistance | ◎ | ◎ | ◎ | X |

Footnotes for Table 4
"Weathering Resistance" is represented by a value (gloss retention: %) which is obtained by dividing the 60° gloss value for the coating film exposed for 2,000 hours using a sunshine weatherometer by the gloss value before exposure and multiplying that value by 100. The larger that value, the better the weathering resistance.
"Stain Resistance" indicated by the color difference (ΔE) between the unwashed coating film exposed for 2 months and the coating film before exposure. The closer that value is to zero, the better the stain resistance.
"Acid Resistance" was evaluated as a measure of acid rain resistance in place of "acid rain resistance". Test pieces in which 0.1 milliliters of 10% aqueous sulfuric acid solution was placed onto the surface of each of the cured coating films were put into an air-circulating oven maintained at 50° C. and left for 30 minutes, then the surfaces of the coating films were washed with water and dried, and the conditions of the surface were evaluated visually. The standard for the evaluation in this case was as follows.
◎ . . . no etching
o . . . some etching, though small
Δ . . . etching, reduction in gloss
X . . . remarkable etching or remarkable reduction in gloss
"Alkali Resistance" was evaluated by putting each of the test pieces into a 5% sodium hydroxide solution and leaving them to soak for 24 hours at room temperature, then the surfaces of the coating films were washed with water and dried, and the conditions of the surfaces were evaluated visually. The standard for the evaluation in this case was as follows.
◎ . . . no etching
o . . . some etching, though small
Δ . . . etching reduction in gloss
X . . . remarkable etching or remarkable reduction in gloss

TABLE 4 (2)

|  |  | Working Example | | Comparative Example |
|---|---|---|---|---|
|  |  | 61 | 62 | 2 |
| Coating Material Used | | White-10 | White-11 | Control White-3 |
| Curing Conditions | | Room Temperature/1 Week | | |
| Film Properties | Weathering Resistance | 98 | 96 | 17 |
|  | Stain Resistance | 1.6 | 1.8 | 8.9 |
|  | Acid Resistance | — | — | × |
|  | Alkali Resistance | — | — | × |

TABLE 4 (3)

|  |  | Working Example | | Comparative Example |
|---|---|---|---|---|
|  |  | 63 | 64 | 3 |
| Coating Material Used | | White-8 | White-9 | Control White = 2 |
| Curing Conditions | | 140° C./30 minutes | | |
| Film Properties | Weathering Resistance | 98 | 99 | 21 |
|  | Stain Resistance | 2.1 | 2.4 | 8.1 |
|  | Acid Resistance | — | — | × |
|  | Alkali Resistance | — | — | × |

Working Examples 65 to 68

A precoated steel plate was prepared by air-spray application of an acrylic-melamine type white coating material (Base-1) prepared in the following way on to an untreated mild steel plate in such a way that the dried film thickness was approximately 40 μm, followed by baking for 25 minutes at 140° C.

Next, each of the white coating materials and control white coating materials prepared as described above were applied by air spraying in such a way that the dried film thickness was 30 μm.

Thereafter, various cured coating films were obtained by curing the white coating material under the conditions shown in Table 5. Each of the cured coating films obtained from the white coating materials containing the compositions of the present invention were excellent in their appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

Preparation of White Coating Material (Base-1)

Glass beads were added to a mixture of 91 parts of "ACRYDIC A-418" (the product name of an acrylic resin containing hydroxyl groups; solvent=a solvent mixture of xylene/n-butanol, non-volatile content=50%; manufactured by Dainippon Ink and Chemicals, Inc.) and 35 parts of "CR-97", and the mixture was dispersed for 1 hour using a sand mill.

Next, after adding 32.5 parts of "SUPER BECKAMINE L-117-60" which is the product name of an n-butyl-etherified melamine/formaldehyde resin; non-volatile content of 60%; manufactured by Dainippon Ink and Chemicals, Inc.), the desired white coating material (Base-1) having a PWC of 35% was prepared by dilution with a solvent mixture comprising xylene/n-butanol=70/30 (ratio of parts by weight) such that viscosity according to Ford Cup No. 4 was 20 seconds.

TABLE 5 (1)

|  |  | Working Example | | | |
|---|---|---|---|---|---|
|  |  | 65 | 66 | 67 | 68 |
| Coating Material Used | | White-4 | White-5 | White-6 | White-7 |
| Curing Conditions | | 150° C. /30 minutes | | | |
| Film Properties | Weathering Resistance | 96 | 97 | 95 | 99 |
|  | Stain Resistance | 2.1 | 1.9 | 2.9 | 1.8 |
|  | Acid Resistance | ◎ | ◎ | ◎ | ◎ |
|  | Alkali Resistance | ◎ | ◎ | ◎ | ◎ |

Footnotes for Table 5
"Weathering resistance" is represented by a value (gloss retention: %) which is obtained by dividing the 60° gloss value for the coating film after exposure for 4,000 hours using a sunshine weatherometer by the gloss value before exposure and multiplying that value by 100. The larger that value, the better the weathering resistance.
"Stain Resistance" is evaluated by the same method recited in the footnote of Table 4.

TABLE 5 (1)-continued

|  | Working Example | | | |
|---|---|---|---|---|
|  | 65 | 66 | 67 | 68 |

"Acid Resistance" was evaluated as a measure of acid rain resistance in place of "acid rain resistance". Test pieces in which 0.1 milliliters of 10% aqueous sulfuric acid solution was placed onto the surface of each of the cured coating films were put into an air-circulating oven maintained at 60° C. and left for 30 minutes, then the surfaces of the coating films were washed with water and dried, and the conditions of the surface were evaluated visually. The standard for the evaluation in this case was as follows.
◎ . . . no etching
○ . . . some etching, though small
Δ . . . etching, reduction in gloss
X . . . remarkable etching or remarkable reduction in gloss
"Alkali Resistance" was evaluated using the same evaluation method and standard as described in the footnote for Table 4.

Working Examples 69 to 72 and Comparative Example 4

Each of the above white coating materials and control white coating materials prepared in the above-mentioned ways were applied by air-spraying directly to slate plates in such a way that the thickness of the dry film was 30 μm.

Thereafter, various cured coating films were obtained by baking under the conditions indicated in Table 5. All of the coating films obtained from the white coating material containing the composition of the present invention were excellent in appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

Thereafter, various cured coating films were obtained by curing the white coating material under the conditions shown in Table 5. Each of the cured coating films obtained from the white coating materials containing the compositions of the present invention were excellent in their appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

Preparation of White Coating Material (Base-2)

Glass beads were added to a mixture of 91 parts of "BECKOLITE M-6205-50" (the product name of a polyester resin; solvent=a solvent mixture of xylene/cyclohexanon/n-butanol, non-volatile content=50%; manufactured by Dainippon Ink and Chemicals, Inc.) and 35 parts of "CR-97", and the mixture was dispersed for 1 hour using a sand mill.

Next, after adding 32.5 parts of "SUPER BECKAMINE L-117-60", the desired white coating material (Base-2) having a PWC of 35% was prepared by dilution with a solvent mixture comprising xylene/n-butanol=70/30 (ratio of parts by weight) such that viscosity according to Ford Cup No. 4 was 20 seconds.

TABLE 5 (2)

| | | Working Examples | | | | Comparative |
|---|---|---|---|---|---|---|
| | | 69 | 70 | 71 | 72 | Example 4 |
| Coating Material Used | | White-12 | White-13 | White-14 | White-15 | Control White-4 |
| Curing Conditions | | Room temperature/1 Week | | | | |
| Film Properties | Weathering Resistance | 96 | 91 | 99 | 98 | 12 |
| | Stain Resistance | 1.8 | 2.9 | 1.1 | 2.2 | 9.1 |
| | Acid Resistance | ◎ | ◎ | ◎ | ◎ | X |
| | Alkali Resistance | ◎ | ◎ | ○ | ◎ | X |

Working Examples 73 to 74 and Comparative Example 5

A precoated steel plate was prepared by air-spray application of a polyester-melamine type white coating material (Base-2) prepared in the following way on to an untreated mild steel plate in such a way that the dried film thickness was approximately 40 μm, then, followed by baking for 25 minutes at 140° C.

Next, each of the white coating materials and control white coating materials prepared as described above were applied by air spraying in such a way that the dried film thickness was 30 μm.

TABLE 5 (3)

| | Working Examples | | Comparative Examples |
|---|---|---|---|
| | 73 | 74 | 5 |
| Coating Material Used | White-16 | White-17 | Control White-5 |
| Curing Conditions | Room temperature/1 week | | |
| Film Weathering | 97 | 91 | 11 |

TABLE 5 (3)-continued

|  |  | Working Examples | | Comparative Examples |
|---|---|---|---|---|
|  |  | 73 | 74 | 5 |
| Properties | Stain Resistance | 2.8 | 2.1 | 7.9 |
|  | Acid Resistance | ⊙ | ○ | × |
|  | Alkali Resistance | ⊙ | ⊙ | × |

Working Example 75 to 77 and Comparative Example 6

A precoated slate plate was prepared by air-spray application of a acrylic-urethane type white coating material (Base-3) prepared in the following way on to a slate plate in such a way that the dried film thickness was approximately 40 μm, followed by curing for 1 week at room temperature.

Next, each of the white coating materials and control white coating materials prepared as described above were applied on the precoated slate plate by air spraying in such a way that the dried film thickness was 30 μm.

Thereafter, various cured coating films were obtained by curing the white coating material under the conditions shown in Table 5. All of the cured coating films obtained from the white coating materials containing the compositions of the present invention were excellent in their appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

Preparation of White Coating Material (Base-3)

Glass beads were added to a mixture of 108 parts of "ACRYDIC A-809" (the product name of an acrylic resin containing hydroxyl groups; solvent=a solvent mixture of toluene/n-butyl acetate, non-volatile content=50%, hydroxyl value of the solution=20; manufactured by Dainippon Ink and Chemicals, Inc.) and 35 parts of "CR-97", and the mixture was dispersed for 1 hour using a sand mill.

Next, 14.4 parts of "BURNOCK DN-980" (the product name of a non-yellowing type polyisocyanate resin; isocyanate group content=15.5% by weight, non-volatile content=75%, manufactured by Dainippon Ink and Chemicals, Inc.) were added.

Thereafter, the desired white coating material (Base-3) having a PWC of 35% was prepared by dilution with a solvent mixture comprising xylene/toluene/n-butyl acetate/2-ethoxyethylacetate=40/30/20/10 (ratio of parts by weight) such that viscosity according to Ford Cup No. 4 was 20 seconds.

TABLE 5 (4)

|  |  | Working Examples | | | Comparative |
|---|---|---|---|---|---|
|  |  | 75 | 76 | 77 | Examples 6 |
| Coating Material Used | | White-18 | White-19 | White-20 | Control White-6 |
| Curing Conditions | | Room temperature/1 Week | | | |
| Film Properties | Weathering Resistance | 96 | 98 | 98 | 13 |
|  | Stain Resistance | 2.2 | 1.8 | 1.9 | 8.6 |
|  | Acid Resistance | ⊙ | ⊙ | ⊙ | X |
|  | Alkali Resistance | ⊙ | ⊙ | ⊙ | X |

Working Examples 78 to 84 and Comparative Example 7

Each of the above white coating materials and control white coating materials prepared in the above-mentioned ways were applied by air-spraying directly to aluminum plates treated with chromate in such a way that the thickness of the dry film was 30 μm.

Thereafter, various cured coating films were obtained by baking under the conditions shown in Table 5. All of the coating films obtained from the white coating material containing the composition of the present invention were excellent in appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

Working Example 5 (5)

|  |  | Working Examples | | | |
|---|---|---|---|---|---|
|  |  | 78 | 79 | 80 | 81 |
| Coating Material Used | | White-21 | White-22 | White-23 | White-24 |
| Curing Conditions | | Room temperature/1 Week | | | |
| Film Properties | Weathering Resistance | 97 | 96 | 97 | 98 |
|  | Stain Resistance | 1.7 | 2.9 | 1.9 | 1.8 |
|  | Acid Resistance | ⊙ | ⊙ | ⊙ | ⊙ |
|  | Alkali Resistance | ⊙ | ⊙ | ⊙ | ⊙ |

TABLE 5 (6)

|  |  | Working Examples | | | Comparative |
|---|---|---|---|---|---|
|  |  | 82 | 83 | 84 | Example 7 |
| Coating Material Used | | White-25 | White-26 | White-27 | Control White-7 |
| Curing Conditions | | Room temperature/1 Week | | | |
| Film Properties | Weathering Resistance | 95 | 95 | 98 | 15 |
|  | Stain Resistance | 1.8 | 1.9 | 2.0 | 8.8 |

TABLE 5 (6)-continued

|  | Working Examples | | | Comparative |
|---|---|---|---|---|
|  | 82 | 83 | 84 | Example 7 |
| Acid Resistance | ⊚ | ⊚ | ⊚ | X |
| Alkali Resistance | ⊚ | ⊚ | ⊚ | X |

Working Examples 85 to 86 and Comparative Example 8

First, a base coat coating material (Base-4) prepared in the following way was applied by air-spraying, in such a way that the dried film thickness was 20 μm, onto a precoated steel plate prepared by coating and by baking a polyester-melamine-type gray coating material, followed by being left standing at 25° C. for 10 minutes.

Next, each of the clear coating materials and control clear coating materials prepared as described above were applied by air-spraying in such a way that the dried film thickness was 30 μm.

Thereafter, various cured coating films were obtained by baking under the conditions shown in Table 5. All of the cured coating films obtained from the clear coating materials containing the compositions of the present invention were excellent in their appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

Preparation of Base-coat Coating Material (Base-4)

A metallic base-coat coating material (Base-4) was prepared by diluting a mixture comprising the following 3 components with a solvent mixture comprising toluene/2-ethoxyethyl acetate=90/10 (ratio of parts by weight) such that viscosity according to Ford Cup No. 4 was 13 seconds.

| | |
|---|---|
| ALPASTE 1700 NL | 10 parts |
| ACRYDIC 47-712 | 100 parts |
| SUPER BECKAMINE L-117-60 | 23.8 parts |

Note:
ALPASTE 1700 NL: aluminum paste; content of aluminum flakes = 65%; and manufactured by Toyo Aluminium K.K.
ACRYDIC 47-712: Acrylic resin solution containing hydroxyl groups; non-volatile component = 50%; and manufactured by Dainippon Ink and Chemicals, Inc.

TABLE 5 (7)

|  |  | Working Examples | | Comparative Examples |
|---|---|---|---|---|
|  |  | 85 | 86 | 8 |
| Coating Material Used | | Clear-1 | Clear-2 | Control Clear-1 |
| Curing Conditions | | 140° C./25 minutes | | |
| Film Properties | Weathering Resistance | 98 | 99 | 11 |
|  | Stain | 1.6 | 1.6 | 7.9 |

TABLE 5 (7)-continued

|  |  | Working Examples | | Comparative Examples |
|---|---|---|---|---|
|  |  | 85 | 86 | 8 |
|  | Resistance | | | |
|  | Acid Resistance | ○ | ○ | × |
|  | Alkali Resistance | ⊚ | ⊚ | × |

Working Examples 87 to 88 and Comparative Example 9

A precoated steel plate was prepared by air-spray application of an acrylic-melamine type white coating material (Base-1) prepared in the above-mentioned way on to an untreated mild steel plate in such a way that the dried film thickness was approximately 40 μm, followed by baking for 25 minutes at 140° C.

Next, each of the clear coating materials and control clear coating materials prepared as described above were applied by air spraying in such a way that the dried film thickness was 30 μm.

Thereafter, various cured coating films were obtained by curing the clear coating material under the conditions shown in Table 5. All of the cured coating films obtained from the clear coating materials containing the compositions of the present invention were excellent in their appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

TABLE 5 (8)

|  |  | Working Examples | | Comparative Examples |
|---|---|---|---|---|
|  |  | 87 | 88 | 9 |
| Coating Material Used | | Clear-3 | Clear-4 | Control Clear-2 |
| Curing Conditions | | 140° C./25 minutes | | |
| Film Properties | Weathering Resistance | 97 | 97 | 12 |
|  | Stain Resistance | 1.6 | 1.6 | 7.1 |
|  | Acid Resistance | ⊚ | ⊚ | × |
|  | Alkali Resistance | ⊚ | ⊚ | × |

Working Examples 89 to 91 and Comparative Example 10

An precoated aluminum plate was prepared by air-spray applying acrylic-urethane-type white coating material (Base-3) prepared in the above-mentioned way onto aluminum plates treated with chromate in such a way that the dried film thickness was 40 μm, followed by curing the coating material by leaving for 1 week at room temperature.

Next, each of the white coating materials and the control white coating materials prepared as described above were applied by air-spraying such that the dried film thickness was approximately 30 μm.

Thereafter, various cured coating films were obtained by curing the white coating materials under the conditions indicated in Table 5. All of the coating films obtained from the white coating material containing the composition of the present invention were excellent in appearance.

The items for the evaluation of the various properties of the cured coating films were accelerated weathering resistance using a sunshine weatherometer, and alkali resistance, acid resistance, and stain resistance during outdoor exposure over two months. These results are shown together in Table 5.

TABLE 5 (9)

|  |  | Working Examples |  | Comparative Examples |
|---|---|---|---|---|
|  |  | 89 | 90 | 91 | 9 |
| Coating Material Used |  | Clear-5 | Clear-6 | Clear-7 | Control Clear-3 |
| Curing Conditions |  |  | 80° C./30 minutes |  |  |
| Film Properties | Weathering Resistance | 98 | 91 | 99 | 14 |
|  | Stain Resistance | 1.9 | 3.2 | 1.5 | 8.8 |
|  | Acid Resistance | ⊚ | ⊚ | ⊚ | × |
|  | Alkali Resistance | ⊚ | ⊚ | ⊚ | × |

Working Example 92

This Working Example was conducted to evaluate the storage stability for each water-base resin.

Each of the water-base resins (W) obtained in Working Examples 1 to 23 was stored at 40° C. for one month. Then, various white coating materials or clear coating materials were prepared in the same way as in Working Examples 24 to 57 using each water-base resin (W) after storage and, in accordance with need, a pigment, a curing catalyst, a compounds (E), EGMBE or PNP, or deionized water.

The amounts of the water-base resin (W), the pigment, the curing catalyst, the compound (E), and EGMBE or PNP used in each of the white coating materials or clear coating materials were as already indicated in Table 3.

Next, in the same way as in Working Examples 58 to 91, various cured coating films were obtained by applying each of the white coating materials and clear coating materials to each of the test plates, and thereafter curing them under the curing conditions shown in Table 4 and Table 5.

Each of the coating films obtained from the white coating materials or clear coating materials, which comprise, as an essential component, the water-base curable resin composition of the present invention which was prepared from the water-base resin which had been stored for one month at 40° C., was excellent in appearance and there were almost no differences in the properties of each of the coating films from those shown in the same Tables.

From these various facts, it can be understood that the water-base resins (W) have particularly excellent storage stability.

INDUSTRIAL APPLICABILITY

The production process according to the present invention makes it possible to easily produce a water-base resin which has a high polysiloxane content, and which has both excellent curability at room temperature and excellent storage stability. The water-base curable resin composition of the present invention comprising as an essential component the water-base resin obtained by the process according to the present invention is very useful in that it can form a cured coating film which is excellent in durability, such as weathering resistance and acid rain resistance, and in stain resistance during outdoor exposure.

Moreover, a coating film which is obtained by applying and curing the water-base coating material, which comprises as an essential component the water-base curable resin composition of the present invention, according to the process for forming a coating film of the present invention, generally exhibits excellent performance as a coating film, without being dependent on the type of the substrate or the primer coating material.

What is claimed is:

1. A process for producing a water-base resin, the process comprising mixing a composite resin (C) and a polysiloxane (D), bringing about a condensation reaction partially between the composite resin (C) and the polysiloxane (D) if necessary, and thereafter dispersing or dissolving the resulting mixture or partially condensed product into a water-base medium, wherein the composite resin (C) comprises a polysiloxane segment (A) and a polymer segment (B), the polysiloxane segment (A) having at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group, and the polymer segment (B) having at least one type of hydrophilic group selected from the group consisting of an anionic group, a cationic group, and a non-ionic group, and wherein the polysiloxane (D) has a hydrolyzable group bonded to a silicon atom and/or a hydroxyl group bonded to a silicon atom, the polysiloxane (D) having a structure represented by the following structural formula (S-I) as an essential structural unit:

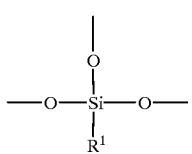

(S-I)

wherein R¹ in the formula denotes a methyl group or an ethyl group, and wherein a ratio of the silicon atoms based on structural formula (S-I) to the total silicon atoms constituting the polysiloxane (D) is at least 50 mol %.

2. A production process according to claim 1, wherein said polysiloxane segment (A) and said polymer segment (B), which constitute said composite resin (C), are bonded by a bond as shown in the following structural formula (S-II):

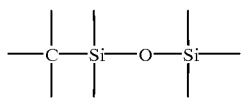

(wherein, in the formula, the carbon atom constitutes a part of the polymer segment (B), and the two silicon atoms constitute the polysiloxane segment (A) or a part of the polysiloxane segment (A)).

3. A production process according to any one of claim 1 or 2, wherein said polysiloxane (D) is one which is prepared by hydrolysis-condensation or partial hydrolysis-condensation of an alkoxysilane which contains at least 50 mol % of methyltrialkoxysilane and/or ethyltrialkoxysilane.

4. A production process according to claim 1 or 2, wherein said polymer segment (B) is a vinyl polymer segment and/or a polyurethane polymer segment.

5. A production process according to any one of claim 1 or 2, wherein said polymer segment (B) has a functional group other than the following four types of functional groups: an acid group, a basic group, a hydrolyzable group bonded to a silicon atom, and a hydroxyl group bonded to a silicon atom.

6. A production process according to any one of claim 1 or 2, wherein, in said water-base resin, the total amount of the polysiloxane segment derived from said polysiloxane (D) and the polysiloxane segment (A) is 30% to 80% by weight with respect to solids content.

7. A production process according to claim 1, wherein said composite resin (C) is one which is prepared by the following steps:
condensing polysiloxane (a-1) and polymer (b-1), polysiloxane (a-1) having at least one silicon atom selected from the group consisting of a silicon atom bearing at least one organic group having a total carbon number of at least 3 together with at least one hydrolyzable group and/or at least one hydroxyl group, a silicon atom bearing one hydrolyzable group or one hydroxyl group together with two groups selected from the group consisting of methyl groups and ethyl groups, and a silicon atom bearing at least one triorganosiloxy group together with at least one hydrolyzable group and/or at least one hydroxyl group; polymer (b-1) having an acid group and/or a basic group and a hydrolyzable group bonded to a silicon atom and/or a hydroxyl group bonded to a silicon atom; the condensation being performed by a reaction of the hydrolyzable group bonded to a silicon atom or the hydroxyl group bonded to a silicon atom or both groups in polysiloxane (a-1) with the hydrolyzable group bonded to a silicon atom or the hydroxyl group bonded to a silicon atom or both groups in polymer (b-1); and
thereafter conducting partial or complete neutralization using a basic compound or an acidic compound.

8. A production process according to claim 7, wherein said polysiloxane (a-1) is a polysiloxane which is obtained by conducting hydrolysis-condensation or partial hydrolysis condensation of:
at least one type of alkoxy silane selected from a monoorganotrialkoxysilane and a diorganodialkoxysilane, each having an organic group having a total carbon number of at least 3; or
a mixture, comprising at least one type of alkoxy silane selected from said monoorganotrialkoxysilane and said diorganodialkoxysilane, and a triorganomonoalkoxysilane.

9. A production process according to claim 1, wherein said composite resin (C) is one which is obtained by the following steps:
hydrolyzing, in the presence of polymer (b-1) having an acid group and/or a basic group and a hydrolyzable group bonded to a silicon atom and/or a hydroxyl group bonded to a silicon atom, at least one type of alkoxy silane selected from a monoorganotrialkoxysilane having an organic group having a total carbon number of at least three, a diorganodialkoxysilane, and a triorganomonoalkoxysilane, so as to condense polymer (b-1) and the alkoxysilane; and
thereafter conducting partial or complete neutralization using a basic compound or an acidic compound.

10. A production process according to claim 1, wherein said composite resin (C) is obtained by partially or completely neutralizing polymer (b-2) using a basic compound or an acidic compound, polymer (b-2) being obtained by conducting radical polymerization of polysiloxane (a-2) with a vinyl monomer comprising, as an essential component, a vinyl monomer having an acid group and/or a vinyl monomer having a basic group; in polysiloxane (a-2), a radically polymerizable double bond and a diorganopolysiloxane segment having at least one hydrolyzable group bonded to a silicon atom and/or at least one hydroxyl group bonded to a silicon atom coexist and the double bond and the diorganopolysiloxane segment are linked via the linkage as shown in structural formula (S-III):

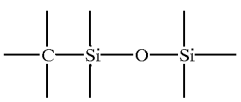

(wherein the carbon atom in the formula is one of the carbon atoms forming the double bond, or is a constituent of a substituent group which is bonded to one of the carbon atoms forming the double bond; and the two silicon atoms constitute the diorganopolysiloxane segment or a part of the diorganopolysiloxane segment).

11. A production process according to any one of claims 7 to 9, wherein said organic group having a total carbon number of at least 3 is an organic group selected from the group consisting of alkyl groups having a carbon number of at least 3, cycloalkyl groups, aryl groups, and aralkyl groups.

12. A production process according to any one of claims 7, 9, and 10, wherein said polymer (b-1) or polymer (b-2) is one which additionally has a functional group other than the following four types of functional groups: an acid group, a basic group, a hydrolyzable group bonded to a silicon atom, and a hydroxyl group bonded to a silicon atom.

13. A production process according to any one of claims 1, 7, 9, and 10, wherein said hydrolyzable group bonded to a silicon atom is an alkoxy group.

14. A production process according to claim 5, wherein the functional group other than the four types of functional groups of an acid group, a basic group, a hydrolyzable group bonded to a silicon atom, and a hydroxyl group bonded to a silicon atom, is a hydroxyl group bonded to a carbon atom.

15. A water-base curable resin composition comprising as an essential component a water-base resin obtained by a production process according to any one of claims 1, 2, and 7–10.

16. A water-base curable resin composition comprising as essential components a water-base resin obtained by a production process according to any one of claims 1, 2, and 7–10 and a compound (E) which has a functional group reactive with a functional group in the water-base resin.

17. A water-base curable resin composition according to claim 16, wherein the compound (E) which has a functional group reactive with a functional group in the water-base resin is at least one compound selected from the group consisting of a compound having a hydroxyl group bonded to a silicon atom and/or a hydrolyzable group bonded to a silicon atom, a compound having in its molecule both an epoxy group and a hydrolyzable group bonded to a silicon atom, a polyisocyanate compound, a blocked polyisocyanate compound, a polyepoxy compound, a polyoxazoline compound, and an amino resin.

18. A water-base coating material comprising a water-base curable resin composition according to claim 15.

19. A process for forming a coating film comprising applying a water-base coating material according to claim 18 on a substrate or on a substrate on which a primer coating material is applied in advance, and subsequently curing the water-base coating material.

20. A production process according to claim 12, wherein the functional group other than the four types of functional groups of an acid group, a basic group, a hydrolyzable group bonded to a silicon atom, and a hydroxyl group bonded to a silicon atom, is a hydroxyl group bonded to a carbon atom.

21. A water-base coating material comprising a water-base curable resin composition according to claim 16.

22. A water-base coating material comprising a water-base curable resin composition according to claim 17.

* * * * *